(12) United States Patent
Tajima et al.

(10) Patent No.: US 9,804,809 B2
(45) Date of Patent: *Oct. 31, 2017

(54) PRINT CONTROL SYSTEM

(71) Applicant: Seiko Epson Corporation, Tokyo (JP)

(72) Inventors: Shigeo Tajima, Shiojiri (JP); Koji Nishizawa, Shiojiri (JP); Yuichi Sugiyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,918

(22) Filed: Apr. 18, 2016

(65) Prior Publication Data

US 2016/0231967 A1  Aug. 11, 2016

Related U.S. Application Data

(63) Continuation of application No. 14/525,634, filed on Oct. 28, 2014, now Pat. No. 9,348,548.

(30) Foreign Application Priority Data

| Nov. 1, 2013 | (JP) | 2013-228152 |
| Nov. 7, 2013 | (JP) | 2013-230943 |
| Nov. 7, 2013 | (JP) | 2013-230946 |
| Nov. 22, 2013 | (JP) | 2013-241635 |
| Dec. 2, 2013 | (JP) | 2013-249406 |

(51) Int. Cl.
G06F 3/12 (2006.01)
H04L 12/24 (2006.01)
H04L 29/08 (2006.01)
G06Q 20/20 (2012.01)
H04N 1/00 (2006.01)

(52) U.S. Cl.
CPC .......... *G06F 3/1236* (2013.01); *G06F 3/1203* (2013.01); *G06F 3/1231* (2013.01); *G06F 3/1285* (2013.01); *G06Q 20/209* (2013.01); *H04L 41/08* (2013.01); *H04L 67/02* (2013.01); *H04N 1/00228* (2013.01)

(58) Field of Classification Search
None
See application file for complete search history.

(56) References Cited

U.S. PATENT DOCUMENTS 4,589,106 A * 5/1986 Prather .............. H04Q 11/0407
370/359
4,882,675 A * 11/1989 Nichtberger ......... G06Q 20/387
235/381

(Continued)

FOREIGN PATENT DOCUMENTS

JP   07-287678 A   10/1995
JP   07-296266 A   11/1995

(Continued)

*Primary Examiner* — Ted Barnes
(74) *Attorney, Agent, or Firm* — Foley & Lardner LLP

(57) ABSTRACT

A print control system 1 includes a control server 10 that opens a communication path for asynchronous duplex communication, generates print data, and outputs the generated print data by the opened communication path; and a printer 12 that opens a communication path, receives the print data by the opened communication path, and prints based on the received print data.

4 Claims, 29 Drawing Sheets

(56) References Cited

U.S. PATENT DOCUMENTS

| | | | | |
|---|---|---|---|---|
| 5,625,757 A * | 4/1997 | Kageyama | G06F 3/1207 | 358/1.14 |
| 5,633,992 A * | 5/1997 | Gyllenskog | G06F 3/1293 | 358/1.13 |
| 5,699,494 A * | 12/1997 | Colbert | G06F 3/1293 | 358/1.13 |
| 5,727,135 A * | 3/1998 | Webb | G06F 3/1204 | 358/1.14 |
| 5,729,461 A * | 3/1998 | D'Andrea | G07B 17/00508 | 101/71 |
| 6,134,021 A * | 10/2000 | Silverbrook | H04N 1/40068 | 358/1.15 |
| 6,189,052 B1 * | 2/2001 | Nilsson | G06F 13/126 | 710/11 |
| 6,452,693 B1 * | 9/2002 | Isoda | G06F 3/1293 | 358/1.15 |
| 6,477,587 B1 * | 11/2002 | Isoda | H04L 12/40123 | 710/20 |
| 6,710,893 B1 * | 3/2004 | Hou | G06F 11/26 | 358/1.15 |
| 9,195,418 B2 * | 11/2015 | Tajima | G06F 3/1203 | |
| 2002/0051184 A1 * | 5/2002 | Fritz | H04W 76/02 | 358/1.15 |
| 2002/0126306 A1 * | 9/2002 | Chohsa | G06F 3/1205 | 358/1.13 |
| 2002/0145764 A1 * | 10/2002 | Suzuki | H04N 1/40 | 358/461 |
| 2003/0025931 A1 * | 2/2003 | Dorfman | G06Q 10/10 | 358/1.15 |
| 2003/0123074 A1 * | 7/2003 | Imai | H04N 1/00204 | 358/1.9 |
| 2003/0142352 A1 * | 7/2003 | Matsunaga | G06F 3/1204 | 358/1.15 |
| 2003/0197887 A1 * | 10/2003 | Shenoy | G06F 3/1205 | 358/1.15 |
| 2003/0197890 A1 * | 10/2003 | Satake | G06F 3/1203 | 358/1.15 |
| 2004/0009022 A1 * | 1/2004 | Matsunaga | G06F 3/1204 | 400/61 |
| 2004/0098471 A1 * | 5/2004 | Shima | H04L 12/24 | 709/221 |
| 2004/0215785 A1 | 10/2004 | Shima | | |
| 2004/0215840 A1 * | 10/2004 | Shimura | G06F 3/1204 | 710/1 |
| 2005/0179936 A1 * | 8/2005 | Sedky | G06F 3/1213 | 358/1.15 |
| 2006/0104295 A1 * | 5/2006 | Worley | G06F 9/544 | 370/401 |
| 2007/0204045 A1 * | 8/2007 | Shima | H04N 1/00233 | 709/226 |
| 2008/0028203 A1 * | 1/2008 | Sakai | H04L 63/164 | 713/150 |
| 2008/0034098 A1 | 2/2008 | Shima | | |
| 2008/0186983 A1 * | 8/2008 | Dielissen | H04L 47/10 | 370/400 |
| 2008/0239382 A1 * | 10/2008 | Matsueda | G06F 3/121 | 358/1.15 |
| 2009/0066989 A1 * | 3/2009 | Kazume | G06F 3/121 | 358/1.14 |
| 2009/0077169 A1 * | 3/2009 | Ikeura | H04L 67/16 | 709/203 |
| 2009/0161144 A1 * | 6/2009 | Huang | H04N 1/00222 | 358/1.15 |
| 2010/0110475 A1 * | 5/2010 | Johnson | G06F 3/121 | 358/1.15 |
| 2010/0238501 A1 * | 9/2010 | Fujimaki | G06F 21/608 | 358/1.15 |
| 2010/0281107 A1 * | 11/2010 | Fallows | G06F 9/54 | 709/203 |
| 2010/0328717 A1 * | 12/2010 | Sugasaki | H04N 1/00278 | 358/1.15 |
| 2011/0176163 A1 * | 7/2011 | Towata | G06F 3/1203 | 358/1.15 |
| 2012/0008164 A1 * | 1/2012 | Nanaumi | H04N 1/0023 | 358/1.15 |
| 2012/0036570 A1 * | 2/2012 | Wada | H04L 63/02 | 726/11 |
| 2012/0110646 A1 * | 5/2012 | Ajitomi | G06F 21/335 | 726/4 |
| 2012/0133974 A1 * | 5/2012 | Nakamura | G06F 3/1212 | 358/1.15 |
| 2012/0144416 A1 * | 6/2012 | Wetzer | H04N 21/25816 | 725/14 |
| 2012/0194864 A1 * | 8/2012 | Oshima | G06F 3/1204 | 358/1.15 |
| 2012/0224197 A1 * | 9/2012 | Suzuki | G06K 15/002 | 358/1.9 |
| 2012/0307303 A1 | 12/2012 | Harada | | |
| 2012/0320415 A1 * | 12/2012 | Nakamura | G06K 15/02 | 358/1.15 |
| 2013/0060951 A1 | 3/2013 | Shima | | |
| 2013/0083353 A1 * | 4/2013 | Nishikawa | G06F 3/1206 | 358/1.15 |
| 2013/0120794 A1 | 5/2013 | Kamoi | | |
| 2013/0238785 A1 * | 9/2013 | Hawk | G06F 9/5072 | 709/224 |
| 2013/0314735 A1 | 11/2013 | Homma | | |
| 2014/0025832 A1 | 1/2014 | Ito | | |
| 2014/0071476 A1 * | 3/2014 | Aritomi | G06F 3/1222 | 358/1.14 |
| 2014/0092418 A1 | 4/2014 | Kishimoto | | |
| 2014/0201292 A1 * | 7/2014 | Savage | H04L 51/063 | 709/206 |
| 2015/0002895 A1 * | 1/2015 | Nakatsuka | G06F 3/1285 | 358/1.15 |
| 2015/0146243 A1 * | 5/2015 | Tsujimoto | G06F 3/1207 | 358/1.15 |

FOREIGN PATENT DOCUMENTS

| | | |
|---|---|---|
| JP | 08-161248 A | 6/1996 |
| JP | 09-259054 A | 10/1997 |
| JP | 2000-101640 A | 4/2000 |
| JP | 2000-227842 A | 8/2000 |
| JP | 2001-105689 A | 4/2001 |
| JP | 2002-092743 A | 3/2002 |
| JP | 2002-518885 A | 6/2002 |
| JP | 2002-312853 A | 10/2002 |
| JP | 2002-351642 A | 12/2002 |
| JP | 2003-050685 A | 2/2003 |
| JP | 2003-108449 A | 4/2003 |
| JP | 2004-078392 A | 3/2004 |
| JP | 2005-084759 A | 3/2005 |
| JP | 2005-100343 A | 4/2005 |
| JP | 2006-039915 A | 2/2006 |
| JP | 2009-070290 A | 4/2009 |
| JP | 2009-301185 A | 12/2009 |
| JP | 2010-224768 A | 10/2010 |
| JP | 2011-108097 A | 6/2011 |
| JP | 2012-037944 A | 2/2012 |
| JP | 2012-118733 A | 6/2012 |
| JP | 2012-252474 A | 12/2012 |
| JP | 2013-004248 A | 1/2013 |
| JP | 2013-075365 A | 4/2013 |
| JP | 2013-077141 A | 4/2013 |
| JP | 2013-077144 A | 4/2013 |
| JP | 2013-103477 A | 5/2013 |
| JP | 2013-120425 A | 6/2013 |
| JP | 2013-149004 A | 8/2013 |
| JP | 2013-246492 A | 12/2013 |
| JP | 2014-021794 A | 2/2014 |
| JP | 2014-075655 A | 4/2014 |
| WO | 99/65188 | 12/1999 |
| WO | 99/65202 | 12/1999 |

\* cited by examiner

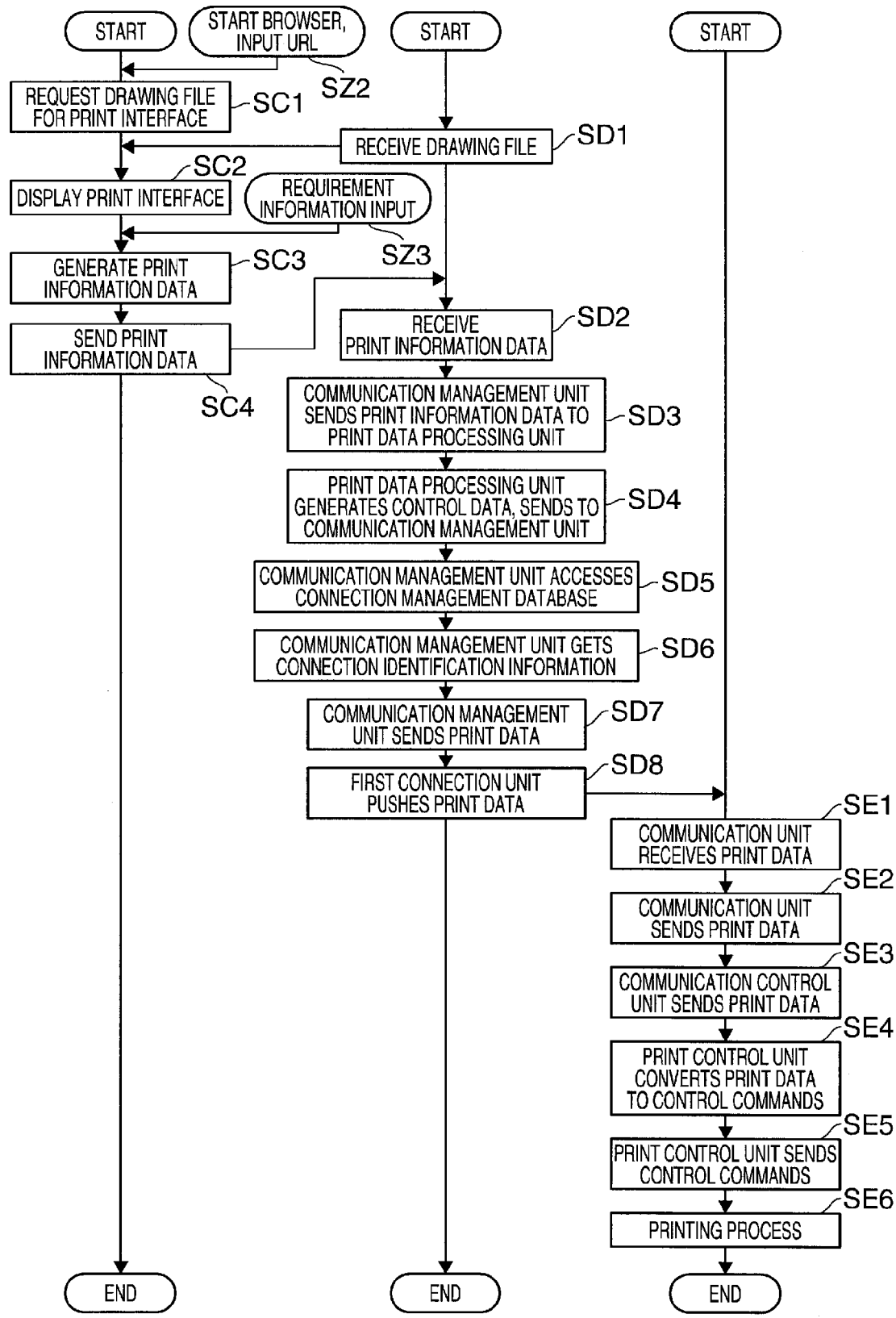

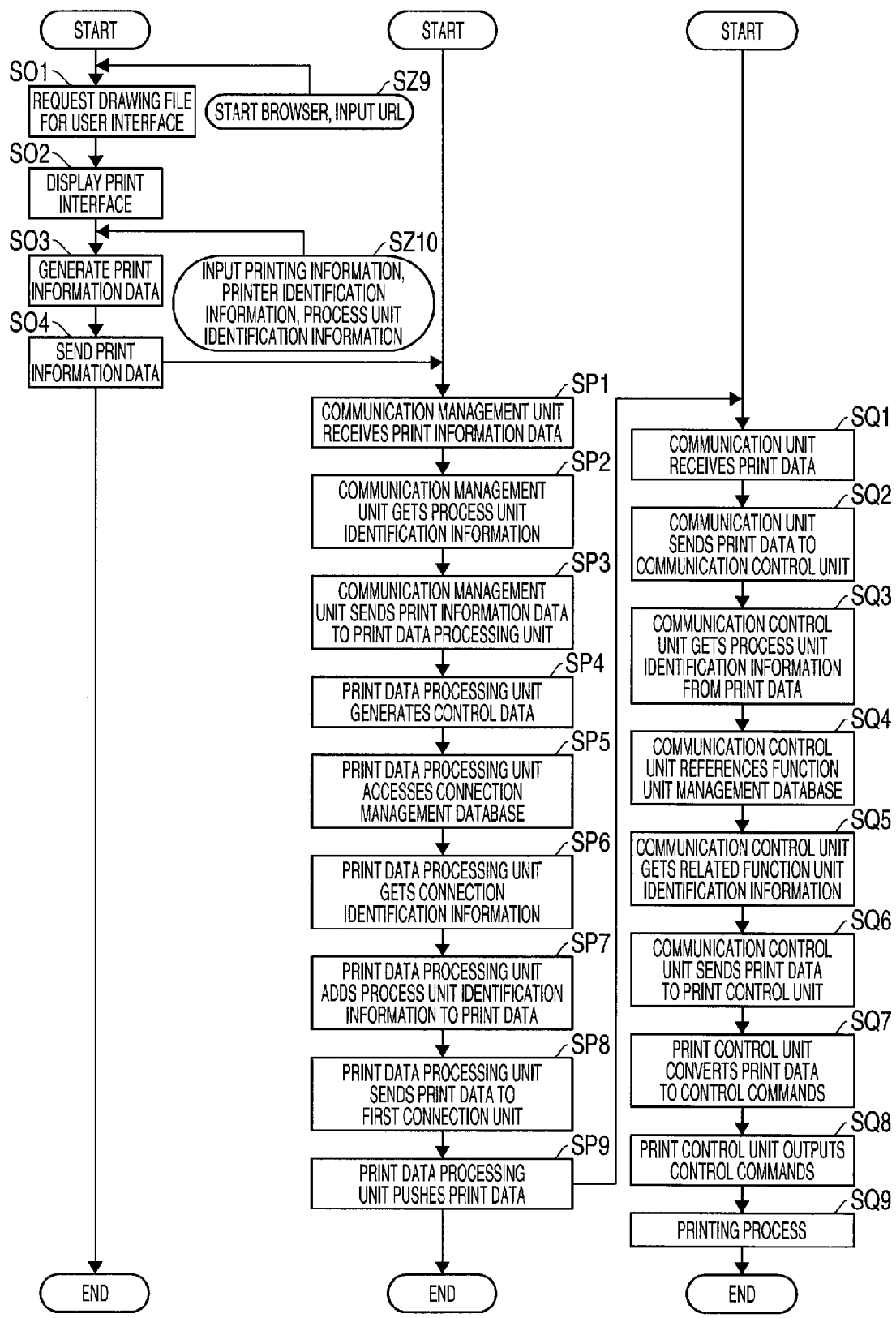

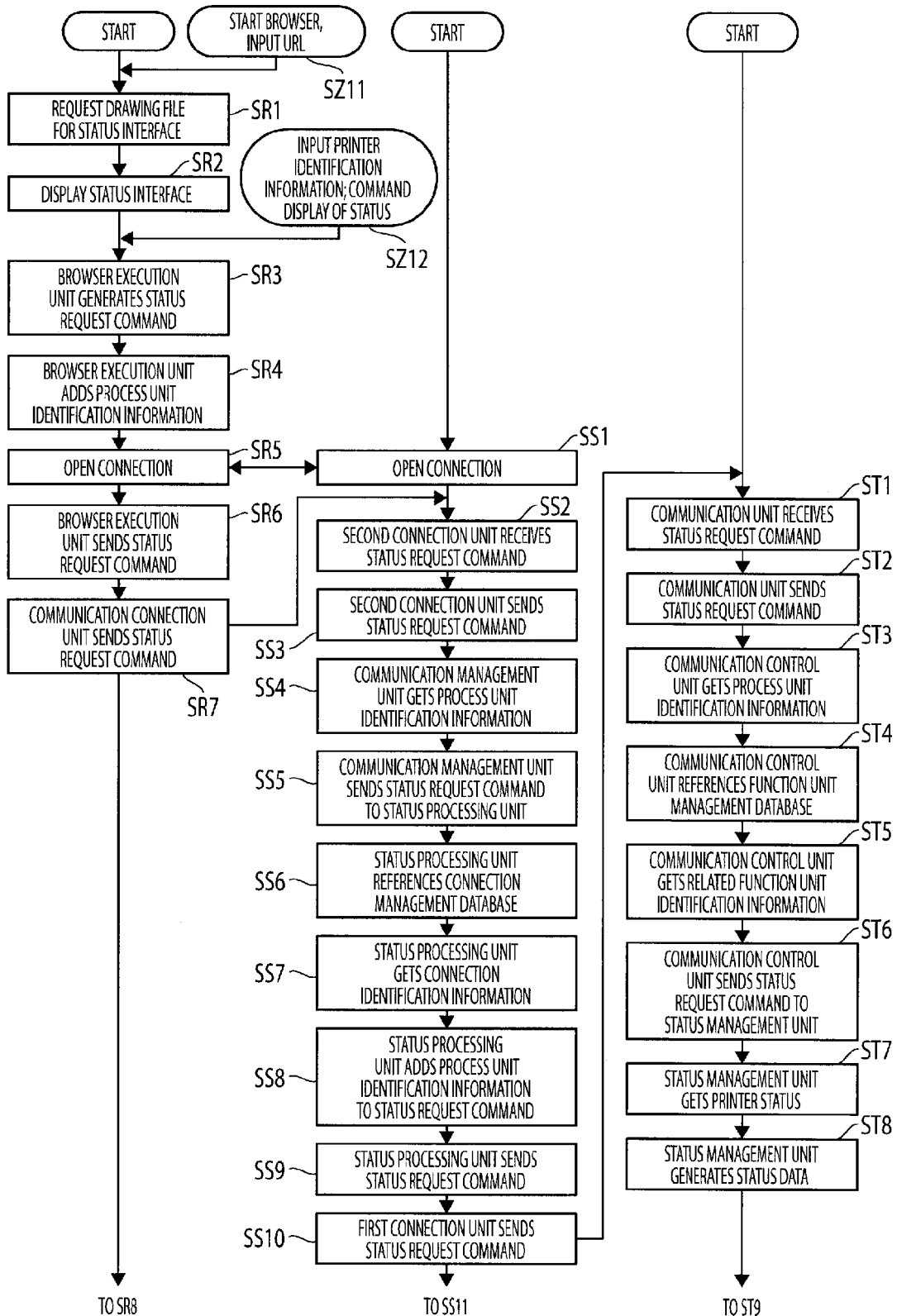

PRINT CONTROL SYSTEM

CROSS-REFERENCE TO RELATED APPLICATION(S)

This application is a continuation of, and claims priority under 35 U.S.C. §120 on, U.S. application Ser. No. 14/525,634, filed Oct. 28, 2014, which claims priority under 35 U.S.C. §119 on Japanese patent application nos. 2013-228152 filed Nov. 1, 2013, 2013-230943 filed Nov. 7, 2013, 2013-230946 filed Nov. 7, 2013, 2013-241635 filed Nov. 22, 2013 and 2013-249406 filed Dec. 2, 2013. The content of each such application is incorporated herein by reference.

BACKGROUND

1. Technical Field

The present disclosure relates to a print control system.

2. Related Art

A print control system that prints on print media and produces receipts with a printing device as controlled by a print control device is described, for example, in JP-A-2011-108097. In this type of print control system, the printing device and the print control device are connected over a network and communicate through the network.

When building a system in which a printing device and print control device communicate over a network such as described in JP-A-2011-108097, the system must be compatible with configurations in which a printing device with a printing function and the print control device communicate over a network.

SUMMARY

With consideration for the foregoing problem, the present invention makes a print control system in which a printer and a print control device communicate over a network compatible with configurations in which multiple devices communicate over a network.

A print control system according to the invention includes: a print control device that establishes an asynchronous duplex communication path, generates print data, and outputs the generated print data through the established communication path; and a printer that establishes the communication path, receives the print data by the established communication path, and prints based on the received print data.

Thus comprised, the print control system can be made a system that is compatible with configurations in which a printer and a print control device communicate over a network.

Preferably, the print control system also has a management device that transmits information related to printing; the printer transmits identification information; and the print control device includes a first connection unit that connects to the printer and receives printer identification information identifying the printer from the printer, a communication management unit that establishes the communication path with the printer connected to the first connection unit, and assigns to the established communication path communication path identification information identifying the communication path, a storage unit that stores relation information relating the printer identification information and the communication path identification information when the communication path is established, a second connection unit that connects to the management device and receives information including the printer identification information related to the printer, and a print data processing unit that acquires the communication path identification information related to the printer identification information contained in the information related to printing received by the second connection unit based on the relation information, and sends the information related to printing to the communication path to which the acquired communication path identification information was assigned.

Thus comprised, the print control system can be made a system that is compatible with configurations in which a printer and a print control device communicate over a network.

Further preferably, the communication management unit of the print control device acquires the printer identification information when the communication path is established.

When a communication path is established, the print control device in this configuration can store the identification information of the connected printer relationally to the identification information of the communication path for the opened communication path.

In a print control system according to another aspect of the invention, the printer includes a print unit that prints, a print control unit that controls the print unit based on the print data, a function unit that communicates control data different from the print data and runs a process based on the control data, a communication control unit that adds print control unit identification information identifying the print control unit to the print data the print control unit outputs, and a communication unit that transmits the print data to which the print control unit identification information was added by the communication control unit; and the print control device includes a print data processing unit that executes a process based on the print data that was transmitted, a process unit that executes a process based on the control data that was transmitted, and a communication management unit that sends the print data to the print data processing unit based on the print control unit identification information added to the print data.

Thus comprised, the print control system can be made a system that is compatible with configurations in which a printer and a print control device communicate over a network.

Further preferably in a print control system according to another aspect of the invention, the communication control unit of the printer adds function unit identification information identifying the function unit to the control data output by the function unit; the communication unit of the printer outputs the control data to which the function unit identification information was added; and the communication management unit of the print control device sends the control data to the function unit based on the function unit identification information added to the control data.

This configuration can send the control data sent by the printer to a function unit of the print control device for processing by a function of the function unit.

A print control system according to another aspect of the invention also has a management device that outputs first data that commands printing and has added thereto first identification information, and second data that commands executing a process and has added thereto second identification information that differs from the first identification information. In this aspect of the invention, the printer has a print unit that prints, a print control unit that controls the print unit, and a function unit with a different function than the print control unit; and the print control device has a connection unit that communicates with the printer and sends the print data to the printer, a reception unit that receives the first data and the second data from the management device, a print data processing unit that generates the print data based on the first data, a process unit that executes a process based on the second data, and a communication management unit that sends the first data to the print data processing unit based on the first identification information added to the first data received by the reception unit.

Thus comprised, the print control system can be made a system that is compatible with configurations in which a printer and a print control device communicate over a network.

Further preferably, the printer has printer identification information that identifies the printer; and the communication management unit selects the printer to which to send the print data based on the printer identification information.

Thus comprised, the print control device can send print control data to the related printer based on the printer identification information.

Further preferably, the connection unit of the print control device establishes the communication path and communicates with the printer; and the communication management unit of the print control device generates communication path identification information identifying the communication path, and selects the communication path through which to send the print data based on the communication path identification information.

Thus comprised, the print control device can send print data to the related printer by the related communication path based on the communication path identification information.

A print control system according to another aspect of the invention also has a terminal that outputs print command data instructing printing and terminal identification information. The printer has a printer storage unit that stores printer identification information, and a print unit that prints based on the print data; and the print control device has a first connection unit to which the printer connects, a communication interface to which the terminal connects, an identification information storage unit that relationally stores the terminal identification information and the printer identification information, a print data processing unit that generates the print data based on the print command data received from the terminal, and a communication management unit that acquires the printer identification information related to the terminal identification information received from the terminal, and sends the print data to the printer that stores the acquired printer identification information.

Thus comprised, the print control system can be made a system that is compatible with configurations in which a printer and a print control device communicate over a network.

A print control system according to another aspect of the invention also has a terminal that outputs print command data instructing printing and terminal identification information; and a management device including an identification information storage unit that relationally stores the terminal identification information and the printer identification information, a management device control unit that, when the print command data is received from the terminal, acquires the printer identification information related to the terminal identification information of the terminal that sent the print command data, and adds the acquired printer identification information to the print command data, a first communication connection unit that sends the print command data to which the printer identification information was added by the management device control unit, and a second communication connection unit to which the terminal connects. The printer has a printer storage unit that stores the printer identification information, and a print unit that prints based on the print data. The print control device has a first connection unit that connects to the printer, a second connection unit that connects to the management device and receives the print command data to which the printer identification information was added, a print data processing unit that generates the print data based on the print command data received from the management device, and a communication management unit that sends the print data generated by the print data processing unit to the printer storing the printer identification information that was added to the print command data.

Thus comprised, the print control system can be made a system that is compatible with configurations in which a printer and a print control device communicate over a network.

In a print control system according to another aspect of the invention, the printer includes a print unit that prints, a print control unit that controls the print unit based on the print data, a status management unit that generates status data indicating a device state, and a communication unit that sends and receives the print data and the status data by the communication path; and the print control device includes a connection unit that sends and receives the print data and the status data by the communication path, a print data processing unit that generates the print data the connection unit sends, and a status processing unit that acquires the status data received by the connection unit and executes a process.

Thus comprised, the print control system can be made a system that is compatible with configurations in which a printer and a print control device communicate over a network.

Further preferably in another aspect of the invention, the printer has a communication control unit that sends the print data received by the communication unit to the print control unit; and the print control device has a communication management unit that sends the status data received by the connection unit to the status processing unit.

Thus comprised, status data received from the printer can be passed to the status processing unit in the print control device, and an appropriate process based on the status data can be executed by the status processing unit.

Further preferably in another aspect of the invention, the print control device has a printer storage unit; the communication management unit of the print control device assigns communication path identification information that identifies the communication path to the communication path; and the storage unit of the print control device stores the communication path identification information relationally to the printer.

In this configuration, the print control device can manage the open communication paths based on the identification information.

Further preferably, the print control system according to another aspect of the invention also has a management device including a display unit, and a management device control unit that displays information based on the status data on the display unit. The print control device has a second connection unit that communicates with the management device; and the status processing unit of the print control device sends the received status data by the second connection unit to the management device.

Thus comprised, the management device connected to the print control device uses a function of the print control device to receive status data sent from the printer, and can display information indicating the status of the printer on the display unit based on the received status data.

Further preferably in a print control system according to another aspect of the invention, the management device control unit of the management device sends a status request requesting the status data to the print control device; the status processing unit of the print control device sends the status request received by the second connection unit to the printer by the communication path; and the status management unit of the printer generates the status data based on the status request received by the communication unit.

Thus comprised, the management device can get the status of the printer as needed.

Further preferably, the status request sent by the management device control unit of the management device includes printer identification information identifying the printer; and the status processing unit of the print control device sends the status data based on the printer identification information contained in the status request to the printer corresponding to the printer identification information.

Thus comprised, the status processing unit of the print control device can send a status request to the related printer based on the information identifying the printer in the status request.

Further preferably, asynchronous duplex communication in the print control system of the invention is WebSocket communication.

Thus comprised, the printer and the print control device can communicate through an asynchronous duplex communication connection using the WebSocket protocol.

Objects of the present invention are further met in a printing device including: a communication controller configured to establish an asynchronous duplex communication channel with a print control device, and to receive print data pushed by the print control device through the asynchronous duplex communication channel without receiving a request from the printing device; and a print mechanism configured to print on print media based on the received print data; wherein the asynchronous duplex communication channel is established by a message from the print device to the print control device.

Preferably, the printing device further includes: a print controller configured to control the print mechanism based on the print data, and to output print result data indicating a result of printing by the print mechanism, a function component configured to communicate control data different from the print data with the print control device, and to run a process based on the control data, and a communication module configured to receive the print data, and to transmit the print result data; wherein the communication controller receives the print result data from the print controller, and adds print controller identification information identifying the print controller to the print result data, and the communication module outputs the print result data with the added print controller identification information to the print control device.

Additionally, the communication controller may add function component identification information identifying the function component to the control data communicated by the function component, and the communication module may output the control data with the added function component identification information to the print control device.

Furthermore, the communication controller may printer identification information identifying the printing device to the print result data, and the communication module may output the print result data with the added printer identification information to the print control device.

Other objects and attainments together with a fuller understanding of the invention will become apparent and appreciated by referring to the following description and claims taken in conjunction with the accompanying drawings.

BRIEF DESCRIPTION OF THE DRAWINGS

FIGS. 5A-5C are flowcharts showing the operation of the management device, control server and printer.

FIGS. 12A-12C are flow charts showing the operation of the management device, control server and printer.

FIGS. 13A-13C are flow charts showing the operation of the management device, control server and printer.

DESCRIPTION OF EMBODIMENTS

Preferred embodiments of the present invention are described below with reference to the accompanying figures.

Embodiment 1

Figure 1:
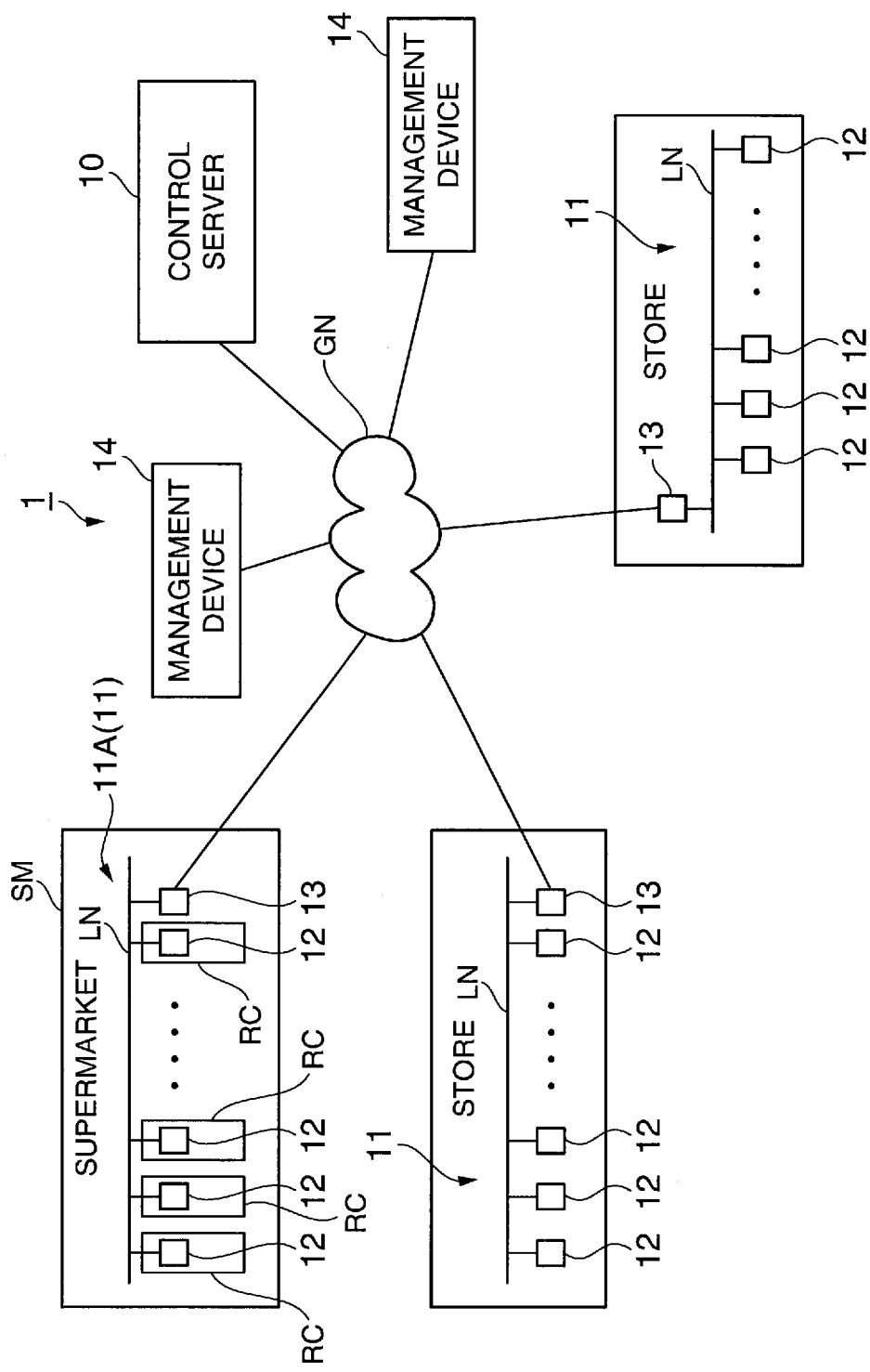
FIG. 1 shows the configuration of a control system according to a preferred embodiment of the invention.

FIG. 1 shows the configuration of a print control system 1 according to the first embodiment of the invention.

As shown in FIG. 1, the print control system 1 includes a control server 10 (print control device), and a plurality of store systems 11 that connect to the control server 10 through the Internet or other network GN. Plural management devices 14 are connected to the network GN.

The store system 11 is a system that is used in retail businesses such as supermarkets, convenience stores, department stores, and restaurants. The store system 11 has functions including at least producing receipts for customers of the business.

The store system 11 has one or a plurality of printers 12 that have a print function for printing on print media and can produce receipts. The printer 12 connects to a local area network LN deployed in the business. A network communication controller 13 configured with a communication device such as a network router or modem connects to the local area network LN. The printer 12 accesses the network GN through the network communication controller 13.

For example, the store system 11A in this example is a system used in a supermarket SM. Plural checkout counters RC are set up in the supermarket SM, and a printer 12 is installed at each checkout counter RC. The printers 12 in the store system 11A are connected to the local area network LN, and access the network GN through the network communication controller 13.

In the print control system 1 according to this embodiment of the invention the printer 12 of the store system 11 establishes a connection with the control server 10, and communicates with the control server 10. The printer 12 executes a process related to printing as controlled by the control server 10.

The management device 14 is a device that manages one or more store systems 11 as described below. For example, the management device 14 may be installed in the headquarters of a company that operates multiple stores, and manage the store systems 11 deployed in multiple stores associated with the corporate group. As described below, the management device 14 can control specific printers 12 in the managed store systems 11, and command the specific printers 12 to print.

Figure 2:
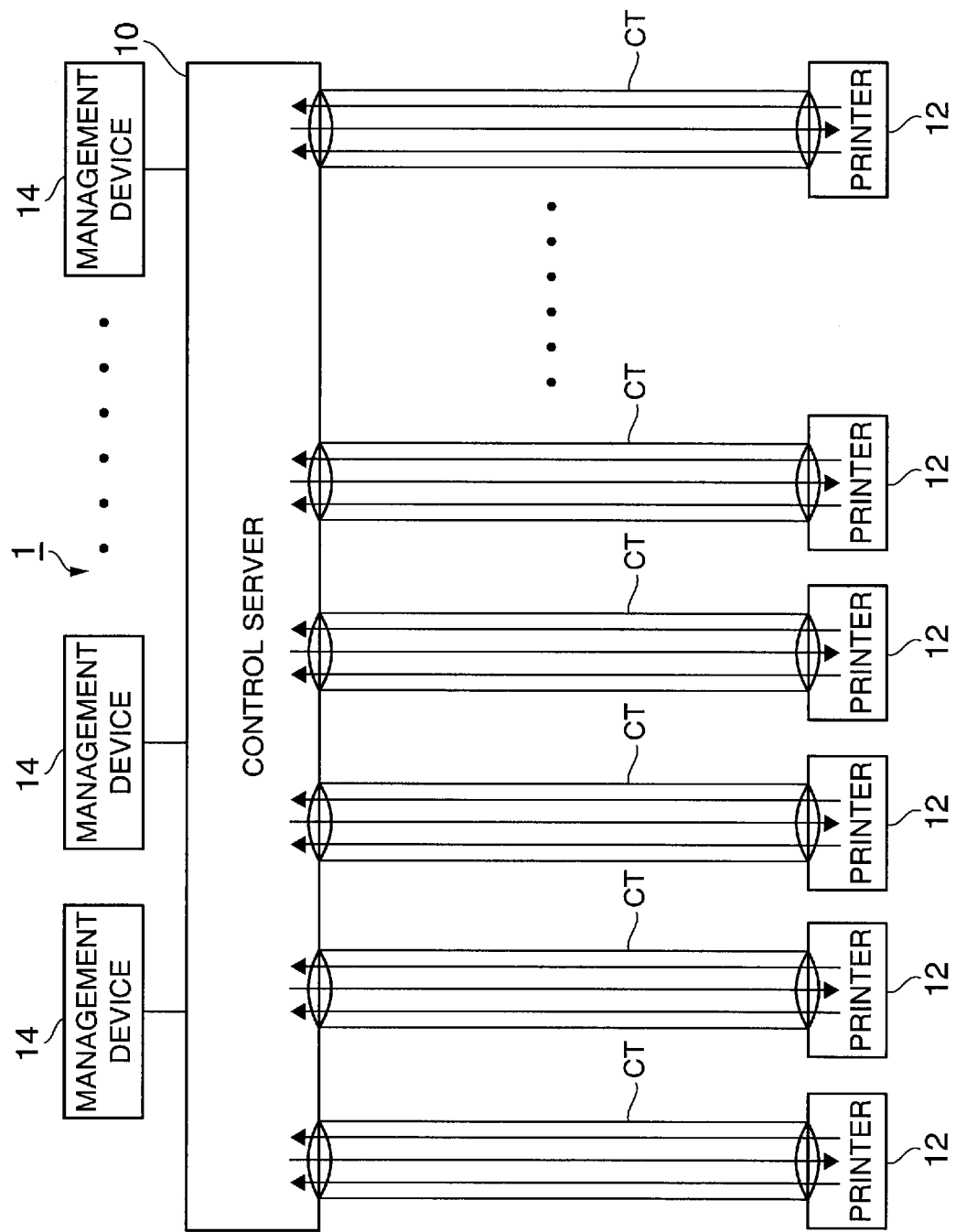
FIG. 2 illustrates communication paths opened between a control server and a printer.

FIG. 2 illustrates the communication paths established between the control server 10 and the printers 12 in the print control system 1.

As shown in FIG. 2, a WebSocket connection CT (asynchronous duplex communication path) is established between the control server 10 and the printers 12 in each store system 11.

WebSocket is a communication standard that enables asynchronous duplex communication between servers and clients connected through a network. After a server and client open a WebSocket connection CT using the WebSocket standard, sending and receiving data between the devices uses a dedicated protocol by means of the connection. It is therefore not necessary to establish a connection every time data is transmitted.

The WebSocket connection CT is a logical communication path for sending and receiving data according to the WebSocket protocol and procedures between the printer 12 and control server 10 connected through the WebSocket connection CT. Therefore, once the printer 12 and control server 10 handshake and establish a WebSocket connection CT, the printer 12 and control server 10 can exchange data asynchronously over the WebSocket connection CT. More specifically, the control server 10 can send data to the printer 12 through the WebSocket connection CT at any time, and the printer 12 can send data to the control server 10 through the WebSocket connection CT.

WebSocket communication is asynchronous, duplex communication between the printer 12 and control server 10 through the WebSocket connection CT based on the WebSocket protocol and methods.

The printer 12 and control server 10 communicate by asynchronous, duplex communication through the WebSocket connection CT. More specifically, the control server 10 can push data to the printer 12 by WebSocket communication through the WebSocket connection CT without receiving a request from the printer 12 operating as a client device at any time. Likewise, the printer 12 can push data to the control server 10 through the WebSocket connection CT at any time.

Plural management devices 14 are also communicatively connected to the control server 10. As described below, the management device 14 can send print data to a specific printer 12 through the control server 10, and command that specific printer 12 to print.

The control server 10 and management device 14 communicate by HTTP in this embodiment of the invention. Any communication method may be used between the management device 14 and control server 10, including WebSocket, for example.

In this embodiment of the invention the control server 10 is a client server in a so-called cloud system in which the printer 12 is a client device. More specifically, the control server 10 can process data, execute a specific operation when triggered by a request from the printer 12 or a request from the management device 14, and send data based on the result of the process through the WebSocket connection CT to the printer 12.

In FIG. 2 the control server 10 is represented as a single block, but this does not mean that the control server 10 is configured from a single server. For example, the control server 10 may be configured from multiple servers, or it may be a server rendered by a function of a specific system. More specifically, the control server 10 may be any configuration that can execute the processes described herein.

The control server 10 and printer 12 communicate according to the WebSocket communication protocol in this embodiment. The invention is not limited to WebSocket communication, however, and other configurations capable of asynchronous, duplex communication in the same way as WebSocket communication may be used.

The print control system 1 thus has multiple (such as a 1000) printers 12 each capable of printing communicatively connected through a WebSocket connection CT to a control server 10.

Such a configuration enables the following.

The control server 10 can collect, manage, and analyze information based on data received from the plural printers 12 connected to the store system 11. Valuable information can therefore be collected. The collected information can be used as "big data."

Constructing a store system 11 can also be made easier and cheaper. More specifically, the printer 12 is connected to the control server 10 by a WebSocket connection CT in this print control system 1. Using a service provided by the control server 10, this enables controlling the printers 12 to execute processes as controlled by the control server 10. An administrator constructing a store system 11 can therefore build the store system 11 by simply installing the printers 12 where desired, and then connecting the printers 12 to the network GN. This enables controlling the printers 12 to execute a desired process, such as a process related to producing receipts, using a service provided by the control server 10.

The administrator configuring the store system 11 therefore does not need to embed a function for controlling the printers 12 in the management device 14 that manages the store system 11. More specifically, by accessing the control server 10 and using a service provided by the control server 10, the management device 14 can control the printers 12 connected to the control server 10. More specifically, the management device 14 can help reduce cost and facilitate deploying a store system 11.

In addition, because printers 12 from different store systems 11 are connected to the control server 10 by a WebSocket connection CT, the control server 10 can manage the plural printers 12 in the plural store systems 11. The control server 10 can also coordinate operation of the plural printers 12 connected in the plural store systems 11.

Figure 3:
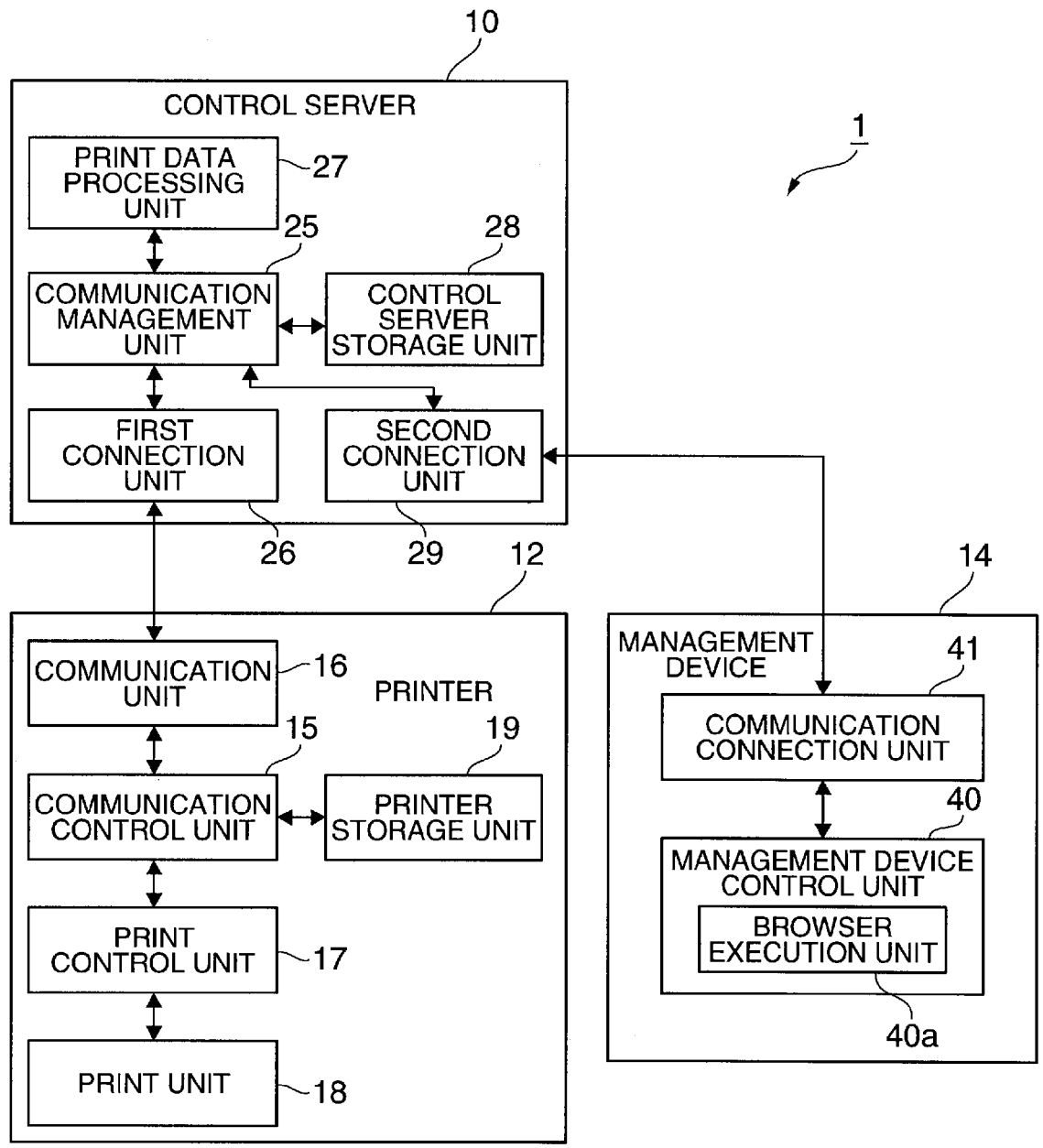
FIG. 3 is a block diagram showing the functional configuration of the control server, printer, and management device.

FIG. 3 is a block diagram showing the functional configuration of the printer 12, control server 10, and management device 14 in this embodiment of the invention.

As shown in FIG. 3, the printer 12 has a communication control unit 15, a communication unit 16, a print control unit 17, a print unit 18, and a printer storage unit 19.

The functions of the communication control unit 15, communication unit 16, and print control unit 17 are described below.

The print unit 18 includes mechanisms related to printing, such as a print mechanism that prints on print media, a conveyance mechanism that conveys the print media, and a cutting mechanism that cuts the print media, and control boards related to controlling the mechanisms.

The printer storage unit 19 is nonvolatile memory, and stores data. Address data and identification data 19b, further described below, are stored in the printer storage unit 19.

The control server 10 includes a communication management unit 25, a first connection unit 26, a print data processing unit 27, a control server storage unit 28, and a second connection unit 29.

The functions of the communication management unit 25, first connection unit 26, and print data processing unit 27 are described further below.

The control server storage unit 28 is nonvolatile memory, and stores data. A connection management database (relation information) is stored in the control server storage unit 28 as described further below.

The second connection unit 29 communicates with the management device 14 by HTTP as controlled by the communication management unit 25.

The management device 14 includes a management device control unit 40, and a communication connection unit 41.

The management device control unit 40 includes CPU, ROM, RAM, and other peripheral circuits, and controls the management device 14. One function block of the management device control unit 40 is a browser execution unit 40a. The browser execution unit 40a is a function block rendered by a function of a web browser.

The communication connection unit 41 communicates by HTTP as controlled by the management device control unit 40.

Note that FIG. 13 shows the relationship between the control server 10 and one printer 12 connected to the control server 10. When plural printers 12 are connected to the control server 10, the control server 10 has the same number of WebSocket interfaces as there are printers 12, establishes a WebSocket connection CT with each printer 12, and communicates by WebSocket protocol through the connections to each printer 12. This also applies to the management device 14.

The operation of the printer 12 and control server 10 when the printer 12 power turns on is described next.

Figures 4A, 4B:
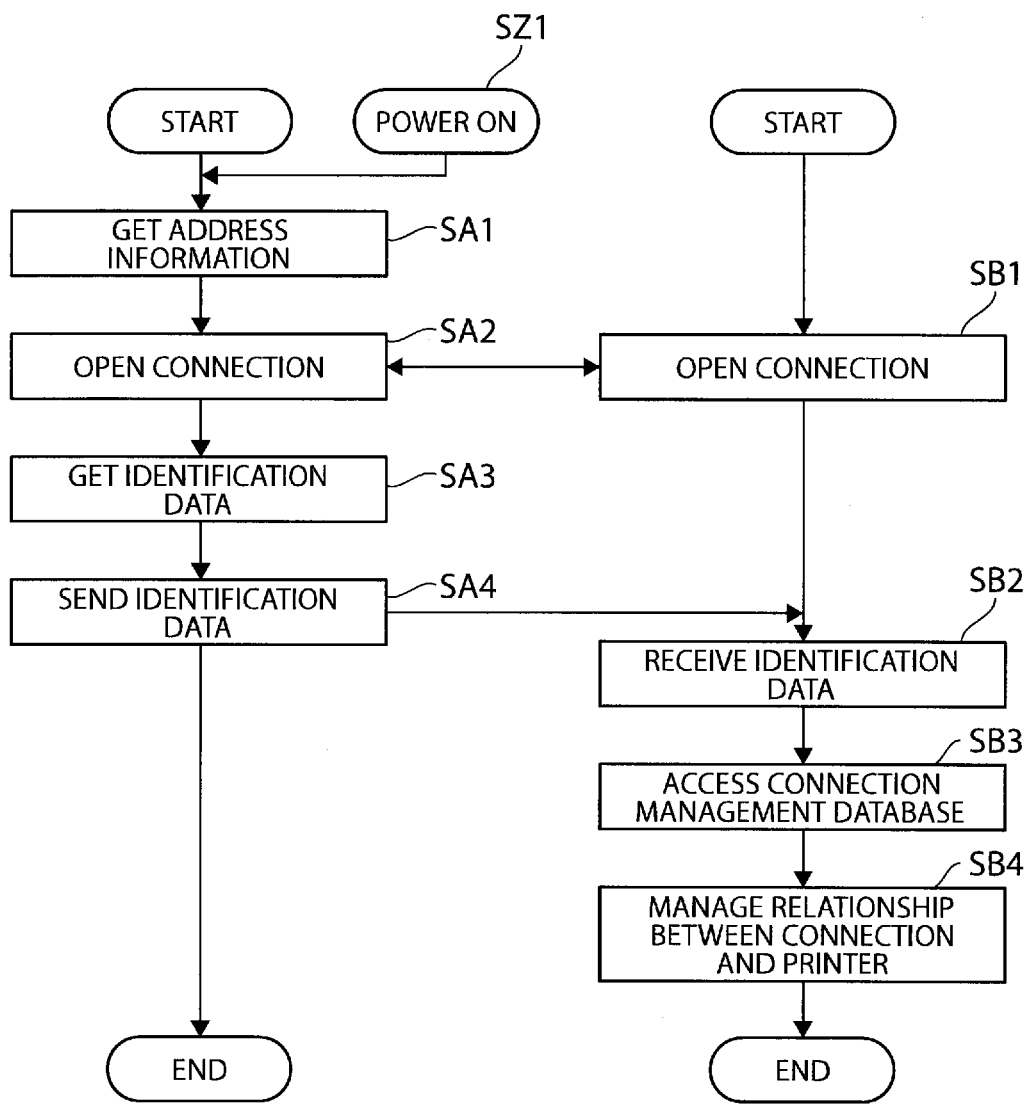
FIGS. 4A and 4B are flow charts showing the operation of the control server and printer.

FIG. 4 is a flow chart showing the operation of the printer 12 and the control server 10 after the printer 12 power turns on, column (A) showing the operation of the printer 12, and column (B) showing the operation of the control server 10.

Note that in the configuration described below, the printer 12 is connected to the local area network LN of the store system 11 in which it is used, and can access the network GN.

The trigger of the process shown in the flow chart in FIG. 4 is not limited to the power turning on. For example, this process may be triggered by the printer 12 connecting to the network GN and enabling communication, or by an instruction from a user.

The functions of the function blocks of the communication control unit 15 and print control unit 17 of the printer 12, and the print data processing unit 27 of the control server 10, are rendered as described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 4 (A), when the printer 12 power turns on (step SZ1), the communication control unit 15 accesses the printer storage unit 19 and gets the address data stored in the printer storage unit 19 (step SA1).

The address data is data including, for example, the domain name (address information) of the control server 10 to access when the WebSocket connection CT is established according to the WebSocket protocol. When opening a WebSocket connection CT according to the WebSocket protocol, the client (the printer 12 in this example) handshakes with the server (the control server 10 in this example) using HTTP (Hypertext Transfer Protocol). When handshaking, the client sends a message containing the domain name of the server, and the address data is data representing this domain name.

Next, the communication control unit 15 establishes a WebSocket connection CT with the communication management unit 25 of the control server 10 through the communication unit 16 and the first connection unit 26 based on the domain name in the address data (step SA2, step SB1). In other words, the printer 12 according to this embodiment establishes a WebSocket connection CT when triggered by the power turning on without receiving an instruction from the user or a request from the control server 10.

When the WebSocket connection CT is established, the printer 12 and control server 10 can communicate through an asynchronous, duplex communication link. More specifically, the control server 10 can push data to the printer 12 through the WebSocket connection CT without receiving a request from the printer 12 operating as a client.

The communication unit 16 and first connection unit 26 are WebSocket interfaces enabling data communication based on the WebSocket protocol and methods. These function blocks are instantiated using a WebSocket Socket.IO library, for example.

If the communication control unit 15 sends data to the communication unit 16, the data can be sent through the WebSocket connection CT according to the WebSocket protocol.

More specifically, the communication unit 16 has functions for processing data that is received according to WebSocket, and sending the data through the WebSocket connection CT based on WebSocket methods. The communication unit 16 also has functions for processing data that is received through the WebSocket connection CT according to WebSocket, and sending to the communication control unit 15. The first connection unit 26 is similarly configured.

Next, the communication control unit 15 of the printer 12 accesses the printer storage unit 19 and gets the identification data 19b stored in the printer storage unit 19 (step SA3). The identification data 19b is data representing the identification information of the printer 12 (referred to below as printer identification information). The printer identification information is, for example, a serial number assigned to the printer 12 when the printer 12 is manufactured.

Next, the communication control unit 15 sends the identification data 19b over the WebSocket connection CT (step SA4).

As shown in FIG. 4 (B), the communication management unit 25 of the control server 10 receives the identification data 19b (step SB2).

Next, the communication management unit 25 accesses the connection management database stored in the control server storage unit 28 (step SB3). The connection management database is a database relationally storing for the WebSocket connections CT that were established connection identification information (information identifying the communication path) identifying the WebSocket connection CT and the printer identification information of the printer.

Next, the communication management unit 25 creates one record in the connection management database. The communication management unit 25 then stores in the created record the connection identification information of the WebSocket connection CT established in step SB1 related to the printer identification information in the identification data 19b received in step SB2 identification information (step SB4).

Note that when a WebSocket connection CT is opened, the communication management unit 25 generates connection identification information for that connection that is different from the connection identification information of any other WebSocket connection CT that was already opened. In other words, the communication management unit 25 assigns the identification information to the established communication path.

The relationship between the WebSocket connections CT and printers 12 is managed by the process of step SB4.

A WebSocket connection CT is thus established when triggered by the power turning on without receiving a user instruction or a request from the control server 10. Thus comprised, the user does not need to perform a complicated operation to open a WebSocket connection CT. Special knowledge is also not needed to open a WebSocket connection CT. After the power turns on, the printer 12 can also be quickly enabled to execute processes as controlled by the control server 10.

Operation of the management device 14, control server 10, and printer 12 when printing on the print medium is described next.

FIG. 5 is a flow chart showing the operation of the management device 14, the control server 10 and the printer 12 when printing on the print medium, (A) showing the operation the management device 14, (B) showing the operation of the control server 10, and (C) showing the operation of the printer 12.

As shown in FIG. 5 (A), to print with the printer 12, the user starts a browser on the management device 14, and inputs a command to access a specific URL (step SZ3). This URL is a URL on the control server 10, and is a URL accessed when a user interface for inputting printing information described below (referred to as the print interface) is presented in a browser window. The specific URL is given by the administrator that manages the control server 10 to the user in advance.

Based on the command in step SZ3, the browser execution unit 40a of the management device 14 accesses the specific URL, and requests the control server 10 for the drawing file related to displaying the print interface (step SC1). This drawing file is a file written in HTML (Hyper-Text Markup Language) or other markup language, for example, and is a file for displaying a user interface in a browser window on the management device 14.

A specific web server program is installed on the control server 10. The control server 10 functions as a web server that generates and sends an image file for displaying a specific user interface in response to a request from the management device 14 as a client device.

As shown in FIG. 5 (B), in response to the request from the management device 14 in step SC1, the control server 10 generates and outputs an image file related to the print interface to the management device 14 (step SD1).

The browser execution unit 40a of the management device 14 then displays the print interface in the browser window based on the received image file (step SC2).

The print interface is a user interface enabling the user to input necessary information to print from the printer 12. This necessary information includes, for example, the file name where the image data is stored, and information related to where the image is printed on the print medium. The print interface is configured so that the information required to print with the printer 12 can be input.

More specifically, the printer identification information of the printer 12 that is to print can be input through the print interface. To print from plural printers 12, the user can input printer identification information for plural printers to the print interface.

After inputting the printer identification information and other required information to the print interface, the user confirms the input (step SZ4).

Based on the information input to the print interface, the browser execution unit 40a generates print information data including the input information (step SC3). The printer identification information (identification information) is included in the print information data.

In this embodiment of the invention, the print information data is printing-related information including identification information of the printer (external device).

Next, the browser execution unit 40a controls the communication connection unit 41 to send the print information data to the control server 10 (step SC4).

As shown in FIG. 5 (B), the communication management unit 25 of the control server 10 receives the print information data through the second connection unit 29 (step SD2).

Next, the communication management unit 25 sends the received print information data to the print data processing unit 27 (step SD3).

Next, the print data processing unit 27 generates and outputs print data related to controlling the printer 12 to the communication management unit 25 based on the received print information data (step SD4).

The print data is information related to printing.

The print data is an XML (Extensible Markup Language) file containing the information to be printed by the printer 12. The information to be printed by the printer 12, such as the image data and information where the image is to be printed, is included in the print data in XML format. The printer identification information of the printer 12 to be used for printing is also included as a tab in the print data.

Next, the communication management unit 25 accesses the connection management database stored in the control server storage unit 28 (step SD5). Next, the communication management unit 25 retrieves the connection identification information of the WebSocket connection CT related to the printer identification information from the connection management database using the printer identification information written in the received print image data as the search key (step SD6). The connection identification information acquired here is the connection identification information of the WebSocket connection CT established with the printer 12 that is to print.

Next, the communication management unit 25 sends the print data to the first connection unit 26 related to the WebSocket connection CT of the connection identification information acquired in step SD6 (step SD7).

Next, the first connection unit 26 pushes the received print data through the WebSocket connection CT (step SD8).

As shown in FIG. 5 (C), the communication unit 16 receives the print data by WebSocket (step SE1). Next, the communication unit 16 sends the received print data to the communication control unit 15 (step SE2). Next, the communication control unit 15 sends the received print data to the print control unit 17 (step SE3). Next, the print control unit 17 converts the received print data to control commands in the command language of the print unit 18 (step SE4). More specifically, the print control unit 17 converts the print data, which is an XML file, to commands that can be interpreted by the control board of the print unit 18.

Next, the print control unit 17 sends the control commands to the print unit 18 (step SE5). Next, the print unit 18 prints on the print medium based on the control commands (step SE6).

Furthermore, based on the printer identification information of the printer 12 stored on the control server 10, the management device 14 in this embodiment of the invention can send data to the printer 12 through the control server 10. In other words, the management device 14 can control a printer 12 in the group of printers 12 connected to the control server 10 through the WebSocket connection CT through the control server 10.

As also described above, the control server 10 in this embodiment of the invention can print from a printer 12 without receiving a request from the printer 12 when an event that prints on the printer 12 occurs. Events that cause the printer 12 to print are events in which predefined conditions are met, such as when an instruction is received from the user, or a request is received from a communicatively connected external device (such as the management device 14).

This configuration also enables starting printing faster than in a configuration in which the printer 12 intermittently sends a request to the control server 10, and the control server 10 sends print data in response to such a request when there is a need to print with the printer 12. Consumption of resources can also be suppressed compared with a configuration in which the control server 10 queues responses to requests.

As described above, the print control system 1 according to this embodiment has a printer 12 that transmits identification information, and a management device 14 that sends information related to printing. The print control system 1 also has a control server 10 (print control device).

The control server 10 has a first connection unit 26 that connects to the printer 12; a communication management unit 25 that establishes a communication path for asynchronous duplex communication with the printer 12, and assigns identification information to the established communication path; a control server storage unit 28 that relationally stores the identification information of the printer 12 and the identification information of the communication path in a connection management database (relational information); a second connection unit 29 that connects to the management device 14 and receives print information data (information related to printing) including the identification information of the printer 12; and a print data processing unit 27 that acquires the identification information of the communication path related to the identification information of the printer 12 contained in the print information data received by the second connection unit 29 from the connection management database, and sends the print data (information related to printing) to the communication path to which the acquired communication path identification information is assigned.

Thus comprised, the control server 10 and printer 12 communicate in the print control system 1 through a communication path (WebSocket connection CT) enabling asynchronous duplex communication. As a result, the control server 10 can send data to the printer 12 through the WebSocket connection CT at any time, and the printer 12 can send data to the control server 10 at any time. Therefore, when a trigger causing the printer 12 to print occurs, the control server 10 sends print data through the WebSocket connection CT to the printer 12, and the printer 12 can be controlled to print based on the print data. The printer 12 can also send data, including data representing the print result, to the control server 10 as needed, and cause the control server 10 to execute a process based on the data. This configuration can more specifically make the print control system 1 compatible with configurations in which the printer 12 and control server 10 communicate over a network.

Thus comprised, the information related to printing sent by the management device 14 to the printer 12 is sent from the control server 10 to the printer 12 using the printer identification information of the printer 12 and the connection identification information of the WebSocket connection CT. More specifically, information related to printing can be sent from the management device 14 through the control server 10 to the printer 12. In other words, this embodiment of the invention can make the print control system 1 and control server 10 compatible with a configuration in which the printer 12 and control server 10 communicate over a network.

The communication management unit 25 of the control server 10 also acquires the identification information of the printer 12 when the WebSocket connection CT (communication path) is established.

Thus comprised, when a WebSocket connection CT is established, the control server 10 can relationally store the identification information of the printer 12 with the connection identification information of the established WebSocket connection CT.

The invention is described above with reference to preferred embodiments thereof, but the invention can be modified and applied in many other ways without departing from the scope of the invention.

In the embodiment described above the printer 12 is installed as part of a store system 11 deployed in a business. However, the printer 12 is not limited to being part of a store system 11, and can be used in other systems.

The management device 14 in the foregoing embodiment acquires a drawing file from a control server 10 using a function of a web browser, and displays a print interface based on the acquired drawing file. However, a configuration in which a dedicated application is installed on the management device 14, a user interface is displayed by a function of the application, and the print information data is generated based on input to the user interface is also conceivable.

In addition, print data is sent as an XML file from the control server 10 to the printer 12 in the foregoing embodiment, but the data format of the print data is not limited to XML. The print data may be data created in another markup language, or control commands in the command language of the print unit 18.

The function blocks shown in FIG. 3 can also be rendered as desired using hardware and software, and do not suggest a specific hardware configuration. Functions of the printer 12 may also be rendered by a separate externally connected device. The printer 12 can also execute the processes described above by running a program stored on an externally connected storage medium.

Embodiment 2

A second embodiment of the invention is described next.

The print control system 1b according to the second embodiment of the invention includes a control server 10b (print control device), a printer 12b, and a management device 14b. The control server 10b, printer 12b, and management device 14b connect over a network GN in the same way as the control server 10, printer 12, and management device 14 in the first embodiment. A communication path established between the control server 10b and printer 12b is the same as the communication path established between the control server 10 and printer 12 in FIG.

Figure 6:
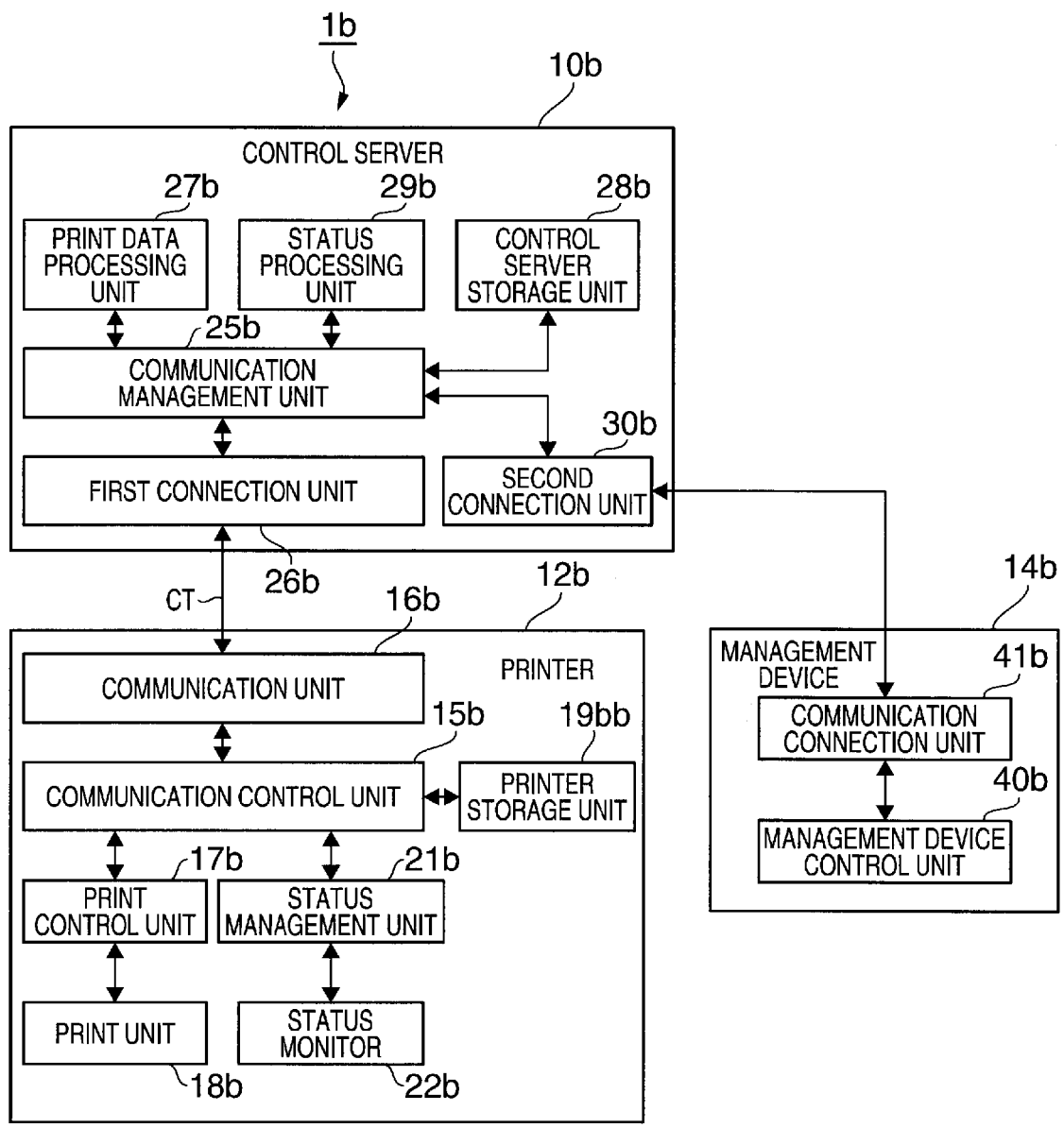
FIG. 6 is a block diagram showing the functional configuration of a control server, printer, and management device according to a second embodiment of the invention.

FIG. 6 is a block diagram showing the functional configuration of the printer 12b, the control server 10b, and the management device 14b.

As shown in FIG. 6, the printer 12b has a communication control unit 15b, a communication unit 16b, a print control unit 17b, a print unit 18b, a status management unit 21b, a status monitor 22b, and a printer storage unit 19bb.

The functions of the communication control unit 15b, communication unit 16b, print control unit 17b, and the status management unit 21b are described further below.

The print unit 18b includes mechanisms related to printing, such as a print mechanism that prints on print media, a conveyance mechanism that conveys the print media, and a cutting mechanism that cuts the print media, and control boards related to controlling the mechanisms.

The status monitor 22b includes sensors or devices such as a sensor that detects if the printer 12b cover is open or closed, and sensors for detecting the status of the printer 12b, such as if an error occurs, and outputs the result to the status management unit 21b.

The printer storage unit 19bb is nonvolatile memory, and stores data. Address data, printer identification information, and a function unit management database as further described below are stored in the printer storage unit 19bb.

The printer 12b has two function units, the print control unit 17b and status management unit 21b, which are function units with different functions.

As shown in FIG. 6, the control server 10b includes a communication management unit 25b, first connection unit 26b, a print data processing unit 27b, a status processing unit 29b, a control server storage unit 28b, and a second connection unit 30b.

The functions of the communication management unit 25b, first connection unit 26b, print data processing unit 27b, and status processing unit 29b are described below.

The control server storage unit 28b has nonvolatile memory, and stores data. A connection management database and a process unit management database are stored in the control server storage unit 28b and described below.

The second connection unit 30b communicates by a specific protocol with the management device 14b as controlled by the communication management unit 25b.

The control server 10b has two process units, the print data processing unit 27b and status processing unit 29b, as process units with separate functions.

The management device 14b includes a management device control unit 40b and a communication connection unit 41b.

The management device control unit 40b includes CPU, ROM, RAM, and other peripheral circuits, and controls the management device 14b.

The communication connection unit 41b communicates according to a specific communication protocol as controlled by the management device control unit 40b.

Note that FIG. 6 shows the relationship between the control server 10b and one printer 12b connected to the control server 10b. When plural printers 12b are connected to the control server 10b, the control server 10b has the same number of WebSocket interfaces as there are printers 12b, establishes a WebSocket connection CT with each printer 12b, and communicates by WebSocket protocol through the connections to each printer 12b.

The operation of the printer 12b and control server 10b when the printer 12b power turns on is described next.

Figures 7A, 7B:
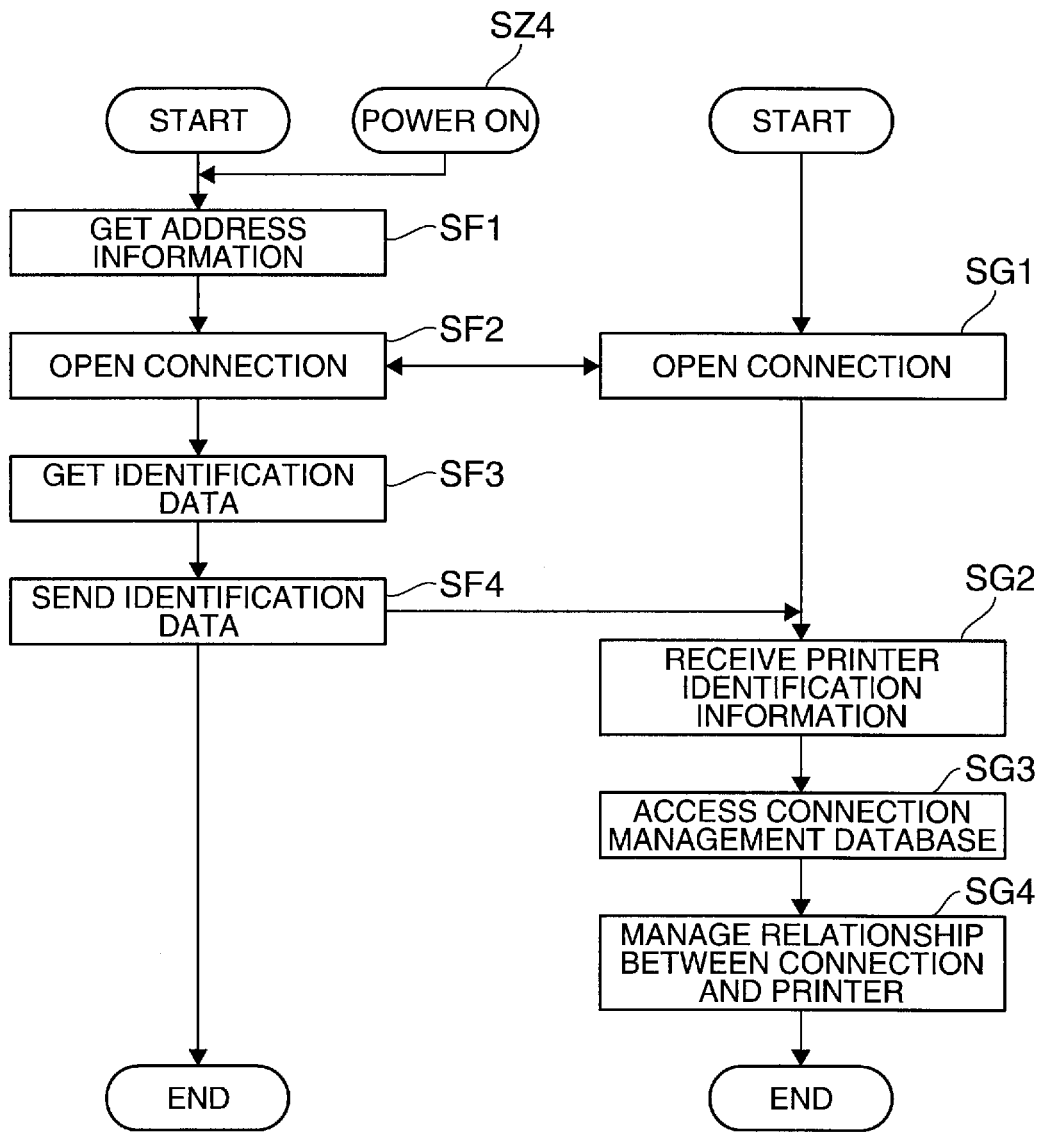
FIGS. 7A and 7B are flow charts showing the operation of the control server and printer.

FIG. 7 is a flow chart showing the operation of the printer 12b and the control server 10b after the printer 12b power turns on, column (A) showing the operation of the printer 12b, and column (B) showing the operation of the control server 10b.

The trigger of the process shown in the flow chart in FIG. 7 is not limited to the power turning on. For example, this process may be triggered by the printer 12b connecting to the network GN and enabling communication, or by an instruction from a user.

Note that in the configuration described below, the printer 12*b* is connected to the local area network LN of the store system 11 in which it is used, and can access the network GN.

The functions of the function blocks of the communication control unit 15*b*, print control unit 17*b*, and status management unit 21*b* of the printer 12*b*, and the communication management unit 25*b*, print data processing unit 27*b* and the status processing unit 29*b* of the control server 10*b*, are rendered as described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 7 (A), when the printer 12*b* power turns on (step SZ4), the communication control unit 15*b* accesses the printer storage unit 19*bb* and gets the address data stored in the printer storage unit 19*bb* (step SF1).

The address data is data including, for example, the address (the domain name in this example) of the control server 10*b* to access when the WebSocket connection CT is established according to the WebSocket protocol. When opening a WebSocket connection CT according to the WebSocket protocol, the client (the printer 12*b* in this example) handshakes with the server (the control server 10*b* in this example) using HTTP (Hypertext Transfer Protocol). When handshaking, the client sends a message containing the address, such as the domain name, of the server, and the address data is data representing this address.

Next, the communication control unit 15*b* establishes a WebSocket connection CT with the communication management unit 25*b* of the control server 10*b* through the communication unit 16*b* and the first connection unit 26*b* based on the address in the address data (step SF2, step SG1). In other words, the printer 12*b* according to this embodiment establishes a WebSocket connection CT when triggered by the power turning on without receiving an instruction from the user or a request from the control server 10*b*.

The communication unit 16*b* and first connection unit 26*b* are WebSocket interfaces enabling data communication based on the WebSocket protocol and methods. These function blocks are instantiated using a WebSocket Socket.IO library, for example.

If the communication control unit 15*b* sends data to the communication unit 16*b*, the data can be sent through the WebSocket connection CT according to the WebSocket protocol.

More specifically, the communication unit 16*b* has functions for processing data that is received according to WebSocket, and sending the data through the WebSocket connection CT based on WebSocket methods. The communication unit 16*b* also has functions for processing data that is received through the WebSocket connection CT according to WebSocket, and sending to the communication control unit 15*b*. The first connection unit 26*b* is similarly configured.

When the WebSocket connection CT is established, the printer 12*b* and control server 10*b* can communicate through an asynchronous, duplex communication link. More specifically, the control server 10*b* can push data to the printer 12*b* through the WebSocket connection CT without receiving a request from the printer 12*b* operating as a client.

Next, the communication control unit 15*b* of the printer 12*b* accesses the printer storage unit 19*bb* and gets the printer identification information stored in the printer storage unit 19*bb* (step SF3). The printer identification information is data identifying the printer 12*b* (referred to below as printer identification information). The printer identification information (external device identification information) is, for example, a serial number assigned to the printer 12*b* when the printer 12*b* is manufactured.

Next, the communication control unit 15*b* sends the printer identification information over the WebSocket connection CT (step SF4).

As shown in FIG. 7 (B), the communication management unit 25*b* of the control server 10*b* receives the printer identification information (step SG2).

Next, the communication management unit 25*b* accesses the connection management database stored in the control server storage unit 28*b* (step SG3). The connection management database is a database relationally storing for the WebSocket connections CT that were established connection identification information (information identifying the communication path) identifying the WebSocket connection CT and the printer identification information of the printer.

Next, the communication management unit 25*b* creates one record in the connection management database. The communication management unit 25*b* then stores in the created record the connection identification information of the WebSocket connection CT established in step SG1 related to the printer identification information indicated by the printer identification information data received in step SG2 identification information (step SG4).

Note that when a WebSocket connection CT is opened, the communication management unit 25*b* generates connection identification information for that connection that is different from the connection identification information of any other WebSocket connection CT that was already opened. The relationship between the WebSocket connections CT and printers 12*b* is managed by the process of step SG4.

The printer 12*b* thus establishes a WebSocket connection CT when triggered by the power turning on without receiving a user instruction or a request from the control server 10*b*. Thus comprised, the user does not need to perform a complicated operation to open a WebSocket connection CT. Special knowledge is also not needed to open a WebSocket connection CT. After the power turns on, the printer 12*b* can also be quickly enabled to execute processes as controlled by the control server 10*b*.

A WebSocket connection CT is thus established between the communication unit 16*b* and first connection unit 26*b*. As a result, a first function unit communication path KT1 based on the WebSocket connection CT is established between the print control unit 17*b* of the printer 12*b*, and the print data processing unit 27*b* of the control server 10*b*. The first function unit communication path KT1 is a logical communication path for data communication between the print control unit 17*b* and print data processing unit 27*b*. The print control unit 17*b* and print data processing unit 27*b* can communicate by asynchronous duplex communication through the first function unit communication path KT1. Asynchronous duplex communication between a function unit and a process unit through the first function unit communication path KT1 is described further below.

When the WebSocket connection CT is established, a second function unit communication path KT2 based on the WebSocket connection CT is established between the status management unit 21b of the printer 12b and the status processing unit 29b of the control server 10b. The second function unit communication path KT2 is a logical communication path for data communication between the status management unit 21b and the status processing unit 29b. The status management unit 21b and status processing unit 29b can communicate by asynchronous duplex communication through the second function unit communication path KT2. Asynchronous duplex communication between a function unit and a process unit through the second function unit communication path KT2 is described further below.

Operation of the management device 14b, control server 10b, and printer 12b when the management device 14b controls printing by the printer 12b is described next.

Figures 8A, 8B, 8C:
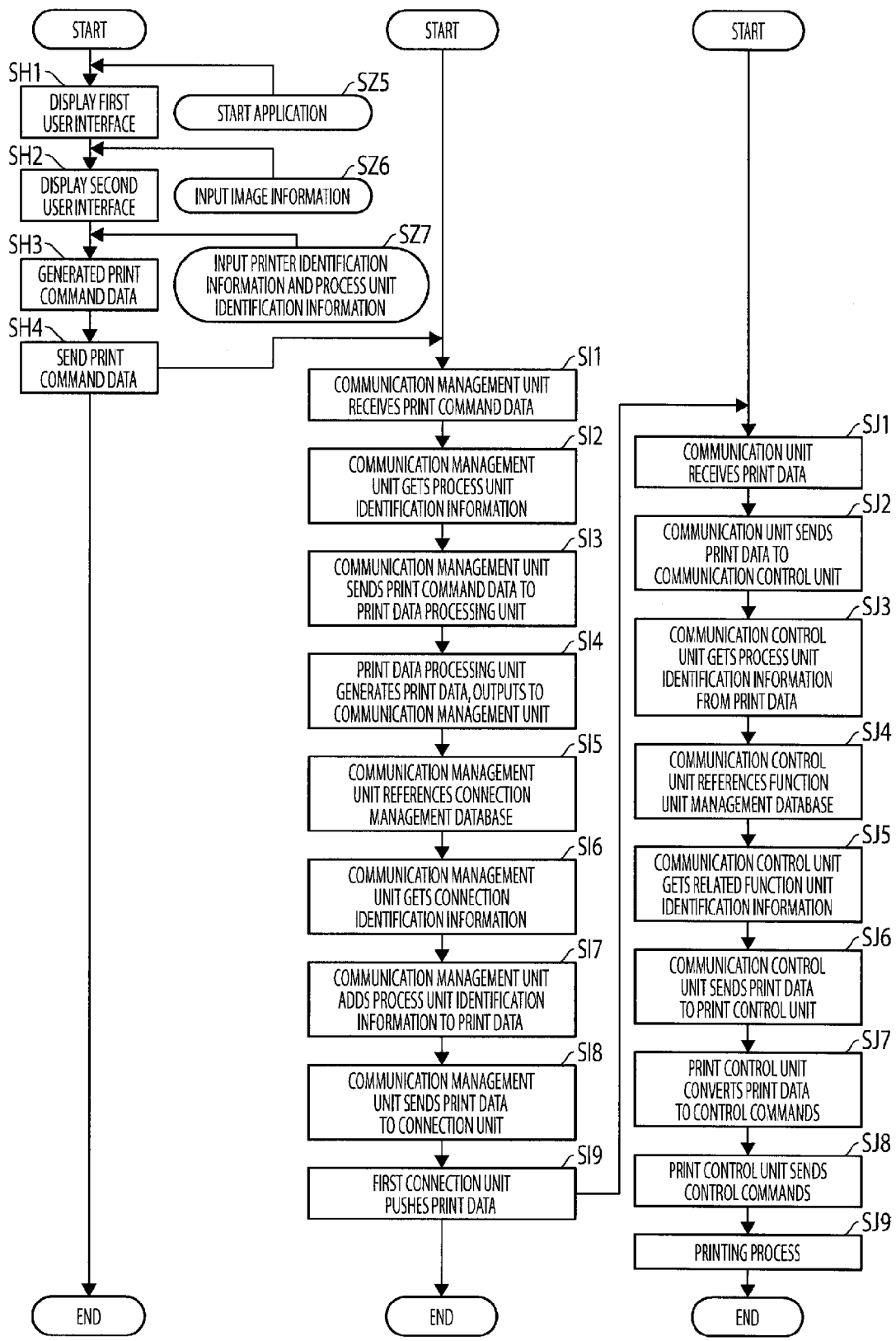
FIGS. 8A-8C are flowcharts showing the operation of the management device, control server and printer.

FIG. 8 is a flow chart showing operation when the management device 14b controls printing by the printer 12b, (A) showing the operation the management device 14b, (B) showing the operation of the control server 10b, and (C) showing the operation of the printer 12b.

As shown in FIG. 8 (A), to print with the printer 12b, the user starts the management device 14b application (step SZ5).

This application provides a user interface for the user to input the print information for the printer 12, information identifying the printer 12b that is to print, and identification information for the process unit to execute a process using the function of the process unit. Based on the input information, the application generates and outputs print information data (first data) to the control server 10b.

When the user starts the application, the management device control unit 40b displays a first user interface through a function of the application on a display panel or other specific display means (step SH1). The first user interface is a user interface for the user to input print information to the printer 12b. The print information includes, for example, the file name where the image data is stored, and information related to where the image is printed on the print medium. The first user interface enables input information used later by the print data processing unit 27b to generate the print data.

After the user inputs the print information to the first user interface and confirms the input (step SZ6), the management device control unit 40b using a function of the application displays a second user interface (step SH2).

The second user interface is a user interface enabling the user to input the printer identification information of the printer 12b to print, and the process unit identification information of the process unit (the print data processing unit 27b in this example) in the process units of the control server 10b to which to send the print information data for executing a process based on the print information data.

As shown in FIG. 6, the control server 10b has two function blocks, the print data processing unit 27b and status processing unit 29b. When not differentiating between the print data processing unit 27b and status processing unit 29b below, these function blocks are generically referred to as process units.

The process unit identification information is the identification information of a process unit in the control server 10b, and a different value is assigned as the process unit identification information for each process unit. Different process unit identification information values are therefore assigned to the print data processing unit 27b and the status processing unit 29b.

The second user interface has input fields for the printer identification information and process unit identification information, and the user inputs the printer identification information and the process unit identification information to the appropriate fields.

After the user inputs the printer identification information and the process unit identification information to the second user interface and confirms the input (step SZ7), the management device control unit 40b executes the following process.

Using a function of the application, the management device control unit 40b generates the print information data based on the information input to the first user interface and the second user interface by a function of the application (step SH3). Printer identification information based on the information input to the first user interface is included in the print information data. The printer identification information and the process unit identification information of the process unit to which to the send the print information data (described below) based on the information input to the second user interface are also included in the print information data.

Next, by a function of the application, the management device control unit 40b sends the print information data to the control server 10b through the communication connection unit 41b (step SH4). In step SH4, the communication connection unit 41b establishes a connection based on a specific communication protocol with the control server 10b as controlled by the management device control unit 40b, and sends the print information data through this connection.

The print information data is first data containing the process unit identification information (first identification information) of the print data processing unit 27b for commanding printing.

As shown in FIG. 8 (B), the communication management unit 25b receives the print information data through the second connection unit 30b (step SI2).

Next, the communication management unit 25b acquires the process unit identification information contained in the print information data (step SI2).

Next, the communication management unit 25b sends the print information data to the process unit identified by the process unit identification information (the print data processing unit 27b in this example) acquired in step SI2 (step SI3).

The communication management unit 25c manages the relationship between process units and process unit identification information, the process unit identification information is a unique value identifying one process unit, and the communication management unit 25b can send data to the process unit corresponding to a particular process unit identification information value.

The print data processing unit 27b generates and outputs print data based on the received print information data to the communication management unit 25b (step SI4).

The print data is an XML (Extensible Markup Language) file containing the print information to be printed by the printer 12b. The information to be printed by the printer 12b, such as the image data and information where the image is to be printed, is included in the print data in XML format. The printer identification information of the printer 12b to be used for printing is also included in the print data. Based on the printer identification information contained in the print information data, the print data processing unit 27b adds the printer identification information to the print data.

The printer identification information may be written in an area where control information is carried, such as the header of the print data, or may be written in a specific tag in the print data.

The communication management unit 25b then accesses the connection management database stored in the control server storage unit 28b (step SI5).

Next, the communication management unit 25b acquires the connection identification information of the WebSocket connection CT related to the received identification information from the connection management database using the printer identification information as the search key (step SI6). The connection identification information acquired here is the connection identification information of the WebSocket connection CT to the printer 12b that is to print.

Next, the communication management unit 25b adds the process unit identification information of the print data processing unit 27b to the print data (step SI7).

Next, the communication management unit 25b sends the print data to the first connection unit 26b corresponding to the connection identification information acquired in step SI6 (step SI8).

Next, the first connection unit 26b pushes the received print data through the WebSocket connection CT to the printer 12b (step SI9).

As shown in FIG. 8 (C), the communication unit 16b then receives the print data through the WebSocket connection CT (step SJ1).

Next, the communication unit 16db sends the print data to the communication control unit 15db (step SJ2).

Next, the communication control unit 15b then acquires the process unit identification information added to the print data (step SJ3).

Next, the communication control unit 15b references the function unit management database (step SJ4).

The function unit management database is a database that relationally stores function unit identification information, which is identification information identifying a particular function unit of the printer 12b, and the process unit identification information of the related process unit. More specifically, the function unit management database is a database for managing identification information of the function units and identification information of the process units for each function unit and process unit that are related to each other.

As shown in FIG. 6, the printer 12b has two function units, the print control unit 17b and the status management unit 21b. When not differentiating between the print control unit 17b and the status management unit 21b below, these function units are referred to as function units.

That a function unit and a process unit are related to each other means that data output by the process unit can be processed by the function unit, and data output by the function unit can be processed by the process unit. The process unit can therefore send data to a related function unit for processing by the function unit based on a function of the function unit. The function unit can likewise send data to the related process unit for processing by the process unit based on a function of the process unit.

In this embodiment, the print control unit 17b of the printer 12b, and the print data processing unit 27b of the control server 10b, are related to each other. The status management unit 21b of the printer 12b is also related to the status processing unit 29b of the control server 10b.

Configurations in which one process unit is related to one function unit, and one process unit is related to plural function units, are conceivable. When plural function units are related to one process unit, the function units may be function units of different printers 12b, or function units of the same printer 12b.

In this example, the function unit identification information of the print control unit 17b, and the process unit identification information of the print data processing unit 27b are relationally stored in the function unit management database. In addition, the function unit identification information of the status management unit 21b, and the process unit identification information of the status processing unit 29b are relationally stored in the function unit management database.

Next, the communication control unit 15b acquires the function unit identification information related to the process unit identification information from the function unit management database using the process unit identification information acquired in step SJ3 as the search key (step SJ5). The function unit identified by the function unit identification information acquired by the communication control unit 15b is the function unit related to the process unit that send the data (print data in this example) received by the communication control unit 15b. More specifically, the function unit identification information acquired by the communication control unit 15b in step SJ5 is the function unit identification information of the function unit that sent the data.

Next, the communication control unit 15b sends the print data to the function unit identified by the function unit identification information acquired in step SJ5 (the print control unit 17b in this example) (step SJ6). The communication control unit 15b manages the relationships between function unit identification information and function units. Therefore, based on the acquired function unit identification information, the communication control unit 15b can send data to the one function unit identified by the function unit identification information.

Next, the print control unit 17b converts the received print data to control commands in the command language of the print unit 18b (step SJ7). More specifically, the print control unit 17b converts the print data, which is an XML file, to control commands that can be interpreted by the print unit 18b.

Next, the print control unit 17b sends the control commands to the print unit 18b (step SJ8).

Next, the print unit 18b prints on the print medium based on the control commands (step SJ9).

As described above, the communication management unit 25b in this embodiment of the invention determines whether to send the received data to the print data processing unit 27b or the status processing unit 29b based on the process unit identification information that was added to the data when data containing process unit identification information added for a process unit is received. As a result, when data is sent from the management device 14b to the control server 10b, the data is sent to the related process unit and is processed appropriately by that function unit.

The control server 10b in this embodiment of the invention can thus control a printer 12b to print when there is a need for the printer 12b to print without receiving a request from the printer 12b. Events that cause the printer 12b to print are events in which predefined conditions are met, such as when an instruction is received from the user, or a request is received from a communicatively connected external device.

This configuration also enables starting printing faster than in a configuration in which the printer 12b intermittently sends a request to the control server 10b, and the control server 10b sends print data in response to such a request when there is a need to print with the printer 12b. Consumption of resources can also be suppressed compared with a configuration in which the control server 10b queues responses to requests.

The process of sending data from the print data processing unit 27b to the print control unit 17b is described above, but the same process can be used when sending data from the status processing unit 29b to the status management unit 21b.

The operation whereby the management device 14b sends print information data (first data) to which the process unit identification information (first identification information) of the print data processing unit 27b is added to the control server 10b is described with reference to the flow chart in FIG. 8.

The following process is used when the management device 14b sends control data (second data) to which the process unit identification information (second identification information) of the status processing unit 29b is added to the control server 10b is described below.

More specifically, the management device control unit 40b of the management device 14b generates control data to control the control server storage unit 28b. Next, the management device control unit 40b adds the process unit identification information of the status processing unit 29b to the generated control data. Next, the management device control unit 40b sends the control data to which the process unit identification information of the status processing unit 29b was added to the control server 10b.

The communication management unit 25b of the control server 10b acquires the process unit identification information that was added to the control data. Next, based on the acquired process unit identification information, the communication management unit 25b sends the control data to the process unit identified by the process unit identification information (the status processing unit 29b in this example).

The status processing unit 29b that received the control data executes the related process based on the control data.

The communication management unit 25b in this embodiment of the invention can therefore send data received from the management device to the related process unit based on the process unit identification information. The related process unit then executes the corresponding process based on the received data.

Communication between the status processing unit 29b of the control server 10b and the status management unit 21b of the printer 12b after the WebSocket connection CT is established is described next using the example of the status management unit 21b sending data.

Figure 9A:
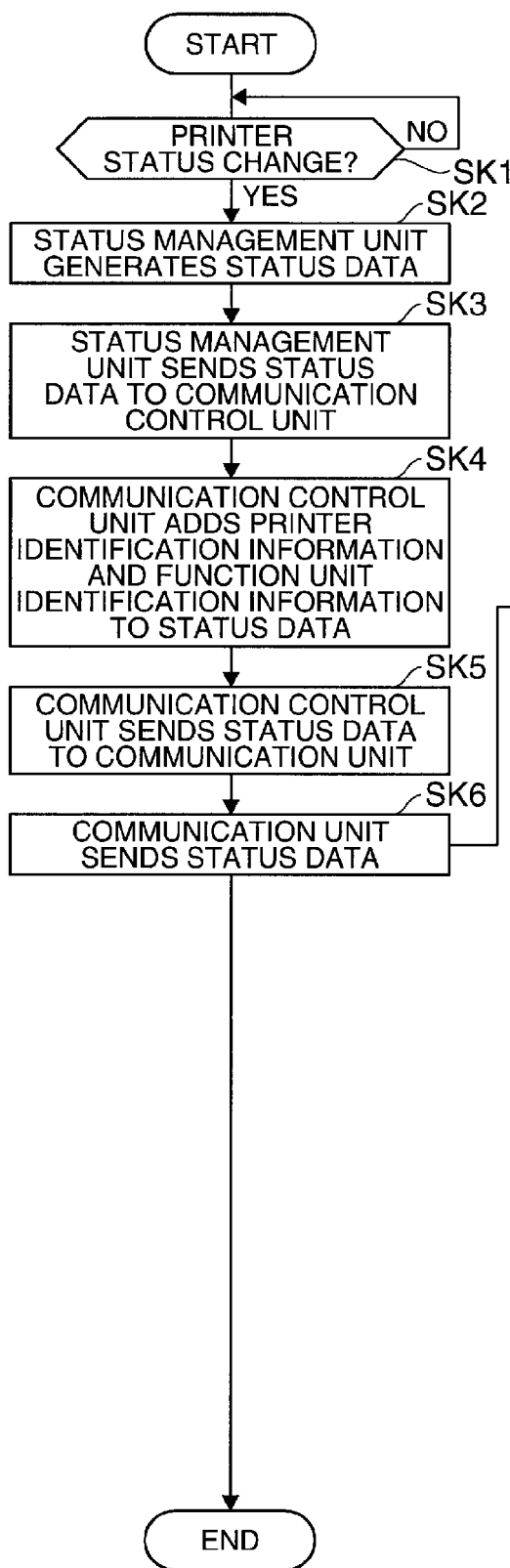
FIGS. 9A and 9B are flow charts showing the operation of the control server and printer.
Figure 9B:
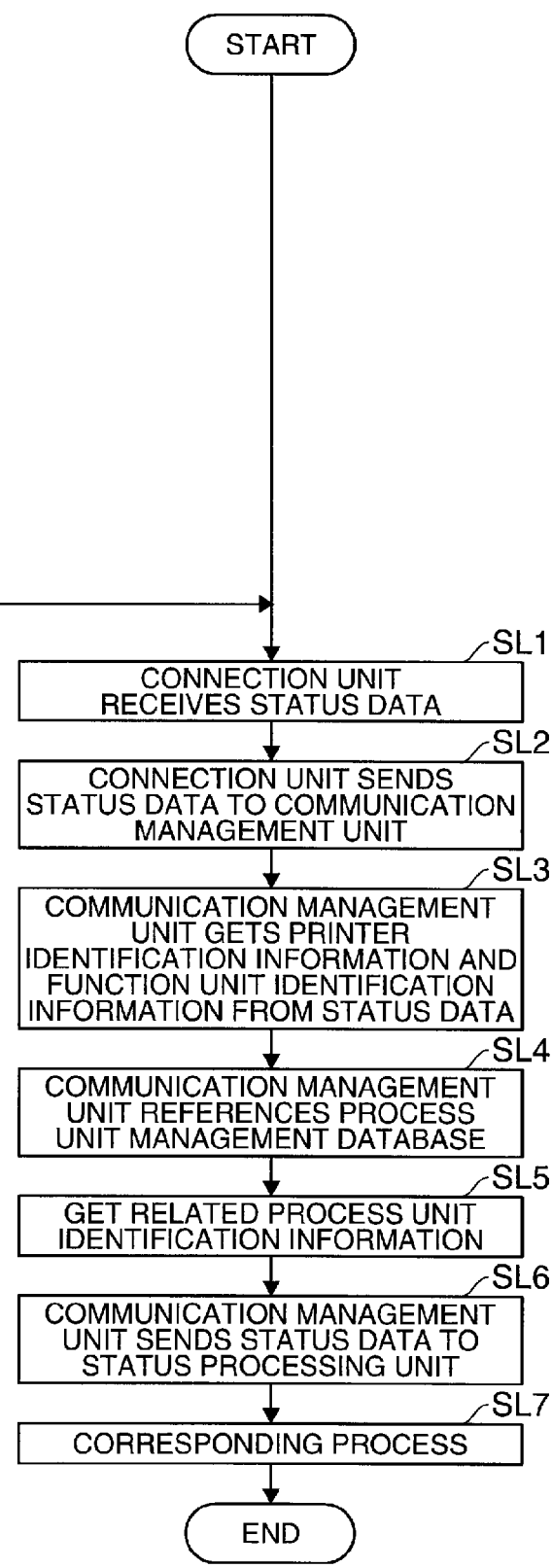

FIG. 9 is a flow chart showing the operation of the printer 12b and the control server 10b when the status of the printer 12b changes, column (A) showing the operation of the printer 12b, and column (B) showing the operation of the control server 10b.

As shown in FIG. 9 (A), the status management unit 21b of the printer 12b monitors the detection value of the status monitor 22b, and monitors whether or not the printer 12b status has changed (step SK1). In step SK1, the status management unit 21b monitors if the cover of the printer 12b changed from open to closed, or from closed to open, for example.

If a change in the status of the printer 12b is detected (step SK1 returns YES), the status management unit 21b generates status data representing information representing the status after the status changed in a predetermined format (step SK2).

Next, the status management unit 21b sends the resulting status data to the communication control unit 15b (step SK3).

Next, the communication control unit 15b adds the printer identification information and the function unit identification information of the status management unit 21b to the received status data (step SK4).

Note that in step SK4 the communication control unit 15b references the printer identification information stored in the printer storage unit 19bb, and based on this data adds the printer identification information to the status data. The communication control unit 15b also manages the function unit identification information of the function units that can receive data, and when data is received from one function unit, can acquire the function unit identification information of that one function unit.

Next, the communication control unit 15b sends the status data to the communication unit 16b (step SK5).

Next, the communication unit 16b sends the status data through the WebSocket connection CT to the control server 10b (step SK6).

As shown in FIG. 9 (B), the first connection unit 26b receives the status data through the WebSocket connection CT (step SL1).

Next, the first connection unit 26b sends the received status data to the communication management unit 25b (step SL2).

The communication management unit 25b then acquires the printer identification information and function unit identification information added to the status data (step SL3).

Next, the communication management unit 25b references the process unit management database stored in the print unit 18b (step SL4).

The process unit management database is a database that relationally stores process unit identification information to a set of printer identification information and function unit identification information.

Next, the communication control unit 15b searches the process unit management database using the printer identification information and function unit identification information acquired in step SL3 as the search key, and retrieves the process unit identification information related to the identification information set (step SL5). The process unit identification information acquired at this time by the communication control unit 15b is the process unit identification information of the process unit that sent the data received through the WebSocket connection CT.

Next, the communication management unit 25b sends the status data to the process unit identified by the process unit identification information acquired in step SL5 (the status processing unit 29b in this example) (step SL6). Note that the communication management unit 25b manages the process unit identification information for the process units that can send data.

The status processing unit 29b then runs a corresponding process based on the received status data (step SL7).

The communication management unit 25b of the control server 10b in this embodiment of the invention can therefore change the process unit to which data received from the printer 12b is sent based on the printer identification information and function unit identification information contained in the received data. As a result, data sent by a function unit of the printer 12b is sent through the Web- Socket connection CT to the control server 10b, and is then sent by the control server 10b to the appropriate process unit.

Triggered by a change in the status of the printer 12b, the status management unit 21b of the printer 12b in this embodiment of the invention can send the status data to the status processing unit 29b through the WebSocket connection CT.

The process executed when sending data from the status management unit 21b to the status processing unit 29b is described above, but the same process is used to send data from the print control unit 17b to the print data processing unit 27b.

As described above, the print control system 1b according to this embodiment of the invention has a printer 12b, a management device 14b, and a control server 10b (print control device).

The printer 12b includes a print unit 18b that prints, a print control unit 17b that controls the print unit 18b, and a function unit (status management unit 21b) with a difference function than the print control unit 17b.

The management device 14b transmits print information data (first data) containing the process unit identification information of the print data processing unit 27b and instructing printing, and control data (second data) containing the process unit identification information of the status processing unit 29b and instructing processing.

The control server 10b includes a first connection unit 26b that communicates with the printer 12b; a second connection unit 30b (reception unit) that receives print information data and control data from the management device 14b; a print data processing unit 27b that generates print data based on the print information data; a status processing unit 29b that executes a process based on the control data; and a communication management unit 25b that sends the print information data to the print data processing unit 27b based on the process unit identification information of the print data processing unit 27b that was added to the print information data received by the second connection unit 30b.

Thus comprised, the print information data sent from the management device 14b to the control server 10b is sent to the print data processing unit 27b in the control server 10b, and print data is generated based on the print information data by the print data processing unit 27b. The print data is then sent by the first connection unit 26b to the printer 12b. More specifically, this configuration can make the print control system 1b and the control server 10b compatible with configurations in which the control server 10b has a plurality of process units, and configurations in which the control server 10b and printer 12b communicate over a network GN.

The printer 12b has printer identification information, and the communication management unit 25b selects the printer 12b to which to send the print data based on the printer identification information.

Thus comprised, the control server 10b can send print data to the related printer 12b based on the printer identification information.

The first connection unit 26b of the control server 10b establishes an asynchronous duplex WebSocket connection CT to communicate with the printer 12b, and the communication management unit 25b of the control server 10b generates connection identification information identifying the WebSocket connection CT, and based on this connection identification information selects the WebSocket connection CT through which to send the print data.

Thus comprised, the control server 10b sends print data by asynchronous duplex communication to the printer 12b. As a result, the control server 10b can send data to the printer 12b through the WebSocket connection CT at any time. Therefore, when a trigger causing the printer 12b to execute a process based on the print data occurs, the control server 10b sends print data through the WebSocket connection CT to the printer 12b, and the printer 12b can be controlled to print based on the print data. Thus comprised, when the control server 10b is connected to plural printers 12b through plural WebSocket connections CT, the control server 10b can send print data to the related printer 12b through the related WebSocket connection CT based on the connection identification information.

The invention is described above with reference to a preferred embodiment thereof, but the invention is not limited thereto and can be modified and adapted in many ways without departing from the scope of the accompanying claims.

In the embodiments described above, the printer 12b is installed as part of a store system 11 deployed in a business. However, the printer 12b is not limited to being part of a store system 11, and can be used in other systems.

In addition, print data is sent as an XML file from the control server 10b to the printer 12b in the foregoing embodiment, but the data format of the print data is not limited to XML. The print data may be data created in another markup language, or control commands in the command language of the print unit 18b.

Embodiment 3

A third embodiment of the invention is described next.

The print control system 1c according to the third embodiment of the invention includes a control server 10c (print control device), a printer 12c, and a management device 14c. The control server 10c, printer 12c, and management device 14c connect over a network GN in the same way as the control server 10, printer 12, and management device 14 in the first embodiment. A communication path established between the control server 10c and printer 12c is the same as the communication path established between the control server 10 and printer 12 in FIG. 2.

Figure 10:
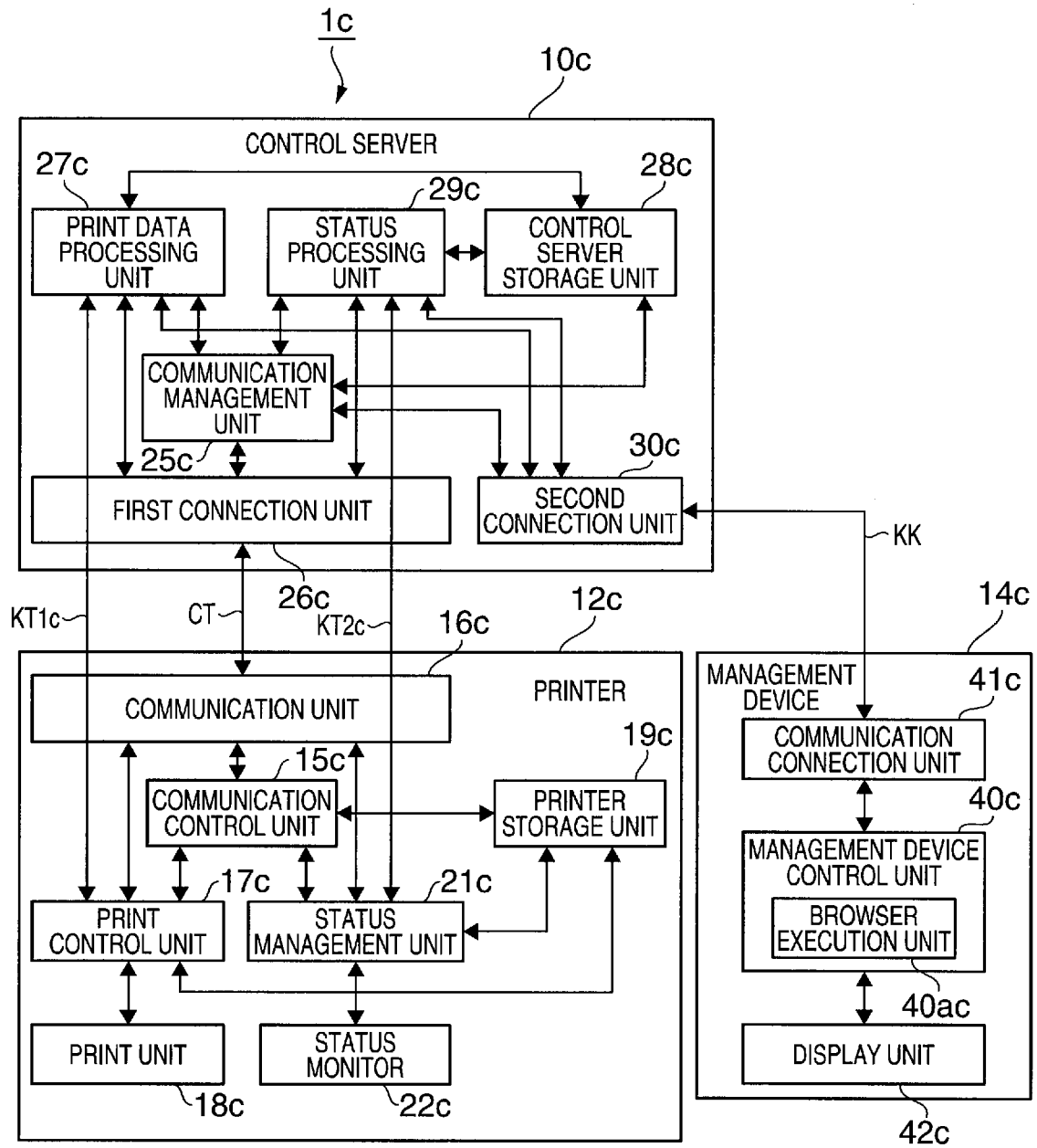
FIG. 10 is a block diagram showing the functional configuration of a printer, control server, and management device according to a third embodiment of the invention.

FIG. 10 is a block diagram showing the functional configuration of the printer 12c, the control server 10c, and the management device 14c.

As shown in FIG. 10, the printer 12c has a communication control unit 15c, a communication unit 16c, a print control unit 17c, a print unit 18c, a status management unit 21c, a status monitor 22c, and a printer storage unit 19cb.

The functions of the communication control unit 15c, communication unit 16c, print control unit 17c, and the status management unit 21c are described further below.

The print unit 18c includes mechanisms related to printing, such as a print mechanism that prints on print media, a conveyance mechanism that conveys the print media, and a cutting mechanism that cuts the print media, and control boards related to controlling the mechanisms.

The status monitor 22c includes sensors, devices, or application, for example, that detects if the printer 12c cover is open or closed, and sensors for detecting the status of the printer 12c, such as if an error occurs, and outputs the result to the status management unit 21c.

The printer storage unit 19c is nonvolatile memory, and stores data. Address data, printer identification information data, and a function unit management database as further described below are stored in the printer storage unit 19c.

When not differentiating between the print control unit 17c and status management unit 21c below, these function blocks are generically referred to as function units.

The printer 12c has two function units, the print control unit 17c and status management unit 21c.

As shown in FIG. 10, the control server 10c includes a communication management unit 25c, first connection unit 26c (connection unit), a print data processing unit 27c, a status processing unit 29c, a control server storage unit 28c (storage unit), and a second connection unit 30c.

The functions of the communication management unit 25c, first connection unit 26c, print data processing unit 27c, and status processing unit 29c are described below.

The control server storage unit 28c has nonvolatile memory, and stores data. A connection management database and a process unit management database are stored in the control server storage unit 28c and described below.

The second connection unit 30c communicates by HTTP with the management device 14c as controlled by the communication management unit 25c. More specifically, a web browser is installed on the management device 14c, and the second connection unit 30c connects by HTTP through connection KK with the management device 14c with the control server 10c as the server and the management device 14c as a client device.

When not differentiating between the print data processing unit 27c and the status processing unit 29c below, these function blocks are referred to generically as process units.

The control server 10c has two process units, the print data processing unit 27c and status processing unit 29c.

The management device 14c includes a management device control unit 40c, a communication connection unit 41c, and a display unit 42c. The management device control unit 40c includes CPU, ROM, RAM, and other peripheral circuits, and controls the management device 14c. One function block of the management device 14c is a browser execution unit 40ac. The browser execution unit 40ac is a function block rendered by a function of a web browser.

The communication connection unit 41c communicates by HTTP as controlled by the management device control unit 40c with the control server 10c through connection KK.

The display unit 42c has an LCD or other type of display panel, and displays images on the display panel as controlled by the management device control unit 40c.

Note that FIG. 10 shows the relationship between the control server 10c and one printer 12c connected to the control server 10c. When plural printers 12c are connected to the control server 10c, the control server 10c has the same number of WebSocket interfaces as there are printers 12c, establishes a WebSocket connection CT with each printer 12c, and communicates by WebSocket protocol through the connections to each printer 12c.

FIG. 10 also shows the relationship between the control server 10c and one management device 14c connected to the control server 10c. When management devices 14c are connected to the control server 10c, the control server 10c has the same number of second connection units 30c as there are management device 14c, establishes a connection KK with each management device 14c, and communicates with each management device 14c through the connection KK.

The operation of the printer 12c and control server 10c when the printer 12c power turns on is described next.

Figures 11A, 11B:
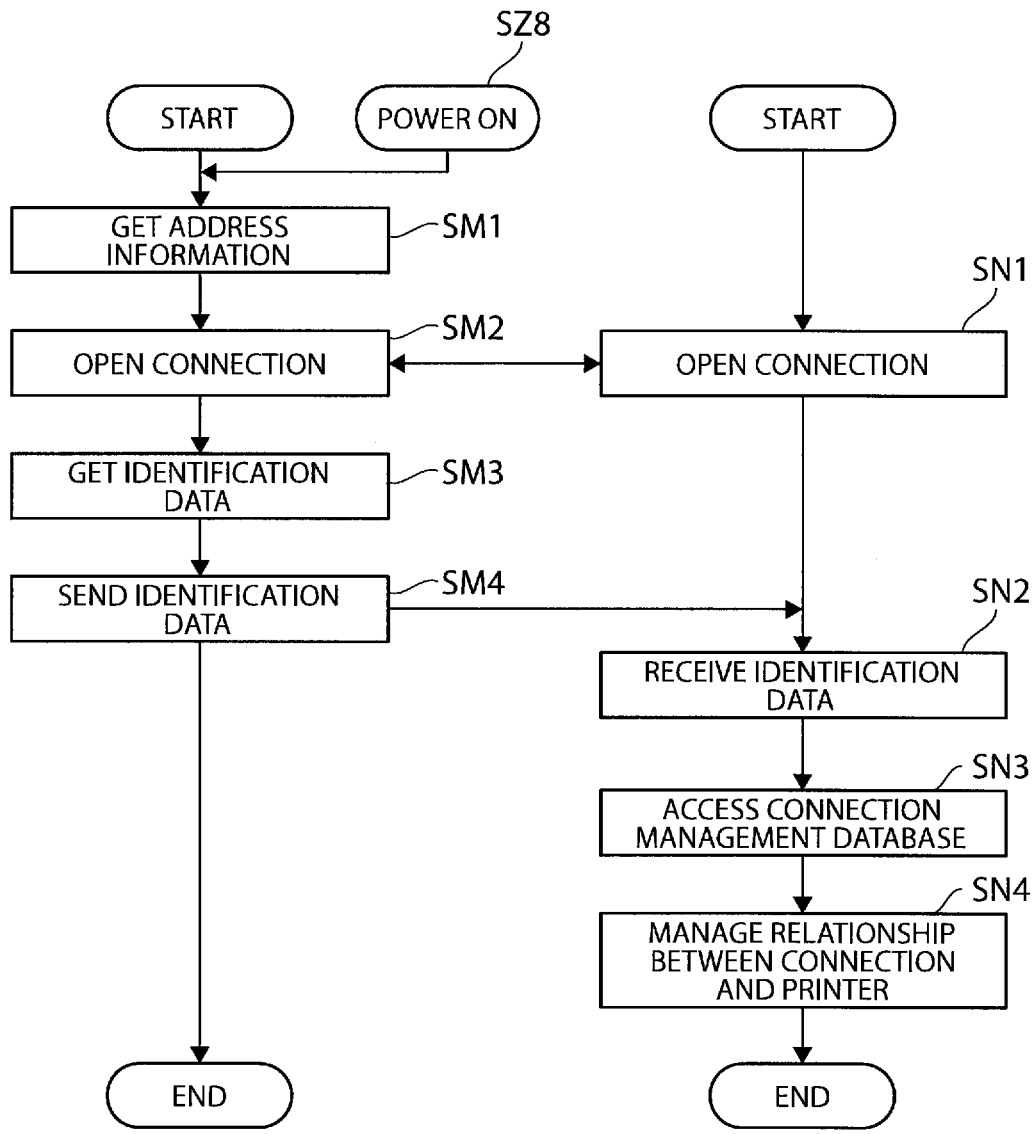
FIGS. 11A and 11B are flow charts showing the operation of the control server and printer.

FIG. 11 is a flow chart showing the operation of the printer 12c and the control server 10c after the printer 12c power turns on, column (A) showing the operation of the printer 12c, and column (B) showing the operation of the control server 10c.

The trigger of the process shown in the flow chart in FIG. 11 is not limited to the power turning on. For example, this process may be triggered by the printer 12c connecting to the network GN and enabling communication, or by an instruction from a user.

Note that in the configuration described below, the printer 12c is connected to the local area network LN of the store system 11 in which it is used, and can access the network GN.

The functions of the function blocks of the communication control unit 15c, print control unit 17c, and configuration control unit 23c of the printer 12c, and the communication management unit 25c, print data processing unit 27c and the configuration processing unit 31c of the control server 10c, are rendered as described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 11 (A), when the printer 12c power turns on (step SZ8), the communication control unit 15c accesses the printer storage unit 19c and gets the address data stored in the printer storage unit 19c (step SM1).

The address data is the address (such as the domain name, IP address, path name, port information) of the control server 10c accessed when establishing the WebSocket connection CT. When opening a WebSocket connection CT according to the WebSocket protocol, the client (the printer 12c in this example) handshakes with the server (the control server 10c in this example) using HTTP (Hypertext Transfer Protocol). When handshaking, the client sends a message containing the address of the server, and the address data is the address to be accessed.

Next, the communication control unit 15c establishes a WebSocket connection CT with the communication management unit 25c of the control server 10c through the communication unit 16c and the first connection unit 26c based on the address in the address data 19c (step SM2, step SN1). In other words, the printer 12c according to this embodiment establishes a WebSocket connection CT when triggered by the power turning on without receiving an instruction from the user or a request from the control server 10c.

The communication unit 16c and first connection unit 26c are WebSocket interfaces enabling data communication based on the WebSocket protocol and methods. These function blocks are instantiated using a WebSocket Socket.IO library, for example.

More specifically, the communication unit 16c has functions for processing data that is received from the communication control unit 15c, the print control unit 17c, or the configuration control unit 23c according to the WebSocket protocol, and sending the data through the WebSocket connection CT based on WebSocket methods. The communication unit 16c also has functions for processing data that is received through the WebSocket connection CT according to WebSocket, and outputting to the communication control unit 15c. The first connection unit 26c is similarly configured.

Once the WebSocket connection CT is established, the printer 12c and control server 10c can communicate through an asynchronous, duplex communication link. The control server 10c can therefore push data to the printer 12c by WebSocket communication through the WebSocket connection CT without receiving a request from the printer 12c operating as a client device. The printer 12c can likewise push data to the control server 10c through the WebSocket connection CT.

Next, the communication control unit 15c of the printer 12c accesses the printer storage unit 19c and gets the printer identification information data stored in the printer storage unit 19c (step SM3). The printer identification information data is data representing the identification information of the printer 12c (information identifying the printer 12c, referred to below as printer identification information). The printer identification information is, for example, a serial number assigned to the printer 12c when the printer 12c is manufactured.

Next, the communication control unit 15c outputs the acquired printer identification information data (step SM4).

As shown in FIG. 11 (B), the communication management unit 25c of the control server 10c receives the printer identification information data through the first connection unit 26c (step SN2).

Next, the communication management unit 25c accesses the connection management database stored in the control server storage unit 28c (step SN3). The connection management database is a database relationally storing for the WebSocket connections CT that were established connection identification information identifying the WebSocket connection CT and the printer identification information of the printer.

Next, the communication management unit 25c creates one record in the connection management database. The communication management unit 25c then stores in the created record the connection identification information of the WebSocket connection CT established in step SN1 related to the printer identification information indicated by the printer identification information data received in step SN2 identification information (step SN4). Note that when a WebSocket connection CT is opened, the communication management unit 25c generates connection identification information for that connection that is different from the connection identification information of any other WebSocket connection CT that was already opened. The relationship between the WebSocket connections CT and printers 12c is managed by the process of step SN4 on the control server 10c.

In this embodiment of the invention, a WebSocket connection CT is established triggered by the power turning on without receiving a user instruction or a request from the control server 10c. Thus comprised, the user does not need to perform a complicated operation to open a WebSocket connection CT. Special knowledge is also not needed to open a WebSocket connection CT. After the power turns on, the printer 12c can also be automatically enabled to execute processes as controlled by the control server 10c.

A WebSocket connection CT is thus established between the communication unit 16c and first connection unit 26c. As a result, a first function unit communication path KT1c based on the WebSocket connection CT is established between the print control unit 17c of the printer 12c, and the print data processing unit 27c of the control server 10c. The first function unit communication path KT1c is a logical communication path for data communication between the print control unit 17c and print data processing unit 27c. The print control unit 17c and print data processing unit 27c can communicate by asynchronous duplex communication through the first function unit communication path KT1c. Asynchronous duplex communication between a function unit and a process unit through the first function unit communication path KT1c is described further below.

When the WebSocket connection CT is established, a second function unit communication path KT2c based on the WebSocket connection CT is established between the status management unit 21c of the printer 12c and the status processing unit 29c of the control server 10c. The second function unit communication path KT2c is a logical communication path for data communication between the status management unit 21c and the status processing unit 29c. The status management unit 21c and status processing unit 29c can communicate by asynchronous duplex communication through the second function unit communication path KT2c. Asynchronous duplex communication between a function unit and a process unit through the second function unit communication path KT2c is described further below.

Operation of the management device 14c, control server 10c, and printer 12c when the management device 14c controls printing by the printer 12c is described next.

FIG. 12 is a flow chart showing operation when the management device 14c controls printing by the printer 12c, (A) showing the operation the management device 14c, (B) showing the operation of the control server 10c, and (C) showing the operation of the printer 12c.

Note that the operation described below is executed by the browser execution unit 40ac of the management device control unit 40c of the management device 14c by means of an application that runs on the browser, or a function of a script in an HTML drawing file, for example.

Asynchronous duplex communication between the print data processing unit 27c of the control server 10c and the print control unit 17c of the printer 12c through a first function unit communication path KT1c is described below using the print data processing unit 27c outputting data (print data in this example) as an example with reference to the flow chart shown in FIG. 12.

As shown in FIG. 12 (A), to print with the printer 12c, the user starts a browser on the management device 14c, and inputs a command to access a specific URL (step SZ9). This URL is the URL accessed to display a user interface for inputting printing information described below (referred to as the print interface) in a browser window. This specific URL is previously made known to the user. The URL may be a URL managed by the control server 10d, or a URL managed by another server.

Based on the command in step SZ9, the browser execution unit 40ac of the management device 14c accesses the specific URL, and requests the control server 10c for the drawing file related to displaying the print interface (step SO1). This drawing file is a file written in HTML (HyperText Markup Language) or other markup language, for example, and is a file for displaying a user interface in a browser window on the management device 14c.

The browser execution unit 40ac then displays the print interface based on the drawing file acquired in response to the request of step SO1 (step SO2).

The print interface is a user interface enabling the user to input the print information to print from the printer 12c. The print information includes, for example, the file name where image data is stored, and information related to where the image is printed on the print medium. The print interface is configured so that the information used by the print data processing unit 27c of the control server 10c to generate the print data can be input.

The print interface also enables the user to input the process unit identification information of the process unit (the print data processing unit 27c in this example) in the process units of the control server 10c to which to send the print information data described below for processing based on the print information data.

The process unit identification information is the identification information of a process unit in the control server 10c, and a different value is assigned as the process unit identification information for each process unit. Different process unit identification information is therefore assigned to the print data processing unit 27c and the status processing unit 29c.

The print interface has input fields for the printer identification information and process unit identification information, and the user inputs the print information, printer identification information and the process unit identification information to the appropriate fields.

When the user has input the print information, printer identification information, and process unit identification information to the print interface and confirms input (step SZ10), the browser execution unit 40ac runs the following process.

The browser execution unit 40ac then generates the printer information data (step SO3). The printer information data is data in a specific format containing the print information, printer identification information, and process unit identification information based on the input to the print interface. The printer information data is in a format enabling the print data processing unit 27c of the control server 10c to execute a process based on the data.

Next, the browser execution unit 40ac controls the communication connection unit 41c and sends the printer information data to the control server 10c (step SO4). In step SO4, the communication connection unit 41c opens a connection KK by a HTTP handshake with the control server 10c, for example, and sends the printer information data through the connection KK.

In this embodiment of the invention the user inputs the process unit identification information to the print interface, and the process unit identification information input by the user is added to the printer information data. The invention is not so limited, and a configuration in which the management device control unit 40c determines what process unit is to process the data sent to the control server 10c, and adds the process unit identification information of that process unit to the transmitted data is also conceivable. For example, the management device control unit 40c may manage the relationship between the type of data that is transmitted and the process unit that processes the data, and based on this managed relationship determine the process unit identification information to add to the data that is sent.

As shown in FIG. 12 (B), the communication management unit 25c controls the second connection unit 30c to receive the print information data (step SP1).

Next, the communication management unit 25c acquires the process unit identification information contained in the print information data (step SP2).

Next, the communication management unit 25c sends the print information data to the process unit (print data processing unit 27c in this example) identified by the process unit identification information acquired in step SP2 (step SP3).

The communication management unit 25c manages the relationships between process unit and process unit identification information, and sends data to the process unit corresponding to the process unit identification information based on the value of the process unit identification information.

The print data processing unit 27c generates print data based on the received print information data (step SP4). The print data is an XML (eXtensible Markup Language) file containing the print information to be printed by the printer 12c. The print data includes the information to be printed by the printer 12c, including image data and information identifying the location of the images on the print medium, in XML format.

The printer identification information of the printer 12c to use for printing is also contained in the print data. The print data processing unit 27c adds the printer identification information to the print data based on the printer identification information contained in the print information data.

The printer identification information may be written in an area where control information is carried, such as the header of the print data, or may be written in a specific tag in the print data.

The print data processing unit 27c then accesses the connection management database stored in the control server storage unit 28c (step SP5).

Next, the print data processing unit 27c acquires the connection identification information of the WebSocket connection CT related to the received identification information from the connection management database using the printer identification information as the search key (step SP6). The connection identification information acquired here is the connection identification information of the WebSocket connection CT to the printer 12c that is to print.

Next, the print data processing unit 27c adds the process unit identification information of the print data processing unit 27c to the print data (step SP7). The print data processing unit 27c manages the process unit identification information assigned to the print data processing unit 27c.

Next, the print data processing unit 27c sends the print data to the first connection unit 26c corresponding to the connection identification information acquired in step SP6 (step SP8).

The first connection unit 26c then pushes the received print data through the WebSocket connection CT to the printer 12c (step SP9).

As shown in FIG. 12 (C), the communication unit 16c then receives the print data through the WebSocket connection CT (step SQ1).

Next, the communication unit 16c sends the print data to the communication control unit 15c (step SQ2).

The communication control unit 15c then acquires the process unit identification information added to the print data (step SQ3).

Next, the communication control unit 15c references the function unit management database (step SQ4).

The function unit management database is a database relationally storing the function unit identification information, which is identification information for each function unit of the printer 12c, and the process unit identification information of the process unit related to the function unit identification information. The function unit management database is also a database for relationally managing the identification information of the function unit and the identification information of the process unit for each function unit and process unit that correspond to each other.

Function unit identification information is identification information identifying a particular function unit of the printer 12c, and a different value is assigned as the function unit identification information for each function unit. A different value is therefore assigned as the function unit identification information of the print control unit 17c and the status management unit 21c.

A relation or correspondence between a function unit and process unit means that the function unit can process the data sent by the related process unit, and the process unit can process data sent by the related function unit. The process unit can therefore send data to the corresponding function unit for processing by the function unit using a function of the function unit. The function unit can also send data to the corresponding process unit for processing by the process unit using a function of the process unit. In this example, the print control unit 17c of the printer 12c is related to the print data processing unit 27c of the control server 10c. The status management unit 21c of the printer 12c is also related to the status processing unit 29c of the control server 10c.

Configurations in which one process unit is related to one function unit, and one process unit is related to plural function units, are conceivable. When plural function units are related to one process unit, the function units may be function units of different printers 12c, or function units of the same printer 12c.

In this example, the function unit identification information of the print control unit 17c, and the process unit identification information of the print data processing unit 27c are relationally stored in the function unit management database. In addition, the function unit identification information of the status management unit 21c, and the process unit identification information of the status processing unit 29c are relationally stored in the function unit management database.

Next, the communication control unit 15c acquires the function unit identification information related to the process unit identification information from the function unit management database using the process unit identification information acquired in step SJ3 as the search key (step SJ5).

The function unit identified by the function unit identification information acquired by the communication control unit 15c is the function unit related to the process unit that sends the data (print data in this example) received by the communication control unit 15c. More specifically, the function unit identification information acquired by the communication control unit 15c in step SJ5 is the function unit identification information of the function unit that sent the data.

Next, the communication control unit 15c sends the print data to the function unit identified by the function unit identification information acquired in step SQ5 (the print control unit 17c in this example) (step SQ6). The communication control unit 15c manages the relationships between function unit identification information and function units. Therefore, based on the acquired function unit identification information, the communication control unit 15c can send data to the one function unit identified by the function unit identification information.

Next, the print control unit 17c converts the received print data to control commands in the command language of the print unit 18c (step SQ7). More specifically, the print control unit 17c converts the print data, which is an XML file, to control commands that can be interpreted by the print unit 18c.

Next, the print control unit 17c sends the control commands to the print unit 18c (step SQ8).

Next, the print unit 18c prints on the print medium based on the control commands (step SQ9).

As described above, when data with process unit identification information added for a process unit is received, the communication management unit 25c in this embodiment of the invention determines whether to send the received data to the print data processing unit 27c or the status processing unit 29c based on the process unit identification information that was added to the data. As a result, when data is sent from the management device 14c to the control server 10c, the data is sent to the related process unit and is processed appropriately by that process unit.

The control server 10c in this embodiment of the invention can thus control a printer 12c to print when there is a need for the printer 12c to print without receiving a request from the printer 12c. Events that cause the printer 12c to print are events in which predefined conditions are met, such as when an instruction is received from the user, or a request is received from a communicatively connected external device.

This configuration also enables starting printing faster than in a configuration in which the printer 12c intermittently sends a request to the control server 10c, and the control server 10c sends print data in response to such a request when there is a need to print with the printer 12c. Consumption of resources can also be suppressed compared with a configuration in which the control server 10c queues responses to requests.

The process of sending data from the print data processing unit 27c to the print control unit 17c through the first function unit communication path KT1c is described above, but the same process can be used when sending data from the status processing unit 29c to the status management unit 21c using the second function unit communication path KT2c.

After printing by the print unit 18c, the printer 12c, control server 10c, and management device 14c execute the following process.

The print control unit 17c generates print result data based on the result of printing by the print unit 18c. The print result data is data indicating, for example, if printing by the print unit 18c was successful or failed, and the cause of the failure if printing fails.

The print control unit 17c sends the print result data to the print data processing unit 27c through the first function unit communication path KT1c of the WebSocket connection CT. Sending data from the print control unit 17c to the print data processing unit 27c using the first function unit communication path KT1c is done using the same method as sending data from status management unit 21c to the status processing unit 29c using the second function unit communication path KT2c described below, and further detailed description thereof is omitted here.

The print data processing unit 27c sends the received print result data to the management device 14c that sent the print command data. For example, the print data processing unit 27c manages the connection KK used to send the print command data, and sends the print result data to the management device 14c using this connection KK. The browser execution unit 40cd of the management device control unit 40c of the management device 14c runs a corresponding process based on the received print result data. For example, the management device control unit 40c may display information representing the print result on the display unit 42c and report the print result to the user.

Operation of the management device 14c, control server 10c, and printer 12c when the management device 14c gets the status of a printer 12c connected to the control server 10c is described next.

Figures 14A, 14B, 14C:
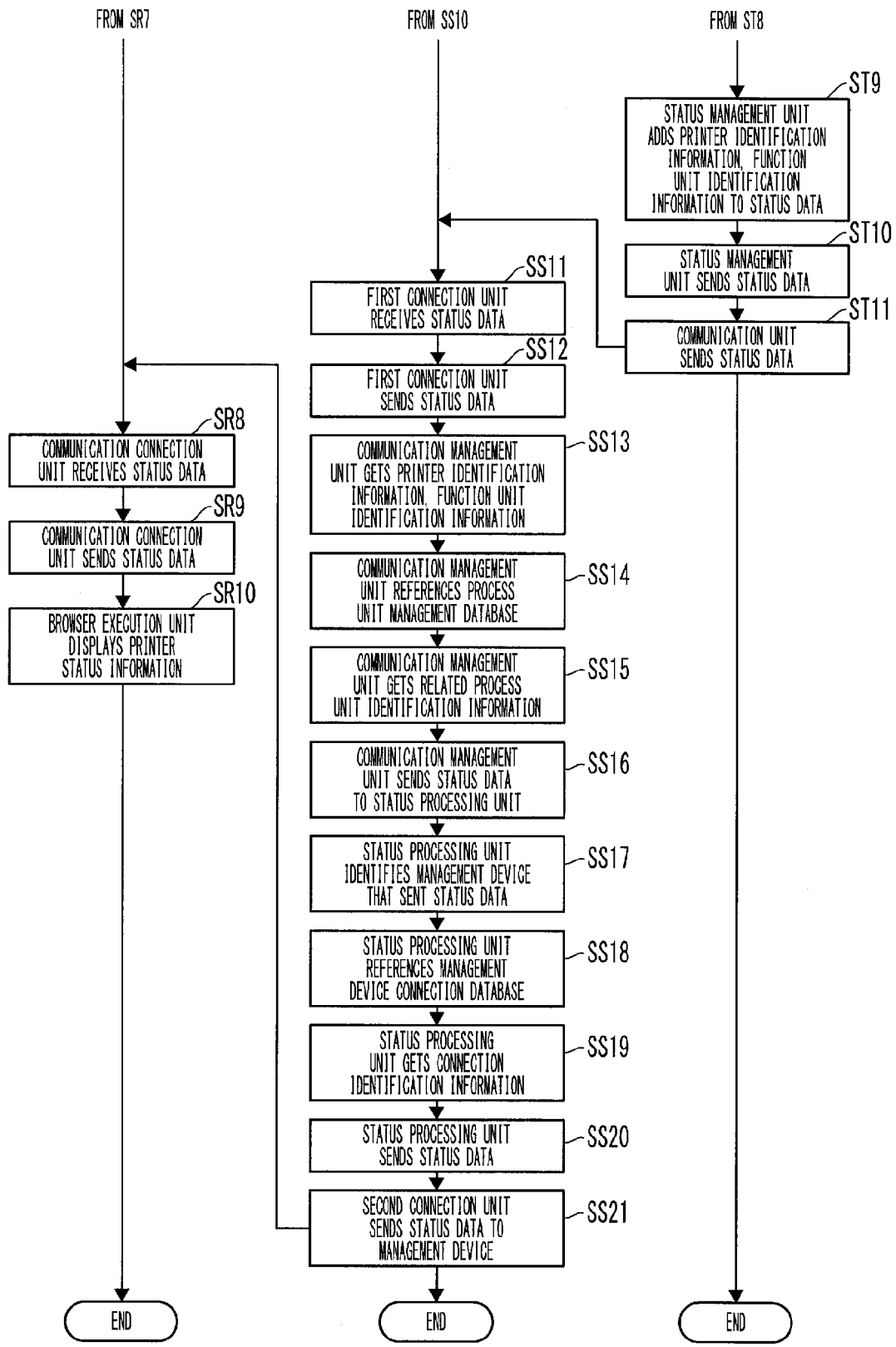
FIGS. 14A-14C are flow charts showing the operation of the management device, control server and printer.

FIG. 13 and FIG. 14 are a flow chart showing the operation of the devices during this process, (A) showing the operation the management device 14c, (B) showing the operation of the control server 10c, and (C) showing the operation of the printer 12c.

Asynchronous duplex communication between the status processing unit 29c of the control server 10c and the status management unit 21c of the printer 12c through second function unit communication path KT2c is described below with reference to the flow chart shown in FIG. 13.

The user of the management device 14c executes the following process in order to get the status of a specific printer 12c in the store system 11 managed by the management device 14c (wants to acquire the status of the printer 12c by means of the management device 14c).

First, the user starts a browser on the management device 14c, and inputs a command to access a specific URL (step SZ11). This URL is the URL accessed to display a status management interface (referred to as the status interface) in a browser window. This specific URL is previously made known to the user. The specific URL may be a URL managed by the control server 10c, or a URL managed by a different server.

In response to the user instruction in step SZ11, the browser execution unit 40ac of the management device control unit 40c of the management device 14c accesses the specified URL, and requests the drawing file for displaying the status interface (step SR1).

The browser execution unit 40ac then displays the status interface based on the drawing file acquired in response to the request of step SR1 (step SR2).

The status interface is a user interface enabling the user to select a specific printer 12c and command displaying the status of the selected printer 12c. The status interface has a field for inputting the printer identification information of the printer 12c, and the user inputs the printer identification information to this field to select the specific printer 12c. The status interface also has a button for instructing displaying the status of the printer 12c, and the user uses this button to display the status of the printer 12c.

When the user has input the printer identification information to the status interface and operates the button to instruct displaying the status of the printer 12c (step SZ12), the browser execution unit 40ac runs the following process.

The browser execution unit 40ac generates a status request command (status request) (step SR3). The status request command is a command requesting a status data response containing information indicating the status of the printer 12c. The status request command is in a data format enabling the status processing unit 29c of the control server 10c to execute a process based on the command. The status request command includes the printer identification information input to the status interface.

The browser execution unit 40ac then adds the printer identification information of the process unit (the status processing unit 29c in this example) to run the process based on the status request command to the generated status request command (step SR4).

Next, the browser execution unit 40ac completes a HTTP handshake with the control server 10c, and opens a connection KK between the communication management unit 25c, the communication connection unit 41c, and the second connection unit 30c (step SR5, step SS1).

The communication management unit 25c then accesses a management device connection database 28cc stored by the control server storage unit 28c. The management device connection database 28cc is a database for relationally storing the connection identification information of the connection KK, and the management device identification information, which is identification information for the management device 14c. Next, the communication management unit 25c creates one record in the management device connection database 28cc. The communication management unit 25 then stores in the created record the connection identification information of the connection KK related to the management device identification information of the management device 14c. Note that the communication management unit 25c gets the management device identification information by communicating with the browser execution unit 40ac of the management device 14c using a specific protocol after the connection KK is established.

Next, the browser execution unit 40ac sends the status request command to the communication connection unit 41c (step SR6).

The communication connection unit 41c sends the received status request command through the connection KK to the control server 10c (step SR7).

As shown in FIG. 13 (B), the second connection unit 30c receives the status request command through the connection KK (step SS2). Next, the second connection unit 30c sends the status request command to the communication management unit 25c (step SS3).

Next, the communication management unit 25c acquires the process unit identification information contained in the status request command (step SS4).

Next, the communication management unit 25c sends the status request command to the process unit (status processing unit 29c in this example) identified by the process unit identification information acquired in step SS4 (step SS5).

The communication management unit 25c manages the relationships between process unit and process unit identification information, and sends data to the process unit identified by the process unit identification information based on the received process unit identification information.

The status processing unit 29c then references the connection management database stored in the control server storage unit 28c (step SS6). The status processing unit 29c then searches the connection management database to retrieve the connection identification information of the WebSocket connection CT related to the identification information contained in the received status request command as the search key (step SS7). The connection identification information acquired in step SS7 by the status processing unit 29c is the connection identification information of the WebSocket connection CT established with the printer 12c that requested transmission of the status data.

Next, the status processing unit 29c adds the process unit identification information of the status processing unit 29c to the received status request command (step SS8). The status processing unit 29c manages the process unit identification information assigned to the status processing unit 29c.

Next, the status processing unit 29c sends the status request command to the first connection unit 26c related to the connection identification information acquired in step SS7 (step SS9).

The first connection unit 26c then pushes the received status request command through the WebSocket connection CT to the printer 12c (step SS10).

As shown in FIG. 13 (C), the communication unit 16c then receives the status request command through the WebSocket connection CT (step ST1).

Next, the communication unit 16c sends the status request command to the communication control unit 15c (step ST2).

The communication control unit 15c then acquires the process unit identification information added to the status request command (step ST3).

Next, the communication control unit 15c references the function unit management database (step ST4).

Next, the communication control unit 15c acquires the function unit identification information related to the process unit identification information from the function unit management database using the process unit identification information acquired in step ST3 as the search key (step ST5).

The function unit identified by the function unit identification information acquired by the communication control unit 15c in step ST5 is the function unit related to the process unit that send the data (status request command in this example) received by the communication control unit 15c. More specifically, the function unit identification information acquired by the communication control unit 15c in step ST5 is the function unit identification information identifying the function unit that sent the data.

Next, the communication control unit 15c sends the status request command to the function unit identified by the function unit identification information acquired in step ST5 (the status management unit 21c in this example) (step ST6). The communication control unit 15c manages the relationships between function unit identification information and function units. Therefore, based on the acquired function unit identification information, the communication control unit 15c can send data to the one function unit identified by the function unit identification information.

Based on the detected result received from the status monitor 22c, the status management unit 21c acquires the status of the printer 12c (step ST7). Next, the status management unit 21c generates status data in a predetermined format based on the state of the printer 12 (step ST8).

The status data is data indicating the state of the printer 12c. The status data may include information such as whether a cover is open or closed, that a specific error occurred, the state of mechanisms in the print unit 18c, information related to the print medium that is loaded, and information related to the operating mode that is set.

As shown in FIG. 14 (C), the status management unit 21c adds the printer identification information and the function unit identification information of the status management unit 21c to the status data (step ST9). In step ST9, the status management unit 21c references the printer identification information stored in the printer storage unit 19c, and based on this data adds the printer identification information to the status data. The status management unit 21c also manages the function unit identification information of the status management unit 21c.

Next, the status management unit 21c sends the status data to the communication unit 16c (step ST10).

Next, the communication unit 16b sends the status data through the WebSocket connection CT to the control server 10b (step ST11).

As shown in FIG. 14 (B), the first connection unit 26b receives the status data through the WebSocket connection CT (step SS11).

Next, the first connection unit 26b sends the received status data to the communication management unit 25c (step SS12).

The communication management unit 25c then acquires the printer identification information and function unit identification information added to the status data (step SS13).

Next, the communication management unit 25c references the process unit management database stored in the control server storage unit 28c (step SS14).

The process unit management database is a database that relationally stores process unit identification information to a set of printer identification information and function unit identification information.

Next, the communication management unit 25c searches the process unit management database using the printer identification information and function unit identification information acquired in step SS13 as the search key, and retrieves the process unit identification information related to the identification information set (step SS15). The process unit identification information acquired at this time by the communication management unit 25c is the identification information of the process unit that sent the data received through the WebSocket connection CT.

Next, the communication management unit 25c sends the status data to the process unit identified by the process unit identification information acquired in step SS15 (the status processing unit 29c in this example) (step SS16). Note that the communication management unit 25c manages the relationship between process unit identification information and process units.

The status processing unit 29c then determines the management device identification information of the management device 14c that sent the received status data based on the received status data (step SS17).

In this embodiment of the invention, when status data is received from one printer 12c, the management device 14c that sent the status data is predetermined. There may be plural management devices 14c that send status data. The management device 14c that sends the status request command may also not be included the management devices 14c that send the status data. For example, when there is a management device 14c that manages the status of the printers 12c in a store system 11, the status data is sent by this management device 14c.

For each of the printers 12c connected to the control server 10c, the status processing unit 29c also manages the relationships between printer identification information and the management device identification information of the one or more management devices 14c that send data when status data is received. For example, a database storing these relations may be stored in the control server storage unit 28c, and the status processing unit 29c may manage the relations based on this database. Further alternatively, a relations table may be defined in the program that enables the function of the status processing unit 29c, and the status processing unit 29c may manage the relations based on this table.

Based on the printer identification information contained in the status data, the status processing unit 29c determines the management device identification information of the one or plural management devices 14c related to the printer identification information.

Next, status processing unit 29c references the management device connection database 28cc (step SS18). Next, the status processing unit 29c retrieves the connection identification information of the connection KK related to the identification information using the management device identification information determined in step SS17 as the search key (step SS19).

In step SS19 in this example, the status processing unit 29c acquires the connection identification information of the connection KK established in step SR5 and step SS1.

Next, status processing unit 29c sends the status data to the second connection unit 30c related to the acquired connection identification information (step SS20).

The second connection unit 30c then sends the received status data through the connection KK to the management device 14c (step SS21).

As shown in FIG. 14 (A), the communication connection unit 41c of the management device 14c receives status data through the connection KK (step SR8). Next, the communication connection unit 41c sends the received status data to the browser execution unit 40ac of the management device control unit 40c (step SR9).

Based on the received status data, the browser execution unit 40ac displays information indicating the state of the printer 12c in the browser window (step SR10). For example, if information that a cover is open is included in the status data, the browser execution unit 40ac displays information to the effect that the cover is open based on this information.

The management device 14c can thus get the status of the printer 12c at any time by sending a status request command. More specifically, the status request command sent by the management device 14c is sent by a function of the control server 10c to the status management unit 21c of the printer 12c. In response to this status request command, status data generated by the status management unit 21c is sent by a function of the control server 10c to the browser execution unit 40ac of the management device control unit 40c of the management device 14c, and the browser execution unit 40ac executes a process appropriate to the status data.

Therefore, compared with a configuration in which the printer 12c regularly sends status data, device resources can be used more effectively, increased communication traffic can be suppressed, and the management device 14c can get the status of the printer 12c using a function of the control server 10c.

A process in which data is sent from the status management unit 21c to the status processing unit 29c is described above, but the same process can be used to send data from the print control unit 17c to the print data processing unit 27c.

In this embodiment of the invention the control server 10c has process units with different functions, the print data processing unit 27c and the status processing unit 29c.

The effect of this is described below.

That is, as described above, when print result data is received, the print data processing unit 27c sends the received print result data to the management device 14c that sent the print information data. As a result, the management device 14c that instructed printing can get the result of printing. The status processing unit 29c sends the received status data to one or more predetermined management devices 14c. As a result, in addition to the management device 14c that sent the status request command, a specific management device 14c with a function for managing the printers 12c can also appropriately receive the status data and manage printer 12c status.

The method of processing received data, particularly how to handle the data in relation to the management device 14c, differs for the print data processing unit 27c and the status processing unit 29c. Based on this, the control server 10c has a status processing unit 29c as a process unit separate from the print data processing unit 27c. Note that with this method, data sent by the print control unit 17c is sent to the print data processing unit 27c, and data sent by the status management unit 21c is sent to the status processing unit 29c.

As described above, the print control system 1c according to this embodiment has a printer 12c and a control server 10c (print control device).

The printer 12c has a print unit 18c that prints, a print control unit 17c that controls the print unit 18c based on print data, a status management unit 21c that generates status data indicating the device state, and a communication unit 16c that sends and receives print data and status data through a WebSocket connection CT.

The control server 10c has a first connection unit 26c (connection unit) that sends and receives print data and status data through a WebSocket connection CT, a print data processing unit 27c that generates the print data sent by the first connection unit 26c, and a status processing unit 29c that acquires and processes the status data received by the first connection unit 26c.

In addition to a print control unit 17c, the control server 10c in this configuration has a status management unit 21c. The status data generated by the status management unit 21c is sent to the control server 10c. The status processing unit 29c of the control server 10c gets the status data and runs a corresponding process. In other words, the control server 10c according to this embodiment has a status processing unit 29c related to the status management unit 21c of the printer 12c, and can run a related process by means of the status processing unit 29c. More specifically, the print control system 1c can be made compatible with configurations in which the printer 12c has a function for detecting device status in addition to a print function. The control server 10c sends print data by asynchronous duplex communication to the printer 12c. As a result, the control server 10c can send print data to the printer 12c at any time. When triggered by an event causing the printer 12c to execute a process based on the print data, the control server 10c can therefore send the print data to the printer 12c and command the printer 12c to run the process based on the print data. The printer 12c also sends status data by asynchronous duplex communication to the control server 10c. As a result, the printer 12c can send status data to the control server 10c when required at any time.

In this embodiment of the invention, the printer 12c has a communication control unit 15c that sends print data received by the communication unit 16c to the print control unit 17c. The control server 10c also has a communication management unit 25c that sends the status data received by the first connection unit 26c to the status processing unit 29c.

Thus comprised, print data received from the control server 10c is passed to the print control unit 17c in the printer 12c, and the print control unit 17c executes a corresponding process based on the print data. In the control server 10c, status data received from the printer 12c is sent to the status processing unit 29c, and a corresponding process based on the status data can be executed by the status processing unit 29c.

The control server 10c in this embodiment of the invention also has a control server storage unit 28c (storage unit). The communication management unit 25c of the control server 10c assigns identification information to the WebSocket connection CT. The control server storage unit 28c relationally stores the identification information of the printer 12c and the WebSocket connection CT.

Thus comprised, the control server 10c can manage the opened WebSocket connections CT by the identification information.

The print control system 1c according to this embodiment of the invention also includes a management device 14c that has a display unit 42c, and a management device control unit 40c (control unit) that displays information based on the status data on the display unit 42c. The control server 10c has a second connection unit 30c that communicates with the management device 14c. The status processing unit 29c of the control server 10c sends the received status data through the second connection unit 30c to the management device 14c.

Thus comprised, a management device 14c connected to the control server 10c can use a function of the control server 10c to receive status data sent from a printer 12c, and based on the received status data, can display information about the status of the printer 12c on the display unit 42c.

The management device control unit 40c of the management device 14c in this embodiment of the invention sends a status request command (status request) that requests status data to the control server 10c. The status processing unit 29c of the control server 10c sends the status request command received by the second connection unit 30c to the printer 12c through the WebSocket connection CT. The status management unit 21c of the printer 12c generates status data based on the status request command received by the communication unit 16c.

Thus comprised, the management device 14c can get the status of the printer 12c as required.

The status request command sent by the management device control unit 40c of the management device 14c in this embodiment of the invention contains information identifying a printer 12c. Based on the information identifying the printer 12c contained in the status request command, the status processing unit 29c of the control server 10c sends status data to the printer 12c corresponding to the information identifying the printer 12c.

Thus comprised, the status processing unit 29c of the control server 10c can send a status request command to the related printer 12c based on information contained in the status request command identifying the printer 12c.

The invention is described above with reference to a preferred embodiment thereof, but the invention is not limited thereto and can be modified and adapted in many ways without departing from the scope of the accompanying claims.

In the embodiments described above, the printer 12c is installed as part of a store system 11 deployed in a business. However, the printer 12c is not limited to being part of a store system 11, and can be used in other systems.

In addition, print data is sent as an XML file from the control server 10c to the printer 12c in the foregoing embodiment, but the data format of the print data is not limited to XML. The print data may be data created in another markup language, or control commands in the command language of the print unit 18c.

The function blocks shown in FIG. 10 can also be rendered as desired using hardware and software, and do not suggest a specific hardware configuration. Functions of the printer 12c may also be rendered by a separate externally connected device. The printer 12c can also execute the processes described above by running a program stored on an externally connected storage medium.

Embodiment 4

Figure 15:
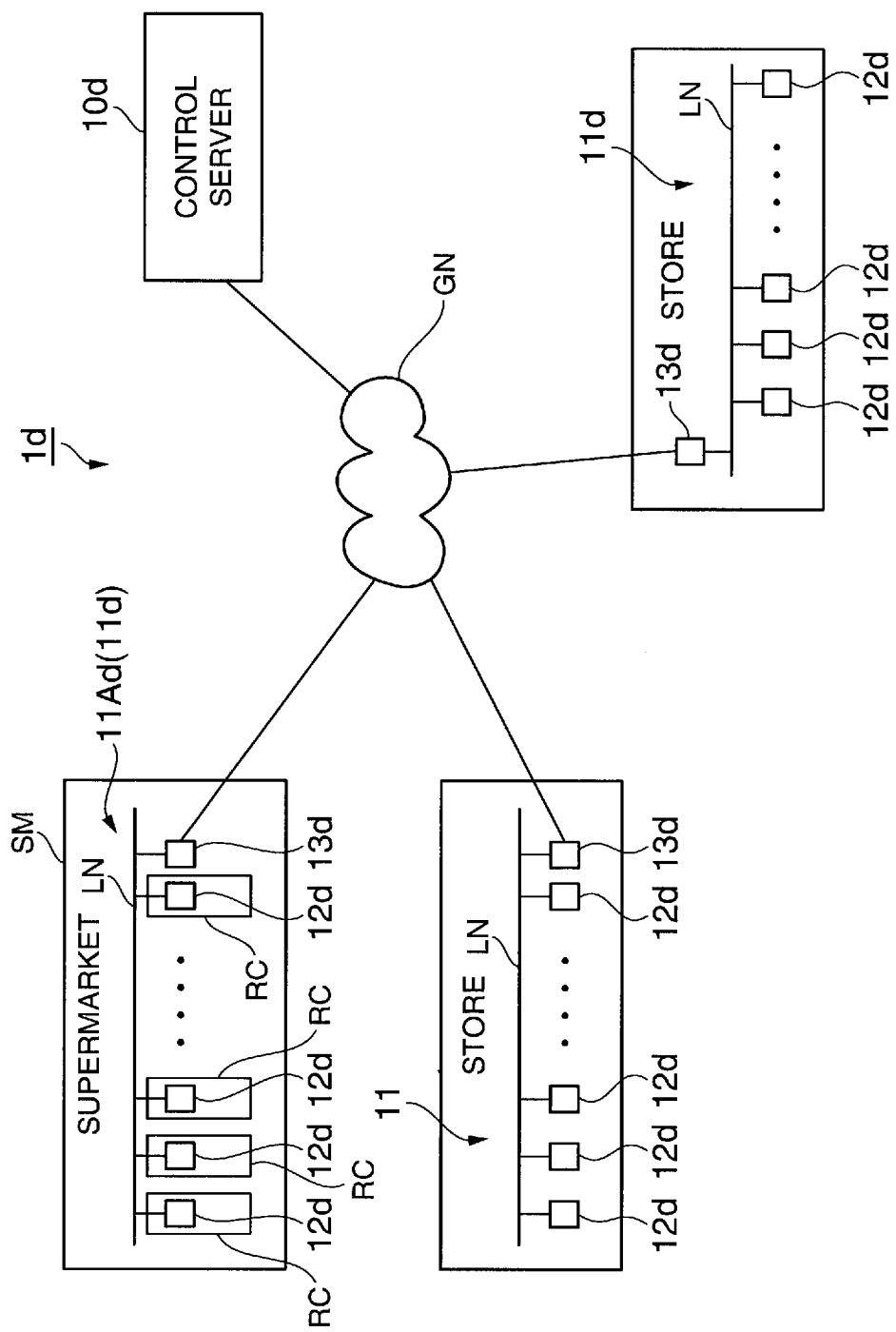
FIG. 15 shows the configuration of a control system according to a fourth embodiment of the invention.

A fourth embodiment of the invention is described next.
FIG. 15 shows the configuration of a print control system 1d according to this embodiment of the invention.

As shown in FIG. 15, the print control system 1d includes a control server 10d (print control device), and a plurality of store systems 11d that connect to the control server 10d through the Internet or other network GN.

The store system 11d is a system that is used in retail businesses such as supermarkets, convenience stores, department stores, and restaurants. The store system 11d has functions including at least producing receipts for customers of the business.

The store system 11d has one or a plurality of printers 12d that have a print function for printing on print media and can produce receipts. The printer 12d connects to a local area network LN deployed in the business. A network communication controller 13d configured with a communication device such as a network router or modem connects to the local area network LN. The printer 12d accesses the network GN through the network communication controller 13d.

For example, the store system 11Ad in this example is a system used in a supermarket SM. Plural checkout counters RC are set up in the supermarket SM, and a printer 12d is installed at each checkout counter RC. The printers 12d in the store system 11Ad are connected to the local area network LN, and access the network GN through the network communication controller 13d.

In the print control system 1d according to this embodiment of the invention the printer 12d of the store system 11d establishes a connection with the control server 10d, and communicates with the control server 10d. The printer 12d executes a process related to printing as controlled by the control server 10d.

Figure 16:
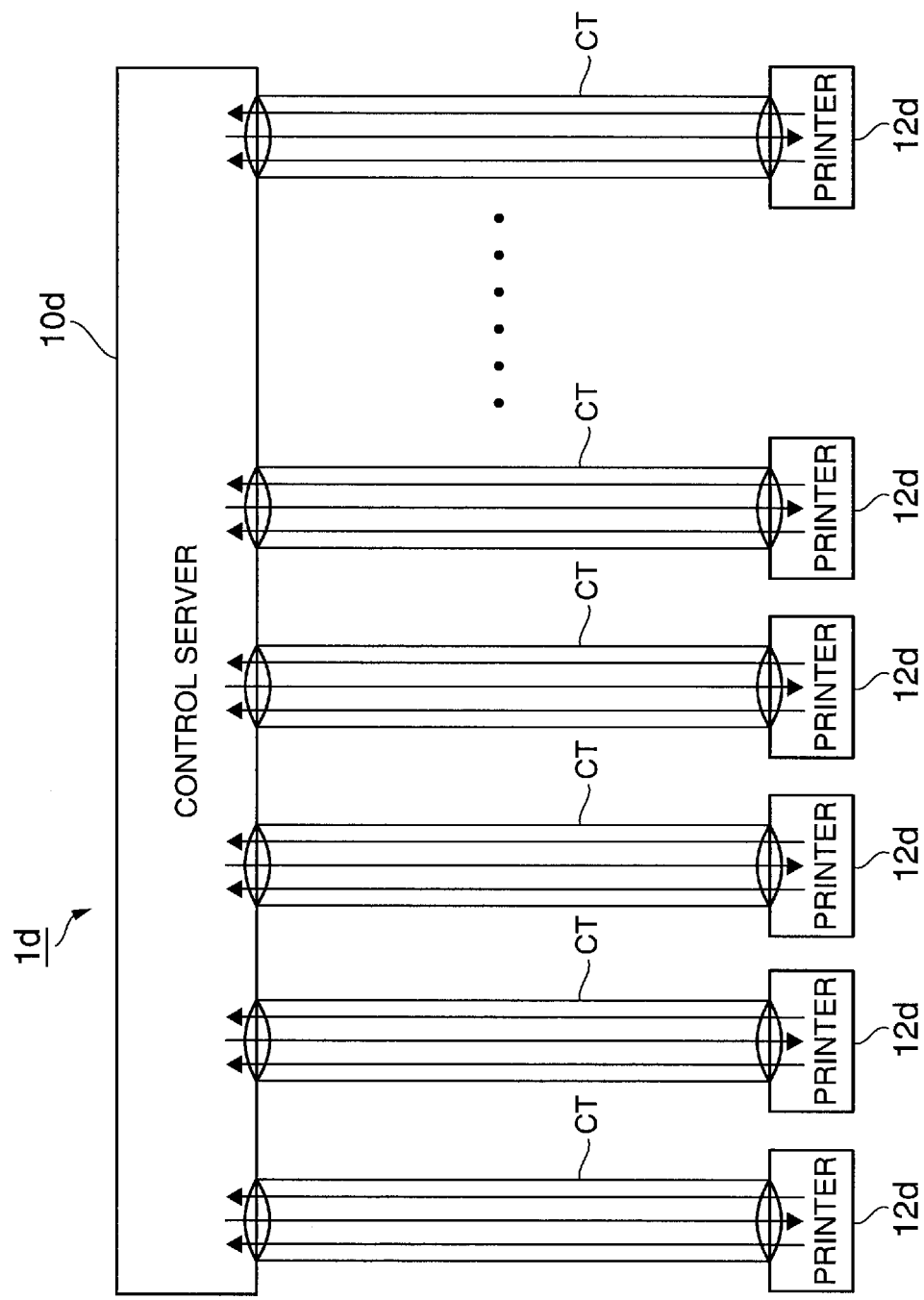
FIG. 16 illustrates communication paths established between the control server and printer.

FIG. 16 illustrates the communication paths established between the control server 10d and the printers 12d in the print control system 1d.

As shown in FIG. 16, a WebSocket connection CT (communication path) is established between the control server 10d and the printers 12d in each store system 11d.

WebSocket is a communication standard that enables asynchronous duplex communication between servers and clients connected through a network. After a server and client open a WebSocket connection CT using the WebSocket standard, sending and receiving data between the devices uses a dedicated protocol by means of the connection. It is therefore not necessary to establish a connection every time data is transmitted.

The WebSocket connection CT is a logical communication path for sending and receiving data according to the WebSocket protocol and procedures between the printer 12d and control server 10d connected through the WebSocket connection CT. Therefore, once the printer 12d and control server 10d handshake and establish a WebSocket connection CT, the printer 12d and control server 10d can exchange data asynchronously over the WebSocket connection CT. More specifically, the control server 10d can send data to the printer 12d through the WebSocket connection CT at any time, and the printer 12d can send data to the control server 10d through the WebSocket connection CT.

WebSocket communication is asynchronous, duplex communication between the printer 12d and control server 10d through the WebSocket connection CT based on the WebSocket protocol and methods.

The printer 12d and control server 10d communicate by asynchronous, duplex communication through the WebSocket connection CT. More specifically, the control server 10d can push data to the printer 12d by WebSocket communication through the WebSocket connection CT without receiving a request from the printer 12d operating as a client device at any time. Likewise, the printer 12d can push data to the control server 10d through the WebSocket connection CT at any time.

In this embodiment of the invention the control server 10d is a client server in a so-called cloud computing system. More specifically, the control server 10d can process data, execute a specific operation when triggered by a request from the printer 12d, and send data based on the result of the process through the WebSocket connection CT to the printer 12d.

In FIG. 16 the control server 10d is represented as a single block, but this does not mean that the control server 10d is configured from a single server. For example, the control server 10d may be configured from multiple servers, or it may be a server rendered by a function of a specific system. More specifically, the control server 10d may be any configuration that can execute the processes described herein.

The control server 10d and printer 12d communicate according to the WebSocket communication protocol in this embodiment. The invention is not limited to WebSocket communication, however, and other configurations capable of asynchronous, duplex communication in the same way as WebSocket communication may be used.

The print control system 1d thus has multiple (such as a 1000) printers 12d each capable of printing communicatively connected through a WebSocket connection CT to a control server 10d.

Such a configuration enables the following.

The control server 10d can collect, manage, and analyze information based on data received from the plural printers 12d connected to the store system 11d. Valuable information can therefore be collected. The collected information can be used as "big data."

Constructing a store system 11d can also be made easier and cheaper. More specifically, the printer 12d is connected to the control server 10d by a WebSocket connection CT in this print control system 1d. Using a service provided by the control server 10d, this enables controlling the printers 12d to execute processes as controlled by the control server 10d. An administrator constructing a store system 11d can therefore build the store system 11d by simply installing the printers 12d where desired, and then connecting the printers 12d to the network GN. This enables controlling the printers 12d to execute a desired process, such as a process related to producing receipts, using a service provided by the control server 10d.

In addition, because printers 12d from different store systems 11d are connected to the control server 10d by a WebSocket connection CT, the control server 10d can manage the plural printers 12d in the plural store systems 11d. The control server 10d can also coordinate operation of the plural printers 12d connected in the plural store systems 11d.

Figure 17:
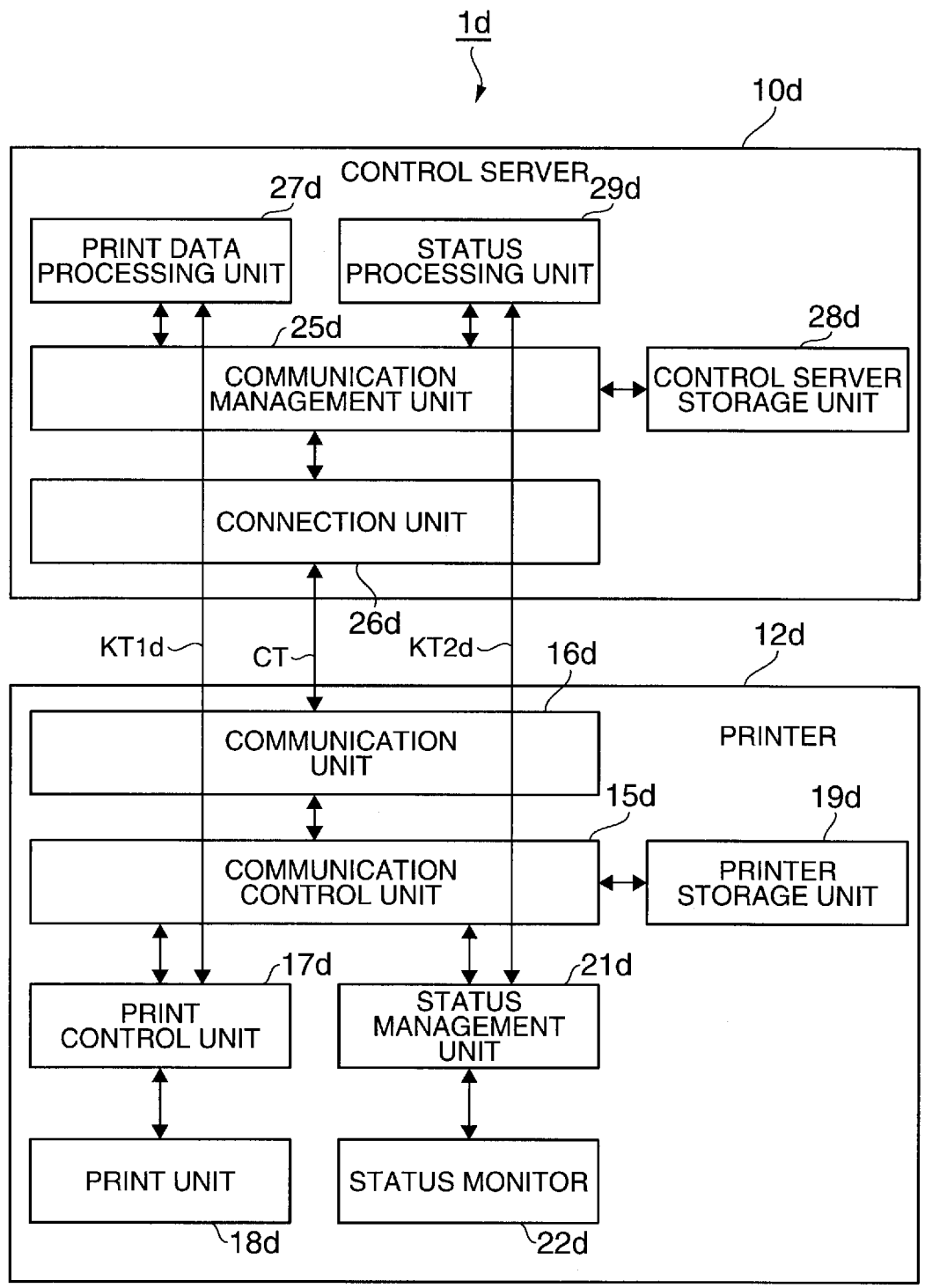
FIG. 17 is a block diagram showing the functional configuration of the control server and printer.

FIG. 17 is a block diagram showing the functional configuration of the printer 12d and the control server 10d.

As shown in FIG. 17, the printer 12d has a communication control unit 15d, a communication unit 16d, a print control unit 17d, a print unit 18d, a status management unit 21d (function unit), a status monitor 22d, and a printer storage unit 19d.

The functions of the communication control unit 15d, communication unit 16d, print control unit 17d, and the status management unit 21d are described further below.

The print unit 18d includes mechanisms related to printing, such as a print mechanism that prints on print media, a conveyance mechanism that conveys the print media, and a cutting mechanism that cuts the print media, and control boards related to controlling the mechanisms.

The status monitor 22d includes sensors or devices such as a sensor that detects if the printer 12d cover is open or closed, and sensors for detecting the status of the printer 12d, such as if an error occurs, and outputs the result to the status management unit 21d.

The printer storage unit 19d is nonvolatile memory, and stores data. Address data, printer identification information, and a function unit management database as further described below are stored in the printer storage unit 19d.

The printer 12d has two function blocks, a print control unit 17d and a status management unit 21d. These function blocks are function blocks with different functions.

As shown in FIG. 17, the control server 10d includes a communication management unit 25d, a connection unit 26, a print data processing unit 27d, a status processing unit 29d (process unit), and a control server storage unit 28d.

The functions of the communication management unit 25d, connection unit 26d, print data processing unit 27d, and status processing unit 29d are described below.

The control server storage unit 28d has nonvolatile memory, and stores data. A connection management database and a process unit management database are stored in the control server storage unit 28d and described below.

The control server 10d has two process units, the print data processing unit 27d and status processing unit 29d, as process units with separate functions.

The control server 10d has two function blocks, a print data processing unit 27d and a status processing unit 29d. These function blocks are function blocks with different functions.

FIG. 17 shows the relationship between the control server 10d and one printer 12d connected to the control server 10d. When plural printers 12d are connected to the control server 10d, the control server 10d has the same number of WebSocket interfaces as there are printers 12d, establishes a WebSocket connection CT with each printer 12d, and communicates by WebSocket protocol through the connections to each printer 12d.

The operation of the printer 12d and control server 10d when the printer 12 power turns on is described next.

Figures 18A, 18B:
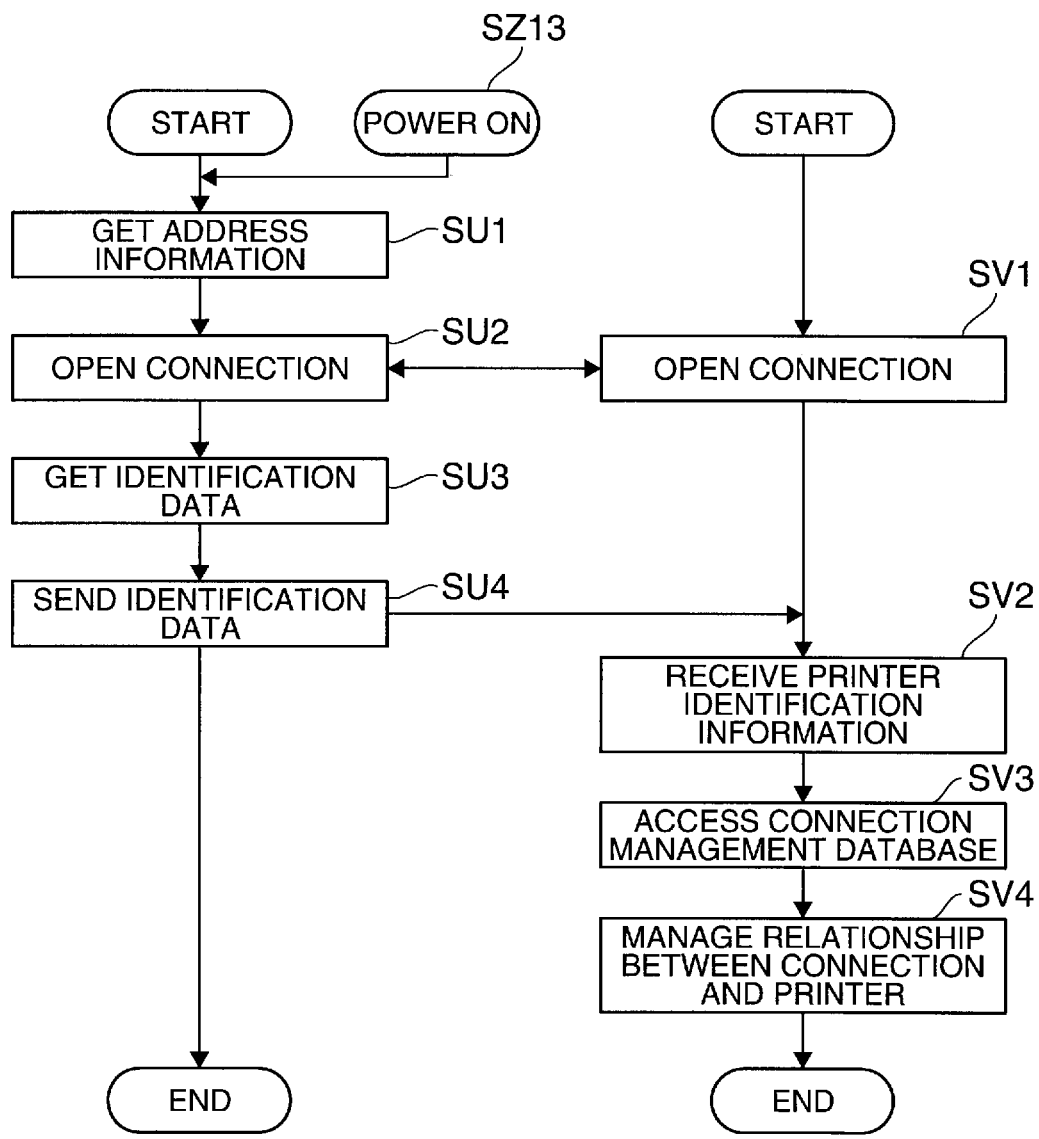
FIGS. 18A and 18B are flow charts showing the operation of the control server and printer.

FIG. 18 is a flow chart showing the operation of the printer 12d and the control server 10d after the printer 12d power turns on, column (A) showing the operation of the printer 12d, and column (B) showing the operation of the control server 10d.

The trigger of the process shown in the flow chart in FIG. 18 is not limited to the power turning on. For example, this process may be triggered by the printer 12d connecting to the network GN and enabling communication, or by an instruction from a user.

Note that in the configuration described below, the printer 12d is connected to the local area network LN of the store system 11d in which it is used, and can access the network GN.

The functions of the function blocks of the communication control unit 15d, print control unit 17d, and status management unit 21d of the printer 12d, and the communication management unit 25d, the print data processing unit 27d, and the status processing unit 29d of the control server 10d, are rendered as described below.

More specifically, these function blocks are software objects. An object is an instance created in an object-oriented programming language, and more specifically is a software function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

As shown in FIG. 18 (A), when the printer 12d power turns on (step SZ1), the communication control unit 15d accesses the printer storage unit 19d and gets the address data stored in the printer storage unit 19d (step SU1).

The address data is the address (such as the domain name, IP address, path name, port information) of the control server 10d accessed when establishing the WebSocket connection CT. When opening a WebSocket connection CT according to the WebSocket protocol, the client (the printer 12d in this example) handshakes with the server (the control server 10d in this example) using HTTP (Hypertext Transfer Protocol). When handshaking, the client sends a message containing the address of the server, and the address data is the address to be accessed.

Next, the communication control unit 15d establishes a WebSocket connection CT with the communication management unit 25d of the control server 10d through the communication unit 16d and connection unit 26 based on the domain name in the address data (step SU2, step SV1). In other words, the printer 12d according to this embodiment establishes a WebSocket connection CT when triggered by the power turning on without receiving an instruction from the user or a request from the control server 10d.

The communication unit 16d and first connection unit 26d are WebSocket interfaces enabling data communication based on the WebSocket protocol and methods. These function blocks are instantiated using a WebSocket Socket.IO library, for example.

If the communication control unit 15d sends data to the communication unit 16d, the data can be sent through the WebSocket connection CT according to the WebSocket protocol.

More specifically, the communication unit 16d has functions for processing data that is received from the communication control unit 15d according to WebSocket, and sending the data through the WebSocket connection CT based on WebSocket methods. The communication unit 16d also has functions for processing data that is received through the WebSocket connection CT according to WebSocket, and sending to the communication control unit 15d. The first connection unit 26d is similarly configured.

When the WebSocket connection CT is established, the printer 12d and control server 10d can communicate through an asynchronous, duplex communication link. More specifically, the control server 10d can push to the printer 12d through the WebSocket connection CT without receiving a request from the printer 12d operating as a client.

Next, the communication control unit 15d of the printer 12d accesses the printer storage unit 19d and gets the printer identification information stored in the printer storage unit 19d (step SU3). The printer identification information is data representing the identification information of the printer 12d (referred to below as printer identification information). The printer identification information is, for example, a serial number assigned to the printer 12d when the printer 12d is manufactured.

Next, the communication control unit 15d sends the printer identification information over the WebSocket connection CT (step SU4).

As shown in FIG. 18 (B), the communication management unit 25d of the control server 10d receives the printer identification information (step SV2).

Next, the communication management unit 25d accesses the connection management database stored in the control server storage unit 28d (step SV3). The connection management database is a database relationally storing for the one or plural WebSocket connections CT that were established connection identification information identifying the WebSocket connection CT and the printer identification information of the printer.

Next, the communication management unit 25d creates one record in the connection management database. The communication management unit 25d then stores in the created record the connection identification information of the WebSocket connection CT established in step SV1 related to the printer identification information in the printer identification information received in step SV2 identification information (step SV4). Note that when a WebSocket connection CT is opened, the communication management unit 25d generates connection identification information for that connection that is different from the connection identification information of any other WebSocket connection CT that was already opened. The relationship between the WebSocket connections CT and printers 12d is managed by the process of step SV4.

A WebSocket connection CT is thus established when triggered by the power turning on without receiving a user instruction or a request from the control server 10d. Thus comprised, the user does not need to perform a complicated operation to open a WebSocket connection CT. Special knowledge is also not needed to open a WebSocket connection CT. After the power turns on, the printer 12d can also be automatically quickly enabled to execute processes as controlled by the control server 10d.

A WebSocket connection CT is thus established between the communication unit 16d and connection unit 26d. As a result, a first function unit communication path KT1d based on the WebSocket connection CT is established between the print control unit 17d of the printer 12d, and the print data processing unit 27d of the control server 10d. The first function unit communication path KT1d is a logical communication path that is configured including the WebSocket connection CT. The print control unit 17d and print data processing unit 27d can communicate by asynchronous duplex communication through the first function unit communication path KT1d. Asynchronous duplex communication through the first function unit communication path KT1d is described further below.

When the WebSocket connection CT is established, a second function unit communication path KT2d based on the WebSocket connection CT is established between the status management unit 21d of the printer 12d and the status processing unit 29d of the control server 10d. The second function unit communication path KT2d is a logical communication path that is configured including the WebSocket connection CT. The status management unit 21d and status processing unit 29d can communicate by asynchronous duplex communication through the second function unit communication path KT2d. Asynchronous duplex communication through the second function unit communication path KT2d is described further below.

Note that below the logical communication paths through which data is communicated between the function units of the printer 12*d* and the process units (described below) of the control server 10*d* are collectively referred to as the function unit communication path KT below.

As shown in FIG. 17, the control server 10*d* has two function blocks, the print data processing unit 27*d* and status processing unit 29*d*. When not differentiating between the print data processing unit 27*d* and status processing unit 29*d* below, these function blocks are referred to as process units.

The printer 12*d* has two function blocks, the print control unit 17*d* and the status management unit 21*d*. When not differentiating between the print control unit 17*d* and the status management unit 21*d* below, these function blocks are referred to as function units.

In the print control system 1*d* according to this embodiment, process units and function units that are related to each other communicate by asynchronous duplex communication through the function unit communication path KT based on the WebSocket connection CT.

That a function unit and a process unit are related to each other means that data output by the process unit can be processed by the function unit, and data output by the function unit can be processed by the process unit. The process unit can therefore send data to the related function unit for processing by the function unit based on a function of the function unit. The function unit can likewise send data to the related process unit for processing by the process unit based on a function of the process unit.

In this embodiment, the print control unit 17*d* of the printer 12*d*, and the print data processing unit 27*d* of the control server 10*d*, are related to each other. The status management unit 21*d* of the printer 12*d* is also related to the status processing unit 29*d* of the control server 10*d*.

Configurations in which one process unit is related to one function unit, and one process unit is related to plural function units, are conceivable. When plural function units are related to one process unit, the function units may be function units of different printers 12*d*, or function units of the same printer 12*d*.

Asynchronous duplex communication through the function unit communication path KT based on the WebSocket connection CT between a process unit and a function unit is described below with reference to specific examples.

Communication between the print control unit 17*d* and the print control unit 17*d* after a WebSocket connection CT is established is described first below using as an example the print data processing unit 27*d* sending data over the first function unit communication path KT1*d*, and the print control unit 17*d* processing the data and then returning the result over the first function unit communication path KT1*d*.

Figure 19A:
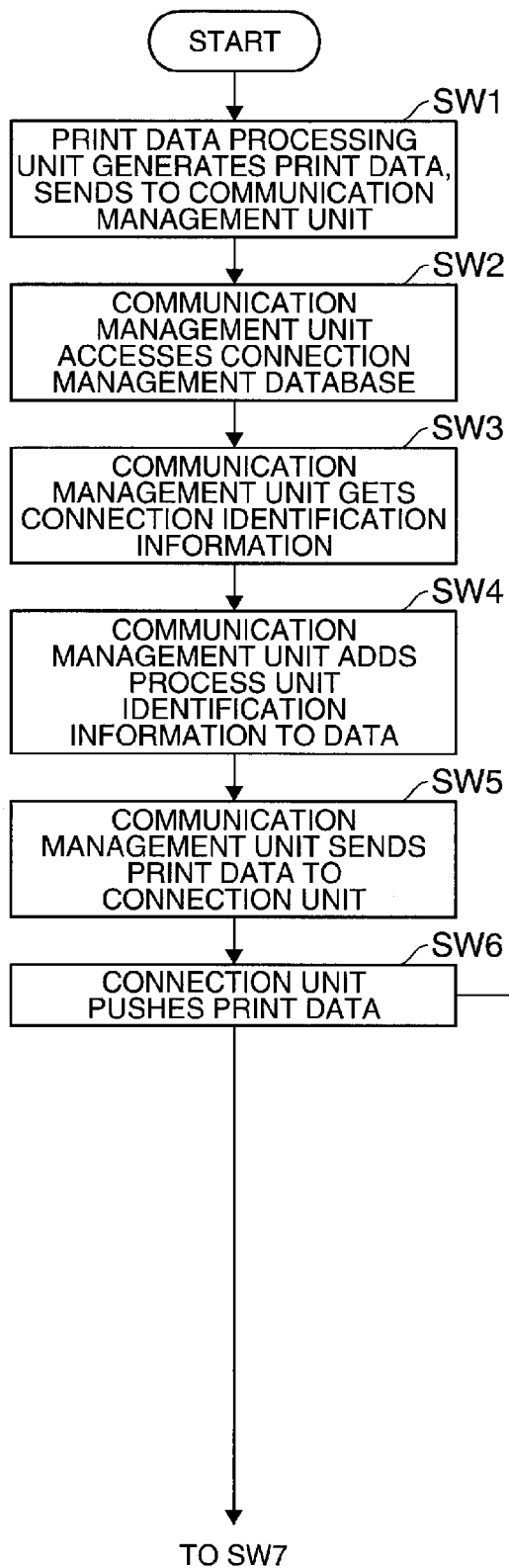
FIGS. 19A and 19B are flow charts showing the operation of the control server and printer.
Figure 19B:
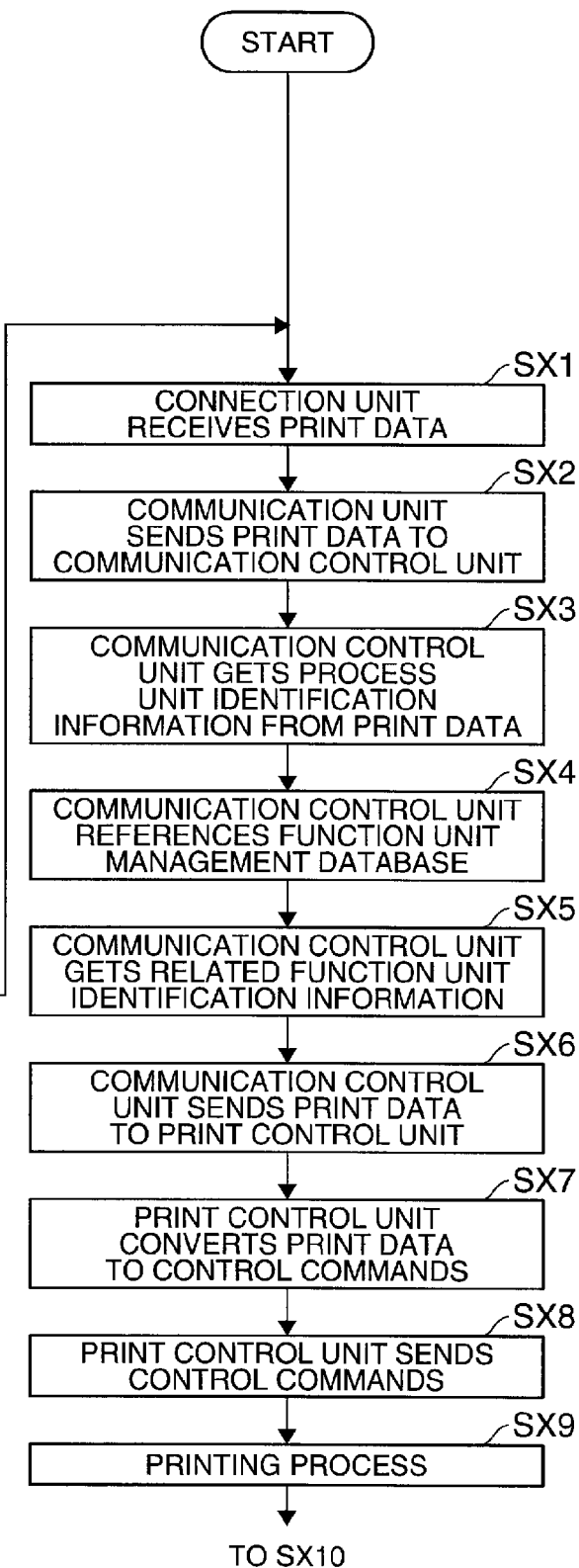
Figure 20A:
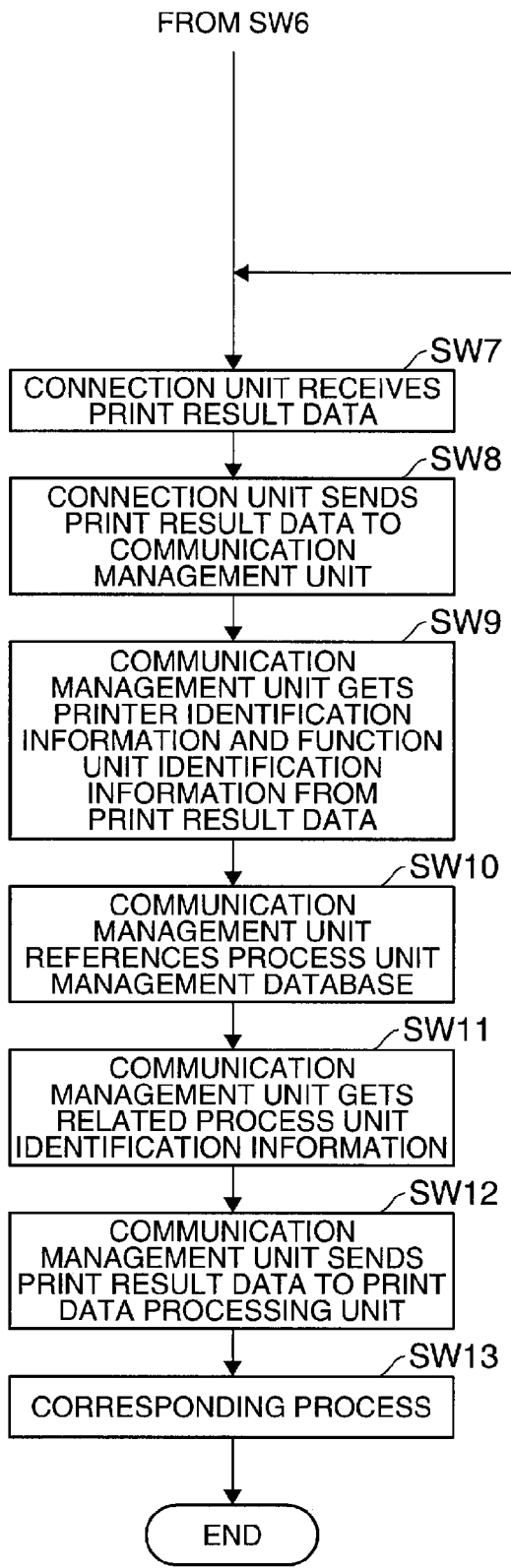
FIGS. 20A and 20B are flow charts showing the operation of the control server and printer.
Figure 20B:
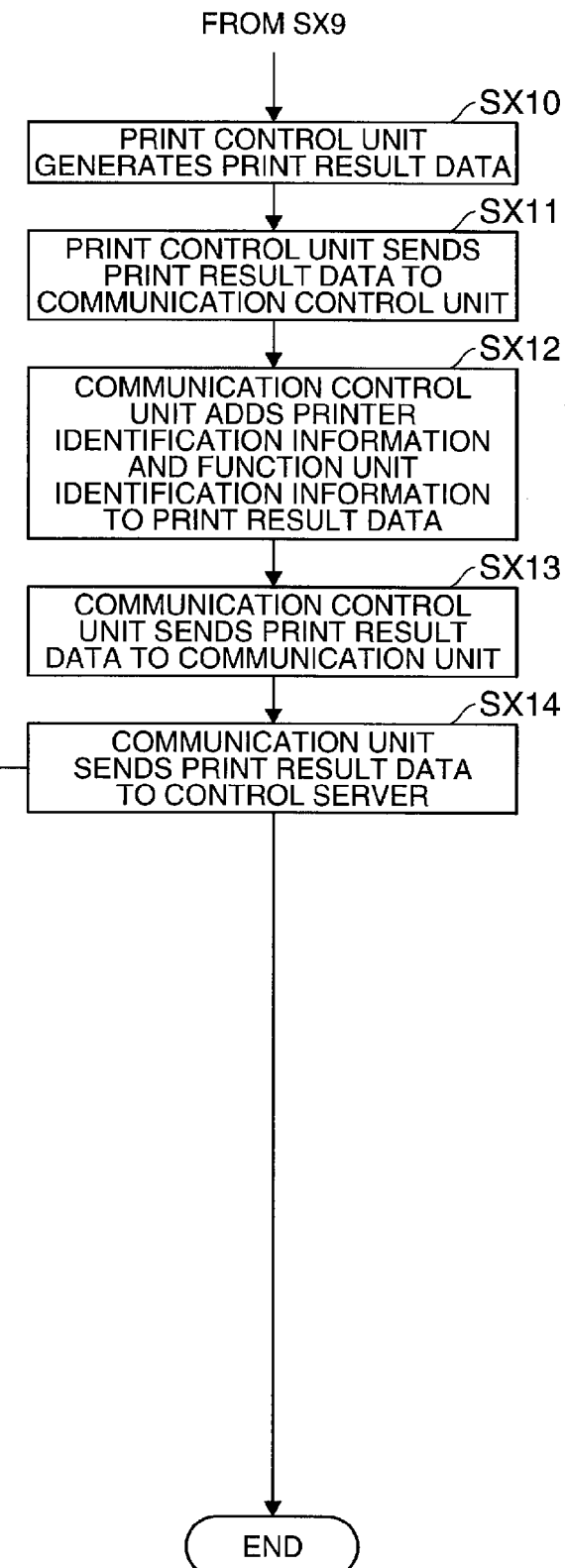

FIG. 19 and FIG. 20 are a flow chart showing the operation of the control server 10*d* and the printer 12*d* when printing on the print medium with the printer 12*d*, (A) showing the operation of the control server 10*d*, and (B) showing the operation of the printer 12*d*.

As shown in FIG. 19 (A), the print control unit 17*d* generates and send print data (print data) as controlled by the printer 12*d* to the communication management unit 25*d* (step SW1). The print data is an XML (extensible Markup Language) file containing the information to be printed by the printer 12*d*. The print data includes the information to be printed by the printer 12*d*, including image data and information identifying the location of the image on the print medium.

The printer identification information of the printer 12*d* to use for printing is also written in the print data.

The print data processing unit 27*d* manages the printer identification information of the printers 12*d* connected to the control server 10*d*, and adds the printer identification information of the printer 12*d* to be used for printing to the print data.

The printer identification information may be written in an area where control information is carried, such as the header of the print data, or may be written in a specific tag in the print data.

The communication management unit 25*d* accesses the connection management database stored in the control server storage unit 28*d* (step SW2).

Next, the communication management unit 25*d* acquires the connection identification information of the WebSocket connection CT related to the received identification information from the connection management database using the printer identification information added to the received print data as the search key (step SW3). The connection identification information acquired here is the connection identification information of the WebSocket connection CT to the printer 12*d* that is to print.

Next, the communication management unit 25*d* adds the process unit identification information of the print data processing unit 27*d* to the received print data (step SW4).

The process unit identification information is the identification information of a process unit in the control server 10*d*, and a different value is assigned as the process unit identification information for each process unit. Different process unit identification information values are therefore assigned to the print data processing unit 27*d* and the status processing unit 29*d*.

The communication management unit 25*d* manages the process unit identification information of the process units that can send data to the communication management unit 25*d*. Therefore, when the communication management unit 25*d* receives data from one process unit, it acquires the process unit identification information of the one process unit and adds it to the received data.

Next, the communication management unit 25*d* sends the print data to the first connection unit 26*d* related to the connection identification information acquired in step SW3 (step SW5).

Next, the first connection unit 26*d* pushes the received print data through the WebSocket connection CT by WebSocket communication (step SW6).

As shown in FIG. 19 (B), the communication unit 16*d* receives the print data by WebSocket (step SX1).

Next, the communication unit 16*d* sends the print data to the communication control unit 15*d* (step SX2).

The communication control unit 15*d* acquires the process unit identification information added to the print data (step SX3).

Next, the communication control unit 15*d* references the function unit management database (step SX4).

The function unit management database is a database that relationally stores the function unit identification information of the function unit and the process unit identification information of the related process unit for each function unit of the printer 12*d*.

The function unit identification information is identification information identifying a particular function unit of the printer 12*d*, and a different value is assigned as the function unit identification information for each function unit. A different value is therefore assigned as the function unit identification information of the print control unit 17*d* and the status management unit 21*d*. In this embodiment, the function unit identification information of the print control unit 17*d*, and the process unit identification information of the print data processing unit 27*d* are relationally stored in the function unit management database. The function unit identification information of the status management unit 21d, and the process unit identification information of the status processing unit 29d are also relationally stored in the function unit management database.

Next, the communication control unit 15d acquires the function unit identification information related to the process unit identification information from the function unit management database using the process unit identification information acquired in step SX3 as the search key (step SX5). In step SX5, the function unit identified by the function unit identification information acquired by the communication control unit 15d is the function unit related to the print data processing unit 27d that generated the print data received by the communication control unit 15d. In other words, the function unit identification information acquired by the communication control unit 15d in step SX5 is the function unit identification information identifying the function unit that sends the data.

Next, the communication control unit 15d sends the print data to the function unit identified by the function unit identification information acquired in step SX5 (the print control unit 17d in this example) (step SX6). Note that the communication control unit 15d manages the relationships between function unit identification information and function units.

Next, the print control unit 17d converts the received print data to control commands in the command language of the print unit 18d (step SX4). In other words, the print control unit 17d converts the print data, which is an XML file, to control commands that can be interpreted by the control board of the print unit 18d.

Next, the print control unit 17d sends the control commands to the print unit 18d (step SX8).

Next, the print unit 18d prints on the print medium based on the control commands (step SX9).

In this embodiment of the invention the print data processing unit 27d can send data to the print control unit 17d through the first function unit communication path KT1d.

The control server 10d in this embodiment of the invention can thus control a printer 12d to print when there is a need for the printer 12d to print without receiving a request from the printer 12d. Events that cause the printer 12d to print are events in which predefined conditions are met, such as when an instruction is received from the user, or a request is received from a communicatively connected external device.

This configuration also enables starting printing faster than in a configuration in which the printer 12d intermittently sends a request to the control server 10d, and the control server 10d sends print data in response to such a request when there is a need to print with the printer 12d. Consumption of resources can also be suppressed compared with a configuration in which the control server 10d queues responses to requests.

The process of sending data from the print data processing unit 27d to the print control unit 17d through the first function unit communication path KT1d is described above, but the same process can be used when sending data from the status processing unit 29d to the status management unit 21d through the second function unit communication path KT2d.

As shown in FIG. 20 (B), the print control unit 17d of the printer 12d generates print result data (information about the print result; print data) based on the result of printing by the print unit 18d (step SX10). The print result data is data indicating, for example, if printing by the print unit 18d was successful or failed, and the cause of the failure if printing fails.

Next, the print control unit 17d sends the generated print result data to the communication control unit 15d (step SX11).

The communication control unit 15d adds the printer identification information and the function unit identification information of the print control unit 17d to the received print result data (step SX12).

Note that in step SX12 the communication control unit 15d references the printer identification information stored in the printer storage unit 19d, and based on this data adds the printer identification information to the print result data.

The communication control unit 15d also manages the function unit identification information of the function units that can send data to the communication control unit 15d, and when data is received from a particular function unit can get the function unit identification information of the function unit.

Next, the communication control unit 15d sends the print result data to the communication unit 16d (step SX13).

The communication unit 16d then pushes the received print result data to the control server 10d through the WebSocket connection CT (step SX6).

As shown in FIG. 20 (A), the first connection unit 26d receives the print result data through the WebSocket connection CT (step SW7).

Next, the first connection unit 26d sends the received print result data to the communication management unit 25d (step SW8).

The communication management unit 25d then gets the printer identification information and function unit identification information added to the print result data (step SW9).

Next, the communication management unit 25d references a process unit management database stored in the control server storage unit 28d (step SW10).

The process unit management database is a database that relationally stores a set of process unit identification information, printer identification information, and function unit identification information for each process unit of the control server 10d.

Next, the communication management unit 25d acquires the process unit identification information related to this set of identification information from the process unit management database using the printer identification information and function unit identification information acquired in step SW3 as the search key (step SW11). The process unit identification information acquired by the communication management unit 25d is the process unit identification information of the process unit that sent the data received by the communication management unit 25d.

Next, the communication management unit 25d sends the print result data to the process unit (print data processing unit 27d in this instance) identified by the process unit identification information acquired in step SW11 (step SW12). Note that the communication management unit 25d manages the process unit identification information for the process units that can send data.

Next, the print data processing unit 27d runs a corresponding process based on the received print result data (step SW13). For example, the print data processing unit 27d may display information representing the printing result on a display panel.

In this embodiment of the invention the print control unit 17d can send data to the print data processing unit 27d through the first function unit communication path KT1d.

In this embodiment, the communication control unit 15*d* of the printer 12*d* adds the function unit identification information of the print control unit 17*d* to the print result data generated by the print control unit 17*d*, and then sends the data to the control server 10*d*. When print result data is received, the communication control unit 15*d* of the control server 10*d* sends the data to the print data processing unit 27*d* based on the function unit identification information added to the received data. As a result, the print result data is sent to the print data processing unit 27*d*, and is appropriately processed by the print data processing unit 27*d*.

Communication between the status processing unit 29*d* of the control server 10*d* and the status management unit 21*d* of the printer 12*d* through the second function unit communication path KT2*d* after the WebSocket connection CT is established is described next using the status management unit 21*d* sending data as an example.

Figure 21A:
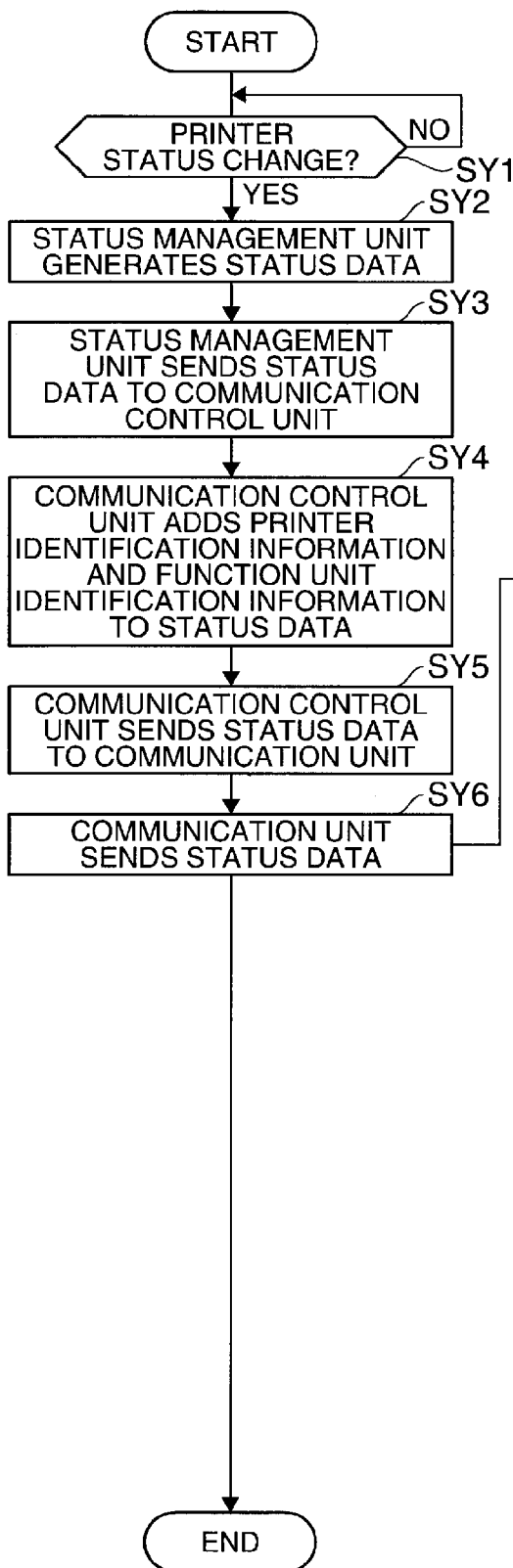
FIGS. 21A and 21B are flow charts showing the operation of the control server and printer.
Figure 21B:
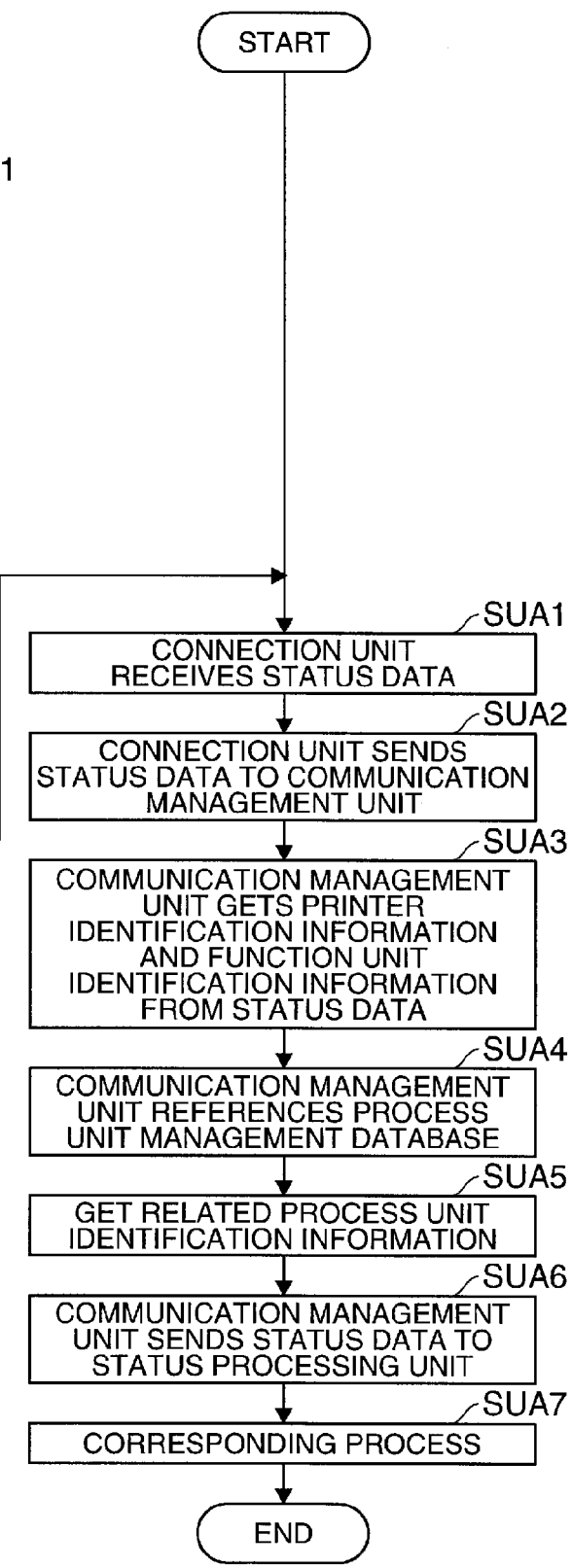

FIG. 21 is a flow chart showing the operation of the printer 12*d* and the control server 10*d* when the status of the printer 12*d* changes, column (A) showing the operation of the printer 12*d*, and column (B) showing the operation of the control server 10*d*.

As shown in FIG. 21 (A), the status management unit 21*d* of the printer 12*d* monitors the detection value of the status monitor 22*d*, and monitors whether or not the printer 12*d* status has changed (step SY1). In step SY1, the status management unit 21*d* monitors if the cover of the printer 12*d* changed from open to closed, or from closed to open, for example.

If a change in the status of the printer 12*d* is detected (step SY1 returns YES), the status management unit 21*d* generates status data (control data) representing information representing the status after the change in a specific format (step SY2).

Next, the status management unit 21*d* sends the resulting status data to the communication control unit 15*d* (step SY3).

Next, the communication control unit 15*d* adds the printer identification information and the function unit identification information of the status management unit 21*d* to the received status data (step SY4).

Note that in step SY4 the communication control unit 15*d* references the printer identification information stored in the printer storage unit 19*d*, and based on this data adds process unit identification information to the status data. The communication control unit 15*d* also manages the function unit identification information of the function units that can send data to the communication control unit 15*d*, and when data is received from one function unit, can acquire the function unit identification information of that one function unit.

Next, the communication control unit 15*d* sends the status data to the communication unit 16*d* (step SY5).

Next, the communication unit 16*d* sends the status data through the WebSocket connection CT to the control server 10*d* (step SY6).

As shown in FIG. 21 (B), the first connection unit 26*d* receives the status data through the WebSocket connection CT (step SUA1).

Next, the first connection unit 26*d* sends the received status data to the communication management unit 25*d* (step SUA2).

The communication management unit 25*d* then acquires the printer identification information and function unit identification information added to the status data (step SUA3).

Next, the communication management unit 25*d* references the process unit management database stored in the print unit 18*d* (step SUA4).

Next, the communication control unit 15*d* searches the process unit management database using the printer identification information and function unit identification information acquired in step SUA3 as the search key, and retrieves the process unit identification information related to the identification information set (step SUA5). The process unit identification information acquired at this time by the communication control unit 15*d* is the process unit identification information of the process unit that sent the data received by the communication control unit 15*d*.

Next, the communication management unit 25*d* sends the status data to the process unit identified by the process unit identification information acquired in step SUA5 (the status processing unit 29*d* in this example) (step SUA6). Note that the communication management unit 25*d* manages the process unit identification information for the process units that can send data.

The status processing unit 29*d* then runs a corresponding process based on the received status data (step SUA7). More specifically, the status processing unit 29*d* processes control data different from the print data control data (control data).

In this embodiment of the invention the status management unit 21*d* can thus send data to the status processing unit 29*d* through the second function unit communication path KT2*d*.

The communication management unit 25*d* of the control server 10*d* in this embodiment of the invention can therefore change the process unit to which data received from the printer 12*d* is sent based on the printer identification information and function unit identification information contained in the received data. As a result, data sent by a function unit of the printer 12*d* is sent through the WebSocket connection CT to the control server 10*d*, and is then sent by the control server 10*d* to the appropriate process unit. The process unit that receives the data then runs the appropriate process.

Triggered by a change in the status of the printer 12*d*, the status management unit 21*d* of the printer 12*d* in this embodiment of the invention can send the status data to the status processing unit 29*d* through the WebSocket connection CT.

As described above, the print control system 1*d* according to this embodiment of the invention has a printer 12*d* and a control server 10*d* (print control device).

The printer 12*d* includes a print unit 18*d* that prints, a print control unit 17*d* that controls the print unit 18*d* based on print data, and a function unit (status management unit 21*d*) that sends and receives control data (status data) that is different from the print data and executes a process based on the control data, a communication control unit 15*d* that adds function unit identification information of the print control unit 17*d* to the print data (print result data) sent by the print control unit 17*d*, and a communication unit 16*d* that sends print data containing the function unit identification information of the print control unit 17*d* added by the communication control unit 15*d*.

The control server 10*d* has a print data processing unit 27*d* that runs a process based on the print data (print result data) sent by the printer 12*d*; a process unit (status processing unit 29*d*) that runs a process based on the control data (status data) sent by the printer 12*d*; and a communication management unit 25*d* that sends print data (print result data) to the print data processing unit 27*d* based on the function unit identification information of the print control unit 17*d* that was added to the print data (print result data).

Thus comprised, the communication management unit 25*d* of the control server 10*d* that received the print result data sends the received print result data to the corresponding print data processing unit 27d based on the function unit identification information of the print control unit 17d added to the print result data. In other words, the print result data sent by the printer 12d is passed in the control server 10d to the print data processing unit 27d based on the function unit identification information, and the print data processing unit 27d runs a corresponding process. More specifically, this embodiment of the invention can make the print control system 1d and the printer 12d compatible with configurations in which the printer 12d has a plurality of function units, including a print control unit 17d and a function unit (status management unit 21d) with a different function than the print control unit 17d, and compatible with configurations in which the printers 12d and the control server 10d communicate over a network.

The communication control unit 15d of the printer 12d in this embodiment adds the function unit identification information of the status management unit 21d to the status data (control data) sent by the status management unit 21d (function unit), and the communication unit 16d of the printer 12d sends the status data with the added function unit identification information. Based on the function unit identification information added to the status data, the communication management unit 25d of the control server 10d sends the status data to the status management unit 21d.

Thus comprised, the status data sent by the printer 12d is passed in the control server 10d to the corresponding status management unit 21d, and an appropriate process is run by the status management unit 21d.

The printer 12d according to this embodiment also has a printer storage unit 19d that stored printer identification information. The communication control unit 15d of the printer 12d adds the printer identification information to the print result data sent by the print control unit 17d, and the communication unit 16d outputs the print result data with added printer identification information.

Thus comprised, the control server 10d that receives printer identification information and print result data with the function unit identification information of the print control unit 17d from the printer 12d over the network can determine based on this identification information the printer 12d that sent the print result data and that the function unit that sent the print result data is the print control unit 17d. The control server 10d can then run an appropriate process based on this decision.

The printer 12d and control server 10d communicate by through asynchronous duplex communication connection.

Thus comprised, the printer 12d can send the print result data sent by the print control unit 17d by asynchronous duplex communication at any time as needed to the control server 10d, and the control server 10d can execute an appropriate process based on the print result data. The printer 12d can also exchange control data with the control server 10d by asynchronous duplex communication at any time as needed for processing appropriately by the corresponding function unit based on the control data.

Variation of Embodiment 4

A variation of embodiment 4 is described next.

Note that like elements in the fourth embodiment described above and this variation of the fourth embodiment described below are identified by like reference numerals, and further detailed description thereof is omitted.

Figure 22:
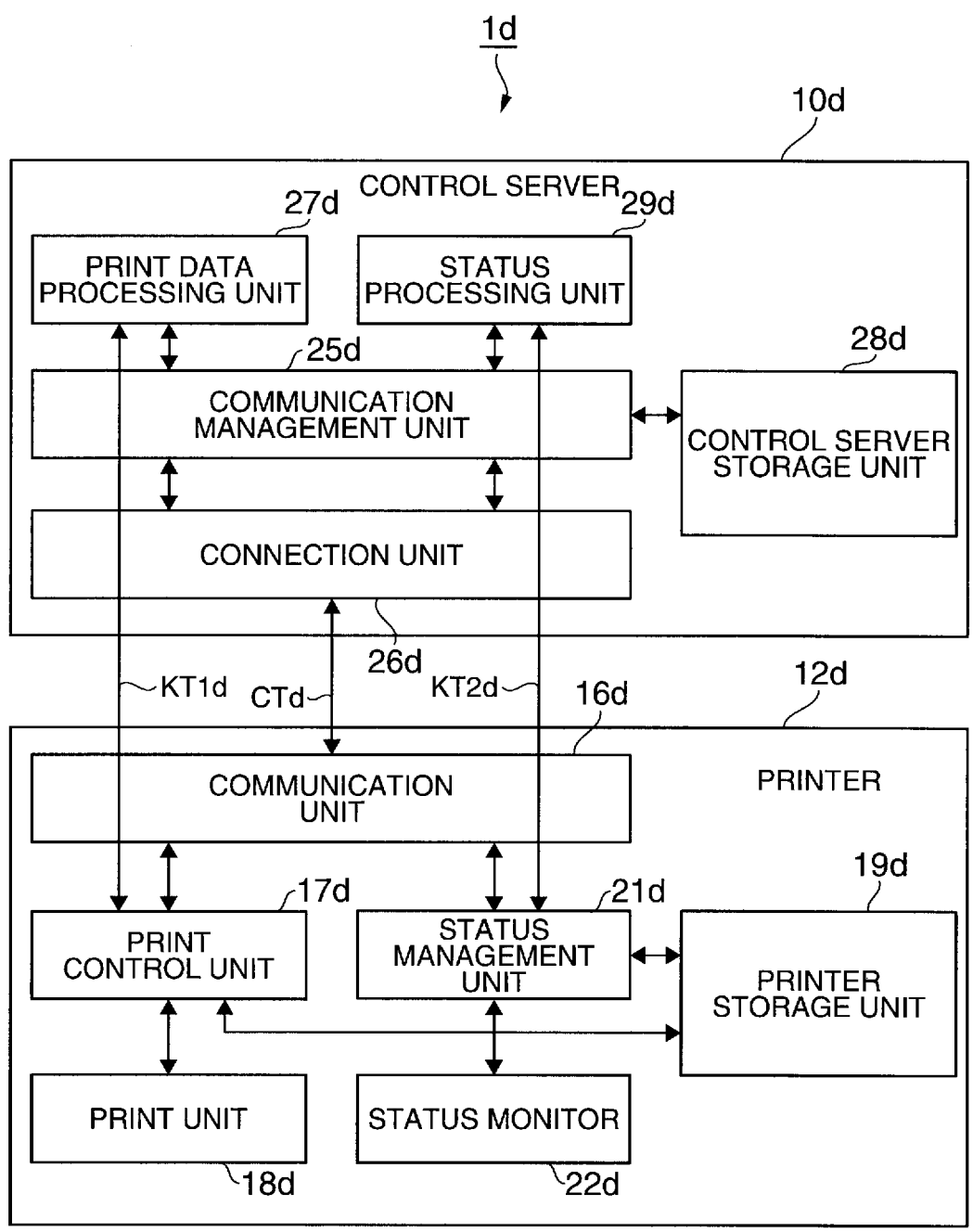
FIG. 22 is a block diagram showing the functional configuration of the control server and printer according to a variation of the fourth embodiment.

FIG. 22 is a block diagram showing the functional configuration of a printer 12d and a control server 10d according to a variation of the fourth embodiment.

In the above fourth embodiment, the communication control unit 15d adds printer identification information and function unit identification information to the data output by a function unit. In this embodiment, the function unit adds the printer identification information and function unit identification information to the data. The function unit also sends the data to the communication unit 16d, and sends the data by the WebSocket connection CT to the control server 10d.

In a more specific example, when sending data such as the print result data, the print control unit 17d adds the printer identification information and the function unit identification information of the print control unit 17d to the data. Next, the print control unit 17d sends the data with the added identification information to the communication unit 16d. As a result, the data with added identification information is sent through the WebSocket connection CT to the control server 10d.

Likewise, when sending data, the status management unit 21d adds the printer identification information and the function unit identification information of the status management unit 21d to the data. Next, the status management unit 21d sends the data with the added identification information to the communication unit 16d. As a result, the data with added identification information is sent through the WebSocket connection CT to the control server 10d.

As in the first embodiment described above, the communication management unit 25d of the control server 10d changes the process unit to which the data is sent based on the specific combination of printer identification information and function unit identification information added to the received data.

The function units of the printer 12d may also be configured to add the printer identification information and function unit identification information to the output data. A configuration in which the function unit adds the function unit identification information when only one printer 12d is connected to the control server 10d is also conceivable.

The invention is described above with reference to a preferred embodiment thereof, but the invention is not limited thereto and can be modified and adapted in many ways without departing from the scope of the accompanying claims.

In the embodiments described above, the printer 12d is installed as part of a store system 11d deployed in a business. However, the printer 12d is not limited to being part of a store system 11d, and can be used in other systems.

In addition, print data is sent as an XML file from the control server 10d to the printer 12d in the foregoing embodiment, but the data format of the print data is not limited to XML. The print data may be data created in another markup language, or control commands in the command language of the print unit 18d.

The function blocks shown in FIG. 17 and FIG. 22 can also be rendered as desired using hardware and software, and do not suggest a specific hardware configuration. Functions of the printer 12d may also be rendered by a separate externally connected device. The printer 12d can also execute the processes described above by running a program stored on an externally connected storage medium.

Embodiment 5

A fifth embodiment of the invention is described next.

Figure 23:
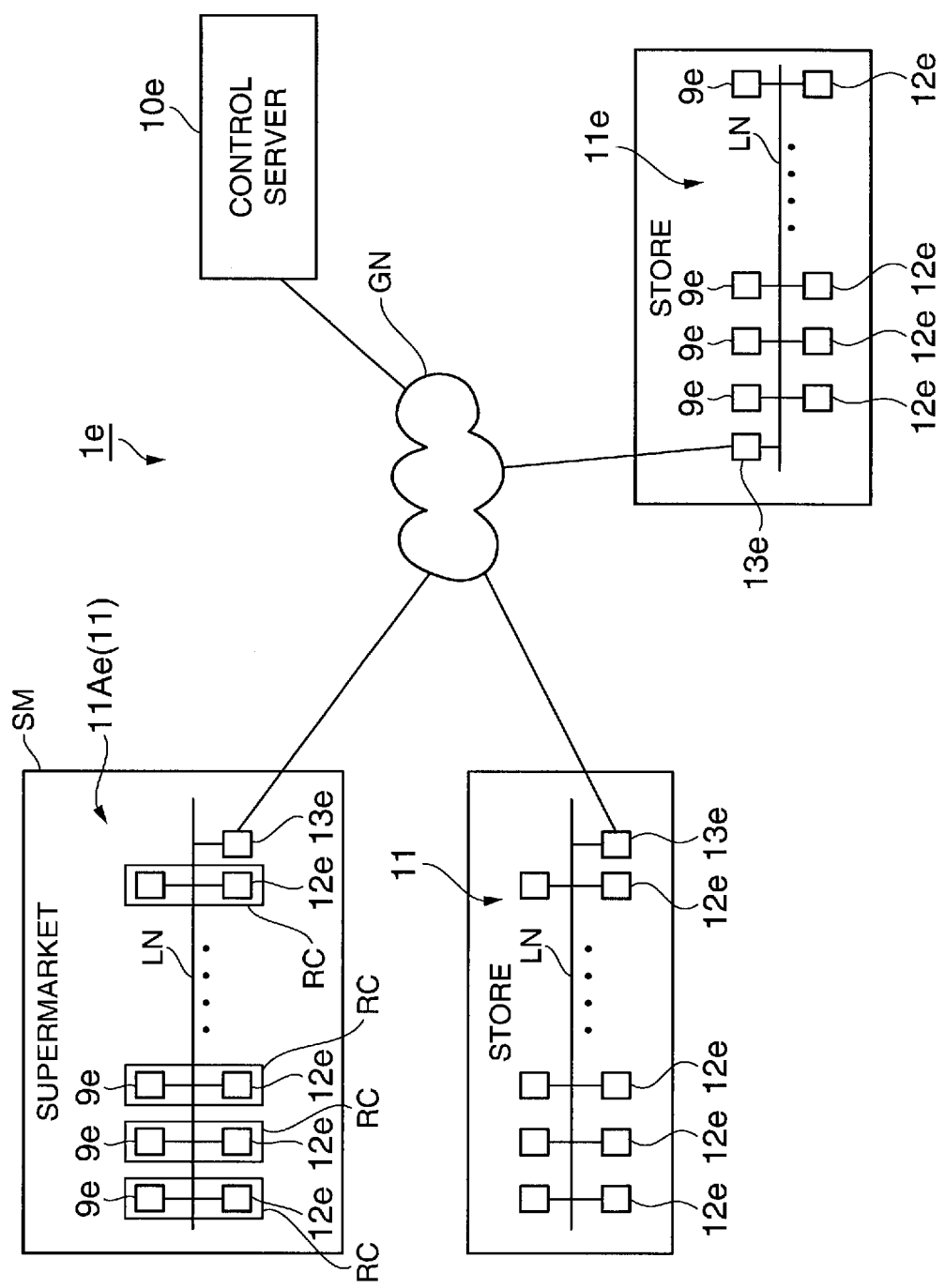
FIG. 23 shows the configuration of a control system according to a fifth embodiment of the invention.

FIG. 23 shows the configuration of a print control system 1e according to this embodiment of the invention.

As shown in FIG. 23, the print control system 1e includes a control server 10e (print control device), and a plurality of store systems 11e that connect to the control server 10e through the Internet or other network GN.

The store system 11e is a system that is used in retail businesses such as supermarkets, convenience stores, department stores, and restaurants. The store system 11e has functions including at least running a sales transaction process and producing receipts for customers of the business.

One or a plurality of checkout counters RC are installed in the store system 11e. A printer 12e and a tablet computer 9e (terminal) are installed at each checkout counter RC. The printer 12e has a print function for printing on print media and can produce receipts. The tablet computer 9e is a common tablet computer. In this embodiment of the invention a touch panel 31e is disposed to the front surface of the tablet computer 9e, and information can be input and operations performed by touching the touch panel 31e. The tablet computer 9e provides a user interface enabling the checkout clerk at the checkout counter RC to input information related to a transaction. As described below, the printer 12e produces a receipt according to information input through the user interface of the tablet computer 9e using a function of the control server 10e.

The printer 12e and tablet computer 9e connect to a local area network LN deployed in the business. A network communication controller 13e configured with a communication device such as a network router or modem connects to the local area network LN. The printer 12e and tablet computer 9e access the network GN through the network communication controller 13e.

For example, the store system 11Ae in this example is a system used in a supermarket SM. Plural checkout counters RC are set up in the supermarket SM, and a printer 12e and tablet computer 9e are installed at each checkout counter RC. The printers 12e and tablet computers 9e in the store system 11ed are connected to the local area network LN, and access the network GN through the network communication controller 13e.

In the print control system 1e according to this embodiment of the invention, the printer 12e and tablet computer 9e at each checkout counter RC in the store system 11e establish a WebSocket connection CT (communication path) with the control server 10e, and communicate with the control server 10e using the WebSocket protocol.

Figure 24:
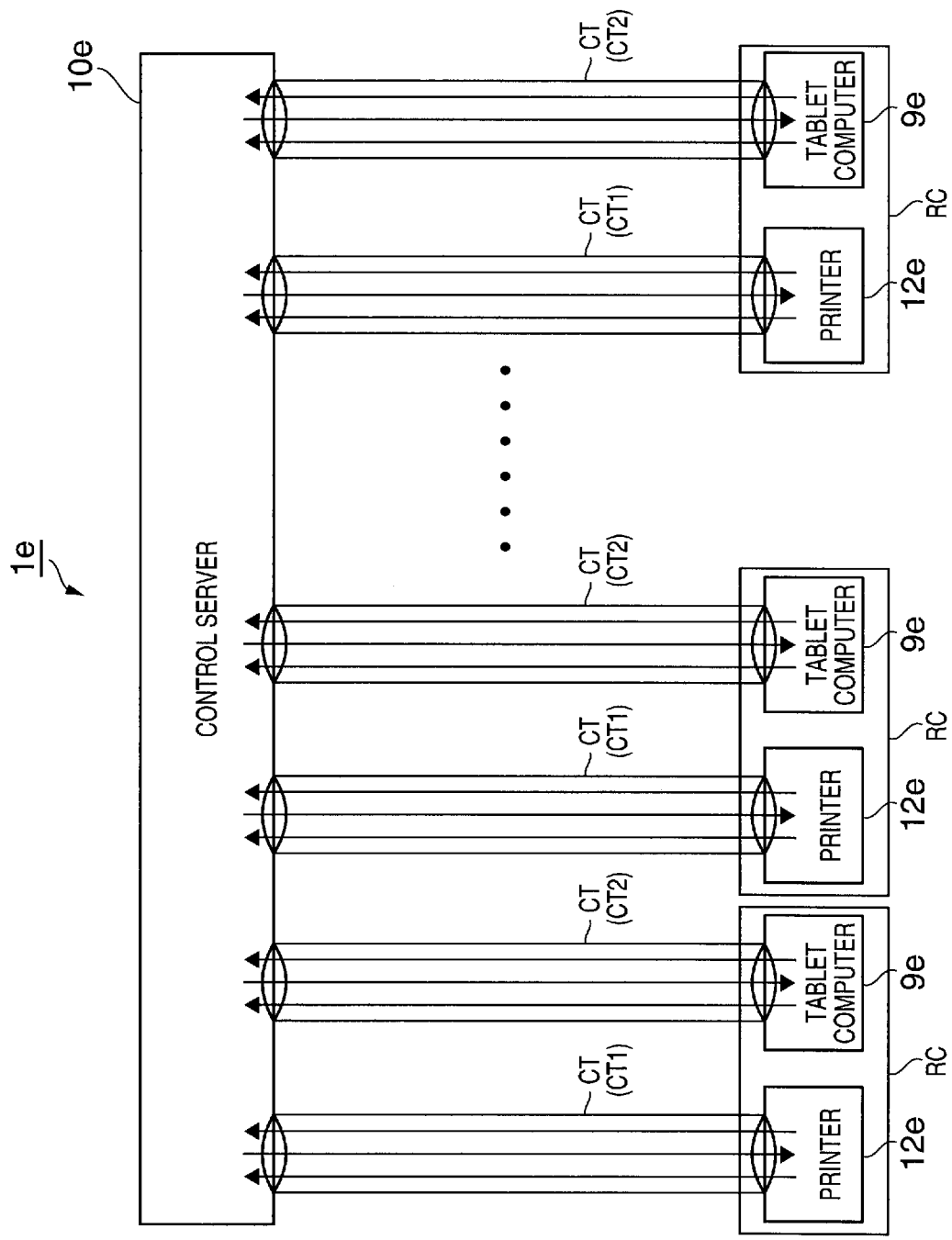
FIG. 24 illustrates communication paths established between the control server and printer.

FIG. 24 illustrates the communication paths established between the control server 10e and the printers 12e and tablet computers 9e in the print control system 1e.

As shown in FIG. 24, a WebSocket connection CT (communication path) is established between the control server 10e and each printer 12e in each store system 11e. A WebSocket connection CT (communication path) is established between the control server 10e and each tablet computer 9e in each store system 11e.

WebSocket is a communication standard that enables asynchronous duplex communication between servers and clients connected through a network. After a server and client open a WebSocket connection CT using the WebSocket standard, sending and receiving data between the devices uses a dedicated protocol by means of the connection. It is therefore not necessary to establish a connection every time data is transmitted.

The WebSocket connection CT is a logical communication path for sending and receiving data according to the WebSocket protocol and procedures between the printer 12e and control server 10e connected through the WebSocket connection CT. Therefore, once the printer 12e and control server 10e handshake and establish a WebSocket connection CT, the printer 12e and control server 10e can exchange data asynchronously over the WebSocket connection CT. More specifically, the control server 10e can send data to the printer 12e through the WebSocket connection CT at any time, and the printer 12e can send data to the control server 10e through the WebSocket connection CT.

WebSocket communication is asynchronous, duplex communication between the printer 12e and control server 10e through the WebSocket connection CT based on the WebSocket protocol and methods.

The printer 12e and control server 10e communicate by asynchronous, duplex communication (WebSocket communication) through the WebSocket connection CT. More specifically, the control server 10e can push data to the printer 12e by WebSocket communication through the WebSocket connection CT without receiving a request from the printer 12e operating as a client device at any time. Likewise, the printer 12e can push data to the control server 10e through the WebSocket connection CT at any time. This also applies to the control server 10e and tablet computers 9e.

In this embodiment of the invention the control server 10e is a client server in a cloud computing system. More specifically, the control server 10e can process data, execute a specific operation when triggered by a request from the printer 12e or a request from the tablet computer 9e or other external device to the printer 12e, and send data based on the result of the process through the WebSocket connection CT to the printer 12e and tablet computer 9e.

In FIG. 24 the control server 10e is represented as a single block, but this does not mean that the control server 10e is configured from a single server. For example, the control server 10e may be configured from multiple servers, or it may be a server rendered by a function of a specific system. More specifically, the control server 10e may be any configuration that can execute the processes described herein.

The control server 10e and printer 12e communicate according to the WebSocket communication protocol in this embodiment. The invention is not limited to WebSocket communication, however, and other configurations capable of asynchronous, duplex communication in the same way as WebSocket communication may be used. This also applies to the control server 10e and tablet computers 9e.

The WebSocket connection CT established between the control server 10e and the printer 12e is referred to below as the first WebSocket connection CT1. The WebSocket connection CT opened between the control server 10e and the tablet computer 9e is referred to as the second WebSocket connection CT2. When not differentiating between the first WebSocket connection CT1 and the second WebSocket connection CT2, they are generically referred to as the WebSocket connection CT.

The print control system 1e thus has multiple (such as a 1000) printers 12e each capable of printing and tablet computers 9e controlling the printers 12e communicatively connected through a WebSocket connection CT to a control server 10e.

Such a configuration enables the following.

The control server 10e can collect, manage, and analyze information based on data received from the plural printers 12e and the plural tablet computers 9e connected to the store system 11e. Valuable information can therefore be collected. The collected information can be used as "big data."

Constructing a store system 11e can also be made easier and cheaper. More specifically, the printers 12e and the plural tablet computers 9e are connected to the control server 10e by a WebSocket connection CT in this print control system 1e. Using a service provided by the control server 10e, this enables controlling the printers 12e and the plural tablet computers 9e to execute processes as controlled by the control server 10e. For example, using a service provided by the control server 10e, the printer 12e can be commanded to print based on a print command from the tablet computer 9e. An administrator constructing a store system 11e can therefore build the store system 11e by simply installing the printers 12e and tablet computers 9e where desired, and then connecting them to the network GN. This enables controlling the printers 12e to execute a desired process, such as a process related to producing receipts, using a service provided by the control server 10e. The tablet computer 9e can also be controlled to execute a specific process, such as displaying a desired image on the touch panel 31e.

In addition, because printers 12e from different store systems 11e are connected to the control server 10e by a WebSocket connection CT, the control server 10e can manage the plural printers 12e in the plural store systems 11e. The control server 10e can also operate the plural printers 12e.

Figure 25:
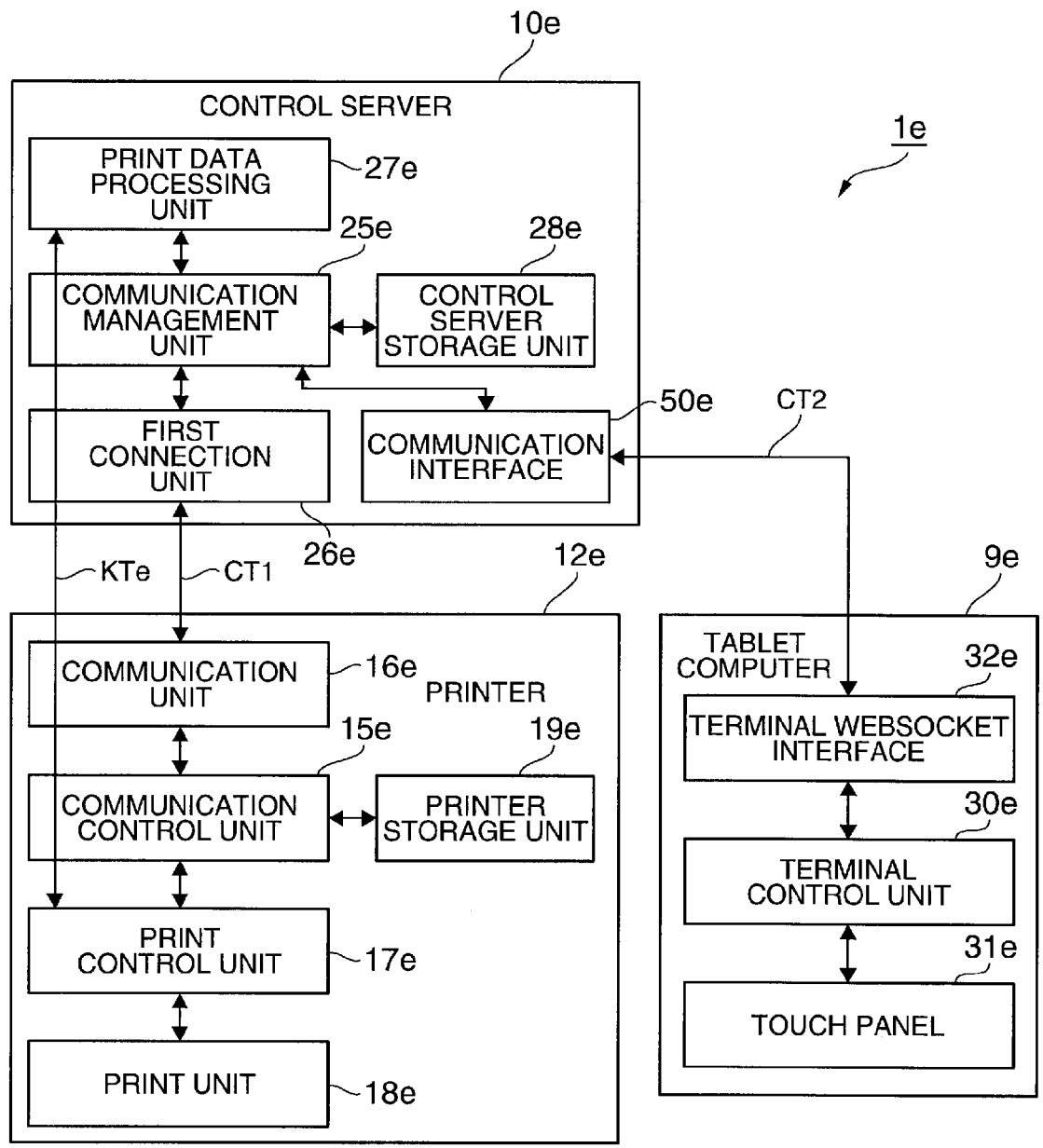
FIG. 25 is a block diagram showing the functional configuration of devices in the control system.

FIG. 25 is a block diagram showing the functional configuration of the printer 12e, the control server 10e, and the tablet computer 9e.

As shown in FIG. 25, the printer 12e has a communication control unit 15e, a communication unit 16e, a print control unit 17e, a print unit 18e, and a printer storage unit 19e.

The functions of the communication control unit 15e, communication unit 16e, and print control unit 17e are described further below.

The print unit 18e includes mechanisms related to printing, such as a print mechanism that prints on print media, a conveyance mechanism that conveys the print media, and a cutting mechanism that cuts the print media, and control boards related to controlling the mechanisms.

The printer storage unit 19e is nonvolatile memory, and stores data. Address data and printer identification information as further described below are stored in the printer storage unit 19e.

As shown in FIG. 25, the control server 10e includes a communication management unit 25e, a first connection unit 26e, a print data processing unit 27e, a control server storage unit 28e (identification information storage unit), and a communication interface 50e.

The functions of the communication management unit 25e, first connection unit 26e, communication interface 50e, and print data processing unit 27e are described below.

The control server storage unit 28e has nonvolatile memory, and stores data. A first connection management database, a second connection management database, and an identification information management database are stored in the control server storage unit 28e and described below.

As shown in FIG. 25, the tablet computer 9e has a terminal control unit 30e, a touch panel 31e, and a terminal WebSocket interface 32e.

The function of the terminal WebSocket interface 32e is described further below.

The terminal control unit 30e includes a CPU, ROM, RAM, and other peripheral circuits, and controls the tablet computer 9e.

The touch panel 31e comprises an LCD or other type of display panel disposed at the front of the tablet computer 9e, and a touch sensor disposed over the display panel. The touch panel 31e displays images on the display panel as controlled by the terminal control unit 30e. The touch panel 31e detects touches by means of the touch sensor, and outputs to the terminal control unit 30e.

FIG. 25 shows the relationship between the control server 10e and one printer 12e connected to the control server 10e. When plural printers 12e are connected to the control server 10e, the control server 10e has the same number of first connection units 26e (WebSocket interfaces) as there are printers 12e, establishes a WebSocket connection CT with each printer 12e, and communicates by WebSocket protocol through the connections to each printer 12e.

FIG. 25 also shows the relationship between the control server 10e and one tablet computer 9e connected to the control server 10e. When plural tablet computers 9e are connected to the control server 10e, the control server 10e has the same number of communication interfaces 50e (WebSocket interfaces) as there are tablet computers 9e, establishes a WebSocket connection CT with each tablet computer 9e, and communicates by WebSocket protocol through the connections to each tablet computer 9e.

The operation of the printer 12e and control server 10e when the printer 12 power turns on is described next.

FIG. 18 is a flow chart showing the operation of the printer 12e and the control server 10e after the printer 12e power turns on, column (A) showing the operation of the printer 12e, and column (B) showing the operation of the control server 10e.

The trigger of the process shown in the flow chart in FIG. 18 is not limited to the power turning on. For example, this process may be triggered by the printer 12e connecting to the network GN and enabling communication, or by an instruction from a user.

Note that in the configuration described below, the printer 12e is connected to the local area network LN of the store system 11e in which it is used, and can access the network GN.

The functions of the function blocks of the communication control unit 15e and print control unit 17e of the printer 12e, and the communication management unit 25e and the print data processing unit 27e of the control server 10e, are rendered as described below.

More specifically, these function blocks are software objects. An object is an instance created in an object-oriented programming language, and more specifically is a function block defined by a set of data and methods. The function of a particular function block is rendered by calling (invoking) a method of the function block.

The functions of these function blocks may also be rendered by the CPU or other hardware assets reading and running an application. Configurations in which the function of a single function block is rendered by a single application, configurations in which the function of plural function blocks are rendered by a single application, and configurations in which the function of a single function block is rendered by plural applications, are possible.

In other words, the function blocks represent functions as conceptual blocks, and do not mean any specific application or hardware construction.

Figures 26A, 26B:
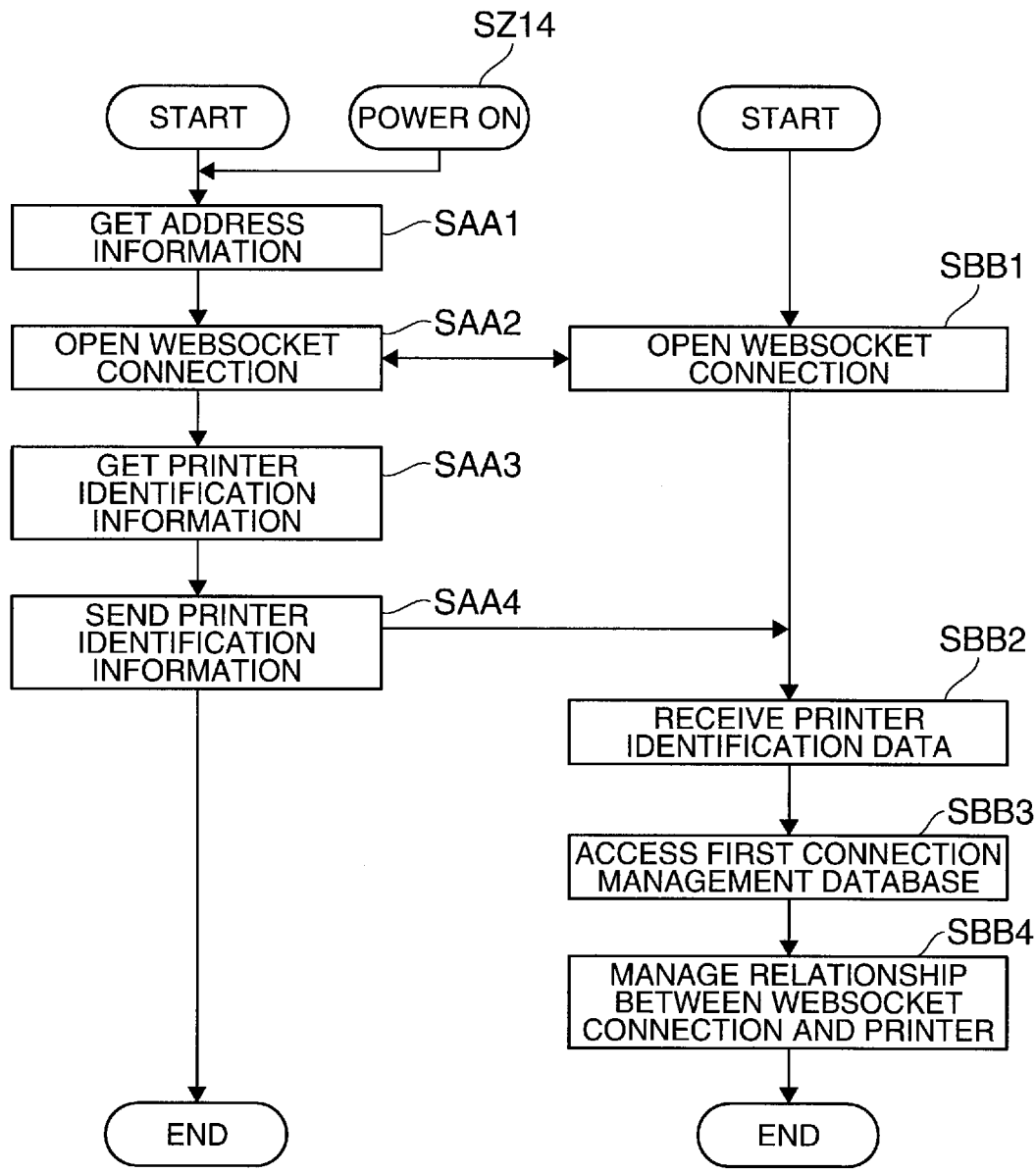
FIGS. 26A and 26B are flow charts of the operation of the printer and control server.

As shown in FIG. 26 (A), when the printer 12e power turns on (step SZ14), the communication control unit 15e accesses the printer storage unit 19e and gets the address data stored in the printer storage unit 19e (step SAA1).

The address data is the address (such as the domain name, IP address, path name, port information) of the control server 10e accessed when establishing the WebSocket connection CT. When opening a WebSocket connection CT according to the WebSocket protocol, the client (the printer 12e in this example) handshakes with the server (the control server 10e in this example) using HTTP (Hypertext Transfer Protocol). When handshaking, the client sends a message containing the address of the server, and the address data is the address to be accessed.

Next, the communication control unit 15e establishes a first WebSocket connection CT1 with the communication management unit 25e of the control server 10e through the communication unit 16e and the first connection unit 26e based on the address in the address data (step SAA2, step SBB1). In other words, the printer 12e according to this embodiment establishes a WebSocket connection CT when triggered by the power turning on without receiving an instruction from the user or a request from the control server 10e.

The communication unit 16e and first connection unit 26e are WebSocket interfaces enabling data communication based on the WebSocket protocol and methods. These function blocks are instantiated using a WebSocket Socket.IO library, for example.

More specifically, the communication unit 16e has functions for processing data that is received from the communication control unit 15e according to WebSocket, and sending the data through the first WebSocket connection CT1 based on WebSocket methods. The communication unit 16e also has functions for processing data that is received through the first WebSocket connection CT1 according to WebSocket methods, and sending to the communication control unit 15e. The first connection unit 26e is similarly configured. This also applies to the first connection unit 26e, the communication interface 50e, and the terminal WebSocket interface 32e.

When the first WebSocket connection CT1 is established, the printer 12e and control server 10e can communicate through an asynchronous, duplex communication link. More specifically, the control server 10e can push to the printer 12e through the first WebSocket connection CT1 without receiving a request from the printer 12e operating as a client.

Next, the communication control unit 15e of the printer 12e accesses the printer storage unit 19e and gets the printer identification information stored in the printer storage unit 19e (step SAA3). The printer identification information is data representing the identification information of the printer 12e (referred to below as printer identification information). The printer identification information is, for example, a serial number assigned to the printer 12e when the printer 12e is manufactured.

Next, the communication control unit 15e sends the printer identification information over the first WebSocket connection CT1 (step SAA4).

As shown in FIG. 26 (B), the communication management unit 25e of the control server 10e receives the printer identification information (step SBB2).

Next, the communication management unit 25e accesses the first connection management database stored in the control server storage unit 28e (step SBB3). The first connection management database is a database relationally storing for the WebSocket connections CT that were established connection identification information identifying the WebSocket connection CT and the printer identification information of the printer.

Next, the communication management unit 25e creates one record in the first connection management database. The communication management unit 25e then stores in the created record the connection identification information of the first WebSocket connection CT established in step SBB1 related to the printer identification information in the printer identification information received in step SBB2 identification information (step SBB4). Note that when a WebSocket connection CT is opened, the communication management unit 25e generates connection identification information for that connection that is different from the connection identification information of any other WebSocket connection CT that was already opened. The relationship between the WebSocket connections CT and printers 12e is managed by the process of step SBB4.

The printer 12e according to this embodiment of the invention thus establishes a first WebSocket connection CT established triggered by the power turning on without receiving a user instruction or a request from the control server 10e. Thus comprised, the user does not need to perform a complicated operation to open a first WebSocket connection CT. Special knowledge is also not needed to open a first WebSocket connection CT. After the power turns on, the printer 12e can also be automatically quickly enabled to execute processes as controlled by the control server 10e.

The operation of the printer 12e and control server 10e when establishing a first WebSocket connection CT1 is described above.

The same process is used to establishes a second WebSocket connection CT2 between a tablet computer 9e and the control server 10e. The tablet computer 9e opens a second WebSocket connection CT2 at specific times, such as when a specific application starts, when a connection enabling accessing the network GN is completed, and when commanded by the user, for example.

When a second WebSocket connection CT2 between the tablet computer 9e and the control server 10e is established, a record is created in the second connection management database. The terminal identification information, which is the identification information of the particular tablet computer 9e, and the connection identification information of the second WebSocket connection CT2, are relationally stored in the record.

A first WebSocket connection CT is thus established between the communication unit 16e and first connection unit 26e. As a result, a function unit communication path KTe based on the first WebSocket connection CT is established between the print control unit 17e of the printer 12e, and the print data processing unit 27e of the control server 10e. The print control unit 17e and print data processing unit 27e can communicate by asynchronous duplex communication through the function unit communication path KTe. Asynchronous duplex communication through the function unit communication path KTe is described further below.

Device operation in a transaction process from the input to the tablet computer 9e of information related to the transaction until a receipt is produced by the printer 12e based on the input information is described next.

Figure 27A:
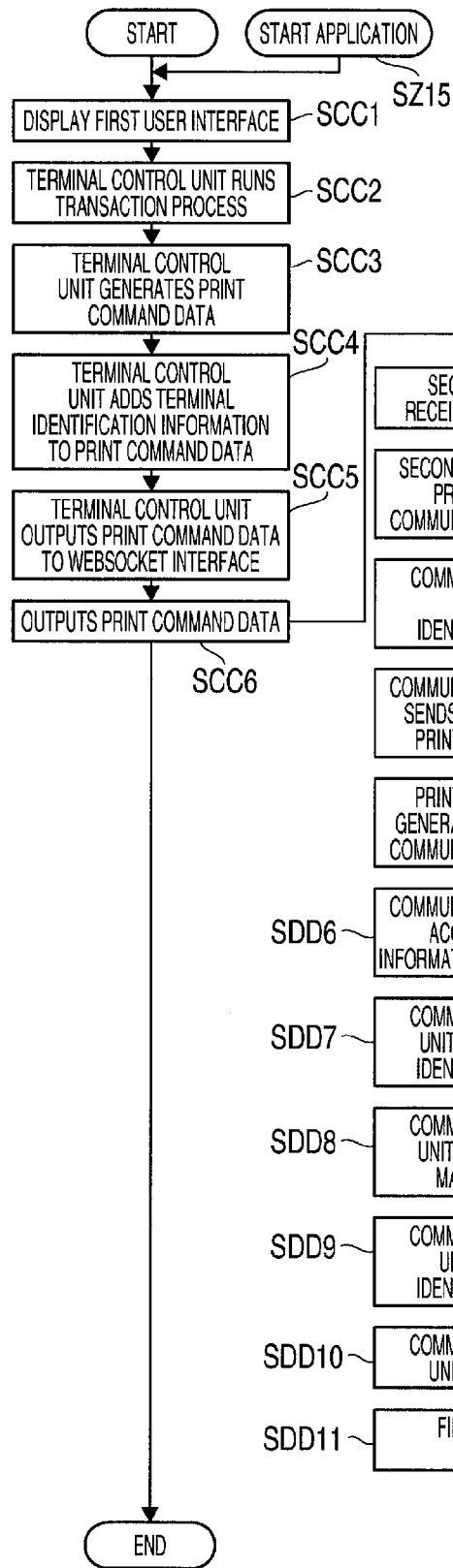
FIGS. 27A-27C are flow charts of the operation of devices in the control system.
Figure 27B:
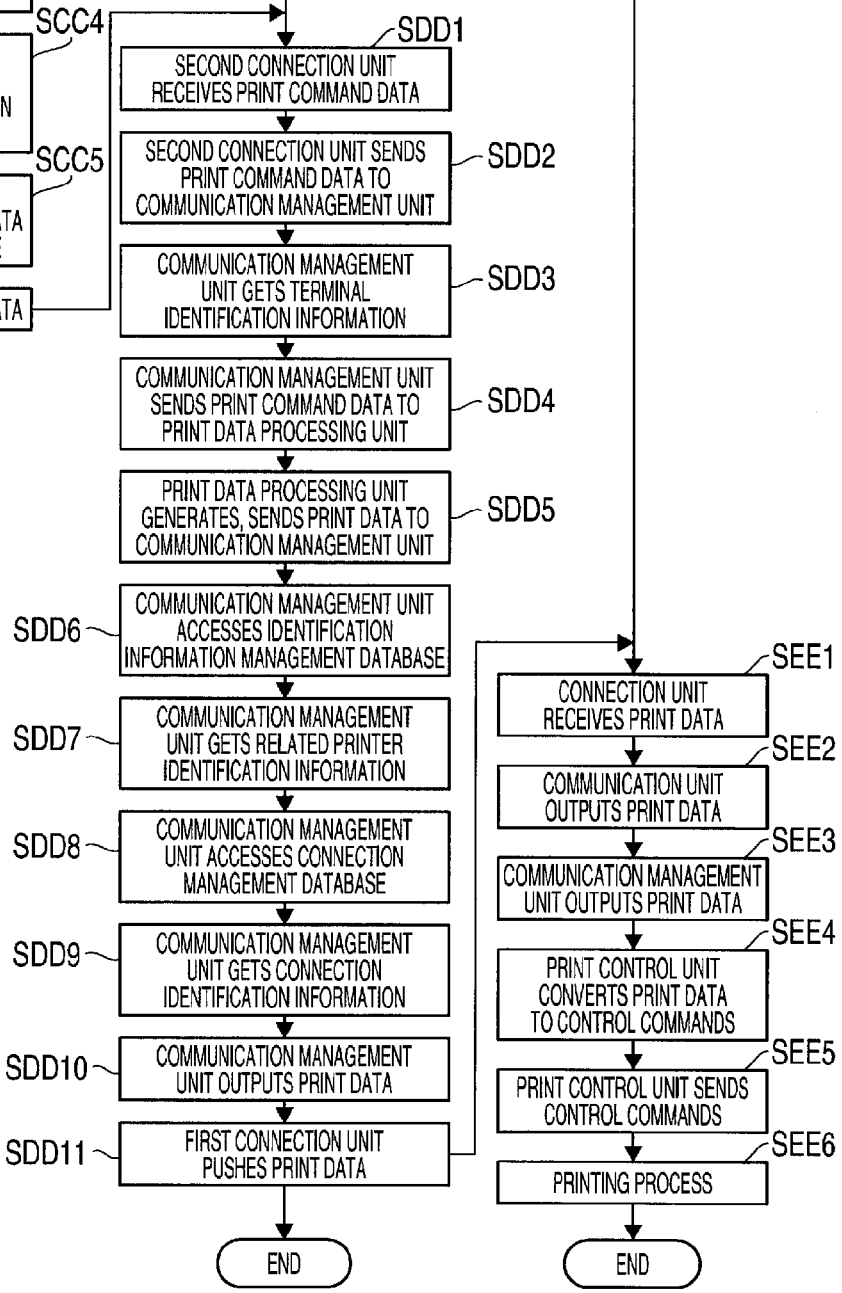
Figure 27C:
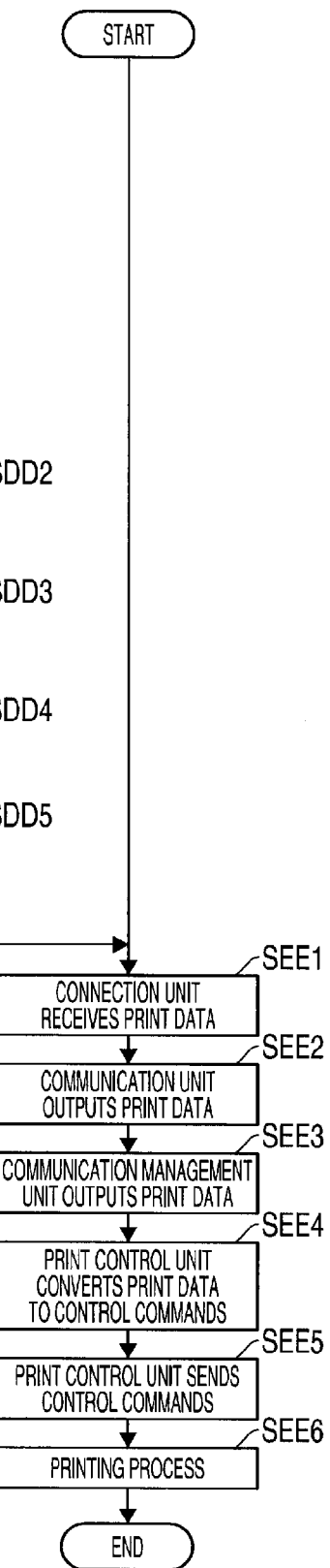

FIG. 27 is a flow chart showing the operation of the devices in the print control system 1e during the transaction process, (A) showing the operation of the tablet computer 9e, and (B) showing the operation of the control server 10e, and (C) showing the operation of the printer 12e.

In the example described below, the printer 12e and tablet computer 9e are installed at the same checkout counter RC in a particular store system 11e. More specifically, the process in which a clerk at one checkout counter RC inputs transaction-related information to the tablet computer 9e at the checkout counter RC, and a receipt printed with transaction-related information is printed by the printer 12e installed at the same checkout counter RC, is described below.

As shown in FIG. 27 (A), the clerk first starts an application on the tablet computer 9e (step SZ15). This process is done when the store opens or before starting a transaction, for example.

When the application starts, the terminal control unit 30e displays a first user interface 35e (user interface, referred to below as the first user interface 35e) on the touch panel 31e using a function of the application (step SCC1).

For example, a web browser may be installed on the tablet computer 9e, a specific server (such as the control server 10e) is accessed through a function of the web browser, and the first user interface 35e is displayed as a web page.

Figure 28:
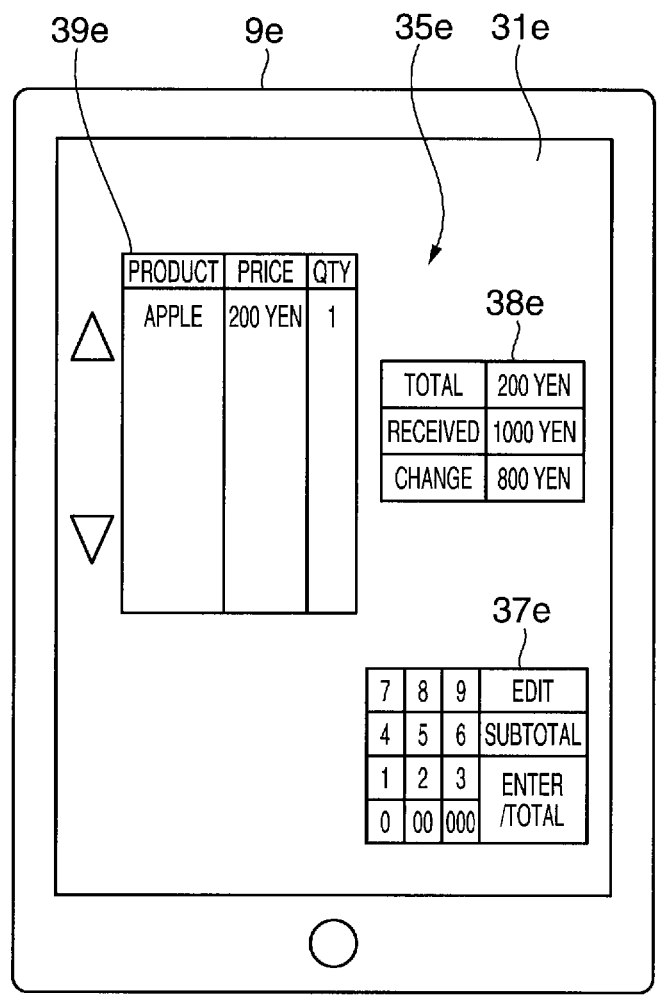
FIG. 28 shows an example of a first user interface.

FIG. 28 shows an example of a first user interface 35e that may be displayed on the touch panel 31e.

As shown in FIG. 28, there is a list area 39e for displaying the name, unit price, and quantity of products purchased by a customer in the top left part of the first user interface 35e. On the right beside the list area 39e is an amount display area 38e where the total of all products purchased by the customer, the amount received from the customer for payment, and the amount of change due are displayed. A virtual keypad 37e is located below the amount display area 38e.

Although not shown in the figures, the tablet computer 9e is also configured to accept input of such data as the result of a barcode reader reading a barcode on the products or product packaging. Using a function of the application, the terminal control unit 30e displays information related to the products purchased by a customer in the list area 39e based on the result from the barcode reader or other input. The tablet computer 9e can communicate with a POS server that stores a product master database and a customer master database. The terminal control unit 30e acquires information about the products, information about the customer, and other transaction-related information from the product master database and the customer master database.

In step SCC2, the terminal control unit 30e runs the transaction process. The transaction process executed in step SCC2 is described below.

Input based on reading the barcodes from the products purchased by the customer, input through the virtual keypad 37e, and other inputs are made through the first user interface 35e at the checkout counter RC. Based on the input to the first user interface 35e, the terminal control unit 30e references the product master, for example, and displays information related to the products purchased by the customer. The terminal control unit 30e also calculates the total purchase amount, and displays the calculated total in a specific field in the amount display area 38e. Customer payment is also received and change is made by the clerk at the checkout counter RC. In these operations, the terminal control unit 30e displays information in the corresponding fields in the amount display area 38e.

After the transaction process in step SCC2, the terminal control unit 30e generates print command data instructing producing a receipt on which transaction-related information is printed based on the information input to the first user interface 35e (step SCC3). The print command data is data containing information written in a specific format, and includes information about the transaction to print on the receipt.

Next, the terminal control unit 30e adds the terminal identification information of the tablet computer 9e to the print command data (step SCC4). The terminal identification information may be the serial number of the tablet computer 9e, or the MAC address of the network card of the tablet computer 9e, for example.

Next, the terminal control unit 30e sends the print command data to the terminal WebSocket interface 32e (step SCC5).

The terminal WebSocket interface 32e sends the print command data through the second WebSocket connection CT2 to the control server 10e (step SCC6).

As shown in FIG. 27 (B), the communication interface 50e receives the print command data through the second WebSocket connection CT2 (step SDD1). Next, the communication interface 50e sends the print command data to the communication management unit 25e (step SDD2).

The communication management unit 25e then acquires the terminal identification information added to the received print command data (step SDD3). Next, the communication management unit 25e sends the received print command data to the print data processing unit 27e (step SDD4).

Based on the received print command data, the print data processing unit 27e generates and outputs print data for controlling the printer 12e to the communication management unit 25e (step SDD5).

The print data is an XML (eXtensible Markup Language) file containing the information to be printed by the printer 12e. The print data includes the information to be printed by the printer 12e, including image data and information identifying the location of the image on the print medium.

Next, the communication management unit 25e references the identification information management database stored by the control server storage unit 28e (step SDD6).

The identification information management database is a database that relationally stores, for each printer 12e that can open a WebSocket connection CT with the control server 10e, the printer identification information of the printer 12e, and the terminal identification information of the tablet computer 9e. The identification information of a printer 12e, and the tablet computer 9e that controls the printer 12e, is relationally stored in the identification information management database. For example, the printer 12e installed at one checkout counter RC is controlled by the tablet computer 9e installed at the same checkout counter RC. The identification information of the printer 12e and the tablet computer 9e that are installed at any one checkout counter RC is therefore stored in the identification information management database. The content of the identification information management database can be overwritten by a specific means.

Next, the communication management unit 25e gets the printer identification information related to the terminal identification information from the identification information management database using the terminal identification information acquired in step SDD3 (step SDD7). Next, the communication management unit 25e accesses the first connection management database stored by the control server storage unit 28e (step SDD8). Next, using the printer identification information acquired in step SDD7, the communication management unit 25e gets the connection identification information of the WebSocket connection CT related to the identification information from the first connection management database (step SDD9). The connection identification information acquired in step SDD9 by the communication management unit 25e is the connection identification information of the first WebSocket connection CT1 that was established with the printer 12e that is to print.

Next, the communication management unit 25e sends the print data to the first connection unit 26e corresponding to the first WebSocket connection CT1 identified by the connection identification information acquired in step SDD9 (step SDD10).

The first connection unit 26e pushes the received print data by means of the first WebSocket connection CT1 (step SDD11).

As shown in FIG. 27 (C), the communication unit 16e receives the print data through the first WebSocket connection CT1 (step SEE1).

The communication unit 16e sends the received print data to the communication control unit 15e (step SEE2).

The communication control unit 15e sends the received print data to the print control unit 17e (step SEE3).

The print control unit 17e converts the received print data to control commands in the command language of the print unit 18e (step SEE4). More specifically, the print control unit 17e converts the print data, which is an XML file, to commands that can be interpreted by the control board of the print unit 18e.

Next, the print control unit 17e sends the control commands to the print unit 18e (step SEE5).

The print unit 18e then prints on the print medium based on the control commands, and issues a receipt (step SEE6).

As described above, the control server 10e manages the relationships between printers 12e and tablet computers 9e. When print command data is received from the tablet computer 9e, the control server 10e generates and sends print data based on the print command data to the printer 12e.

Triggered by receiving print command data from a tablet computer 9e, the control server 10e in this embodiment of the invention can generate print data and send the generated data without receiving a request from the printer 12e. As a result, this configuration can start printing faster than a configuration in which the printer 12e intermittently sends a request to the control server 10e, and the control server 10e sends print data in response to such a request when there is a need to print with the printer 12e. Consumption of resources can also be suppressed compared with a configuration in which the control server 10e queues responses to requests.

As described above, the print control system 1e according to this embodiment of the invention includes a tablet computer 9e (terminal), a printer 12e, and a control server 10e (print control device). The tablet computer 9e sends print command data instructing printing and terminal identification information. The printer 12e has a printer storage unit 19e that stores printer identification information, and a print unit 18e that prints based on print data.

The control server 10e includes a first connection unit 26e to which the printer 12e connects, a communication interface 50e to which the tablet computer 9e connects, a control server storage unit 28e (identification information storage unit) that stores an identification information management database relationally storing the terminal identification information and printer identification information, a print data processing unit 27e that generates print data based on print command data received from the tablet computer 9e, and a communication management unit 25e that acquires the printer identification information related to the terminal identification information received from the tablet computer 9e, and sends the print data to the printer 12e that stores the acquired printer identification information.

Thus comprised, the relationship between tablet computer 9e and printer 12e is managed by the control server 10e. As a result, when print command data is sent by the tablet computer 9e to the control server 10e, print data based on the print command data is sent through the control server 10e to the printer 12e, and the printer 12e prints based on the print data. The tablet computer 9e can therefore use a function of the control server 10e to send data through the control server 10e to the printer 12e and control the printer 12e.

The tablet computer 9e has a first user interface 35e to which transaction-related information is input, and a terminal control unit 30e that generates print command data based on the information input to the first user interface 35e.

Thus comprised, based on transaction-related information input to the terminal through the first user interface 35e, the tablet computer 9e can print transaction-related information on a print medium by means of the printer 12e using a function of the control server 10e.

Variation of Embodiment 5

A variation of embodiment 5 of the invention is described next.

Figure 29:
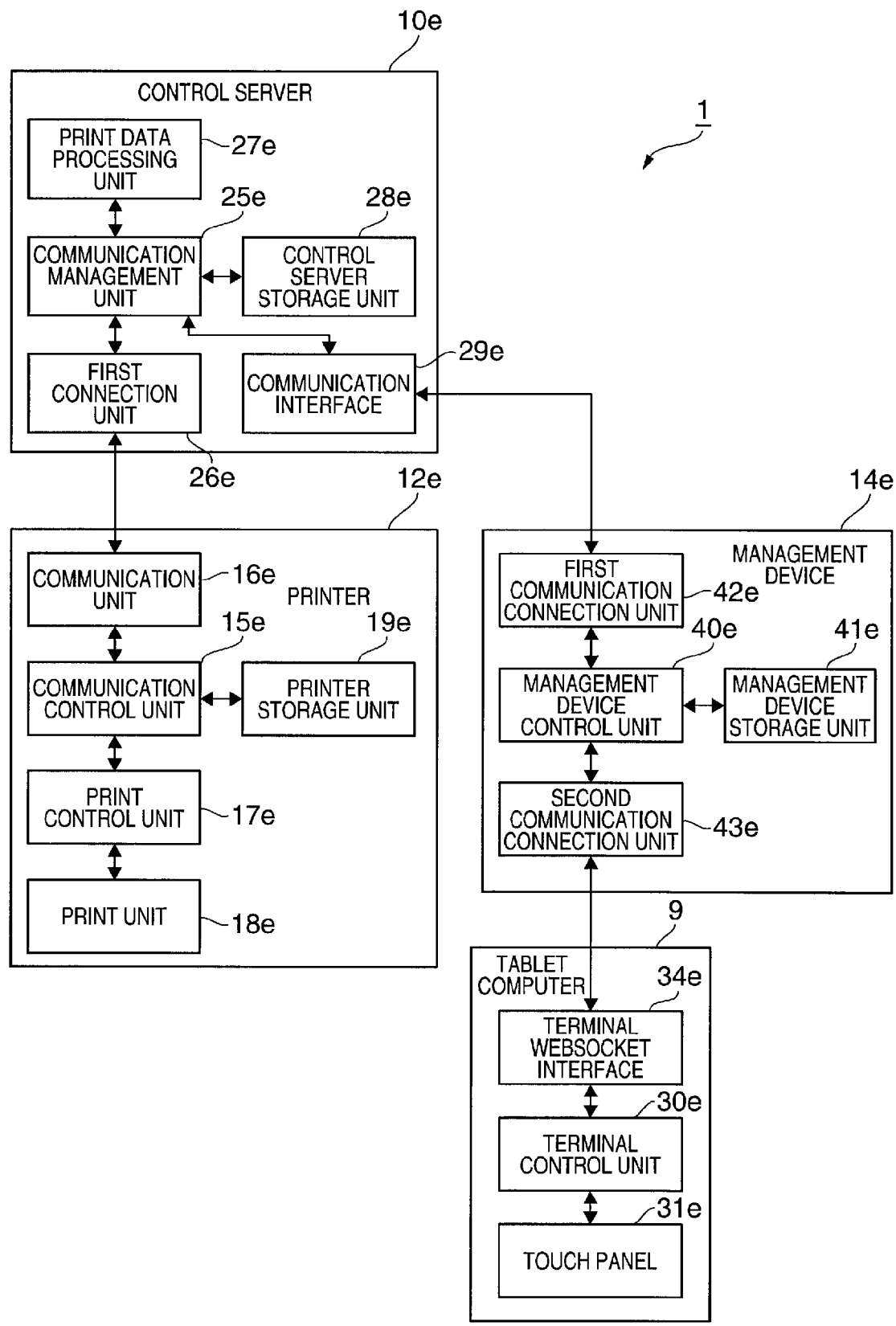
FIG. 29 is a block diagram showing the functional configuration of devices in a control system according to a variation of the fifth embodiment.

FIG. 29 is a block diagram showing the functional configuration of a print control system 1e according to a variation of the fifth embodiment.

Note that like elements in the fifth embodiment described above and this variation of the fourth embodiment described below are identified by like reference numerals, and further detailed description thereof is omitted.

As shown in FIG. 29, the print control system 1e according to this variation of the fifth embodiment also has a management device 14e. The tablet computer 9e connects to the management device 14e instead of the control server 10e. The management device 14e connects to the control server 10e.

The management device 14e is a device that manages one or more store systems 11e as described below. For example, the management device 14e may be installed in the headquarters of a company that operates multiple stores, and manage the store systems 11e deployed in multiple stores associated with the corporate group. The management device 14e connects to the control server 10e through the network GN.

As shown in FIG. 29, the management device 14e includes a management device control unit 40e, a management device storage unit 41e (identification information storage unit), a first communication connection unit 42e, and a second communication connection unit 43e.

The management device control unit 40e includes CPU, ROM, RAM, and other peripheral circuits, and controls the management device 14e.

The management device storage unit 41e is nonvolatile memory and used to store data. The identification information management database described in the fifth embodiment above is stored in the management device storage unit 41e. As described above, the identification information management database is a database that relationally stores printer identification information and terminal identification information for related printers 12e and tablet computers 9e.

The first communication connection unit 42e communicates with the control server 10e according to a specific communication protocol as controlled by the management device control unit 40e. The communication protocol is not limited to WebSocket.

The second communication connection unit 43e communicates with the tablet computer 9e according to a specific communication protocol as controlled by the management device control unit 40e. The communication protocol is not limited to WebSocket.

As shown in FIG. 29, the tablet computer 9e has a terminal communication interface 34e instead of the terminal WebSocket interface 32e described above. The terminal communication interface 34e communicates with the management device 14e according to a specific communication protocol as controlled by the terminal control unit 30*e*. The communication protocol is not limited to WebSocket.

As shown in FIG. 29, the control server 10*e* has a second connection unit 29*e* instead of the printer identification information input interface 50 described above. The second connection unit 29*e* communicates with the management device 14*e* according to a specific communication protocol as controlled by the communication management unit 25*e*. The communication protocol is not limited to WebSocket. The identification information management database is not stored in the control server storage unit 28*e* of the control server 10*e* in this variation of the fifth embodiment.

Operation of related devices when the printer 12*d* prints based on a print instruction from the tablet computer 9*e* is described next.

Based on information input to the first user interface 35*e*, for example, the terminal control unit 30*e* of the tablet computer 9*e* generates print command data. Next, the terminal control unit 30*e* adds the terminal identification information to the generated print command data, and outputs to the management device 14*e*.

The management device control unit 40*e* of the management device 14*e* then references the identification information management database stored by the management device storage unit 41*e*, and gets the printer identification information related to the terminal identification information added to the print command data. Next, the management device control unit 40*e* adds the acquired printer identification information to the print command data, and outputs to the control server 10*e*.

The communication management unit 25*e* of the control server 10*e* acquires the printer identification information from the print command data.

Next, the communication management unit 25*e* sends the print command data to the print data processing unit 27*e*. The print data processing unit 27*e* generates and outputs print data based on the received print command data to the communication management unit 25*e*.

The communication management unit 25*e* references the first connection management database and acquires the connection identification information related to the acquired printer identification information.

Next, the communication management unit 25*e* sends the print data to the printer 12*e* through the first WebSocket connection CT1 identified by the connection identification information. The printer 12*e* then prints based on the received print data.

In this variation of the fifth embodiment, the management device 14*e* manages the relations between tablet computers 9*e* and printers 12*e*. As a result, when the tablet computer 9*e* sends print command data to the management device 14*e*, print data based on the print command data is sent through the management device 14*e* and the control server 10*e* to the printer 12*e*, and the printer 12*e* prints based on the print data. More specifically, in a system in which the printers 12*e* are connected to a server, a function of the server can be used by the tablet computer 9*e* or other terminal to control the printer 12*e*.

The invention is described above with reference to a preferred embodiment thereof, but the invention is not limited thereto and can be modified and adapted in many ways without departing from the scope of the accompanying claims.

In the embodiments described above, the printer 12*e* is installed as part of a store system 11 deployed in a business. However, the printer 12*e* is not limited to being part of a store system 11, and can be used in other systems.

In addition, print data is sent as an XML file from the control server 10*e* to the printer 12*e* in the foregoing embodiment, but the data format of the print data is not limited to XML. The print data may be data created in another markup language, or control commands in the command language of the print unit 18*e*.

The function blocks shown in FIG. 25 can also be rendered as desired using hardware and software, and do not suggest a specific hardware configuration. Functions of the printer 12*e* may also be rendered by a separate externally connected device. The printer 12*e* can also execute the processes described above by running a program stored on an externally connected storage medium.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A printing device comprising:
   a communication control unit configured to establish an asynchronous duplex communication channel with a print control device, and to receive print data pushed by the print control device through the asynchronous duplex communication channel without receiving a request from the printing device; and
   a print mechanism configured to print on print media based on the received print data;
   wherein the asynchronous duplex communication channel is established by a message from the printing device to the print control device.

2. The printing device described in claim 1, further comprising:
   a print control unit configured to control the print mechanism based on the print data, and to output print result data indicating a result of printing by the print mechanism,
   a function unit configured to communicate control data different from the print data with the print control device, and to run a process based on the control data, and
   a communication unit configured to receive the print data, and to transmit the print result data;
   wherein the communication control unit receives the print result data from the print control unit, and adds print control unit identification information identifying the print control unit to the print result data, and
   the communication unit outputs the print result data with the added print control unit identification information to the print control device.

3. The printing device described in claim 2, wherein:
   the communication control unit adds function unit identification information identifying the function unit to the control data communicated by the function unit, and
   the communication unit outputs the control data with the added function unit identification information to the print control device.

4. The printing device described in claim 2, wherein:
   the communication control unit adds printer identification information identifying the printing device to the print result data, and the communication unit outputs the print result data with the added printer identification information to the print control device.

\* \* \* \* \*